(12) United States Patent
Cosby et al.

(10) Patent No.: US 11,449,474 B2
(45) Date of Patent: Sep. 20, 2022

(54) CHANGE REQUEST VISUALIZATION IN HIERARCHICAL SYSTEMS

(71) Applicant: Oracle International Corporation, Redwood Shores, CA (US)

(72) Inventors: Douglas R. Cosby, Austin, TX (US); Byron Kevin McKenzie, Garland, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/648,216

(22) Filed: Jul. 12, 2017

(65) Prior Publication Data

US 2018/0081904 A1 Mar. 22, 2018

Related U.S. Application Data

(60) Provisional application No. 62/396,147, filed on Sep. 17, 2016.

(51) Int. Cl.
| | |
|---|---|
| *G06F 16/185* | (2019.01) |
| *G06F 16/23* | (2019.01) |
| *G06F 16/28* | (2019.01) |
| *G06F 16/248* | (2019.01) |

(52) U.S. Cl.
CPC ............ *G06F 16/185* (2019.01); *G06F 16/23* (2019.01); *G06F 16/248* (2019.01); *G06F 16/282* (2019.01); *G06F 16/287* (2019.01)

(58) Field of Classification Search
CPC ............ G06F 16/185; G06F 16/24552; G06F 16/287; G06F 16/23; G06F 16/248; G06F 16/282; G06F 3/0601; G06F 3/0685; G06F 16/25; G06F 16/26; G06F 16/212; G06F 2203/04803; G06F 3/048–0486; G06Q 10/06316
See application file for complete search history.

(56) References Cited

U.S. PATENT DOCUMENTS

| | | | |
|---|---|---|---|
| 7,305,419 B1 * | 12/2007 | Cosby | .................... G06Q 10/10 |
| 9,396,285 B1 | 7/2016 | Fitterer et al. | |
| 9,684,561 B1 | 6/2017 | Yan et al. | |
| 9,692,822 B1 | 6/2017 | Cheshire et al. | |

(Continued)

OTHER PUBLICATIONS

U.S. Appl. No. 15/648,157, Non-Final Office Action dated Mar. 21, 2019, 13 pages.

(Continued)

*Primary Examiner* — Mariela Reyes
*Assistant Examiner* — Fatima P Mina
(74) *Attorney, Agent, or Firm* — Kilpatrick Townsend & Stockton LLP

(57) ABSTRACT

Various techniques are disclosed herein for storing and managing master data in hierarchical data systems. Several related concepts, embodiments, and examples are disclosed, including techniques for incremental rationalization in a hierarchical data model, techniques for implementing governance pools in a hierarchical data model, techniques for application materialization in a hierarchical data model, techniques for data intersection mastering in a hierarchical data model, techniques for change request visualization in a hierarchical data model, and techniques for hierarchy preparation in a hierarchical data model.

20 Claims, 25 Drawing Sheets

(56) References Cited

U.S. PATENT DOCUMENTS

| | | | |
|---|---|---|---|
| 10,127,210 B1 | 11/2018 | Karppanen | |
| 10,853,331 B1* | 12/2020 | Segler, Jr. | G06F 16/282 |
| 10,884,994 B2 | 1/2021 | Kamath et al. | |
| 10,936,554 B2 | 3/2021 | Cosby et al. | |
| 11,036,692 B2 | 6/2021 | McKenzie et al. | |
| 11,144,512 B2 | 10/2021 | Lontchar et al. | |
| 2003/0179227 A1* | 9/2003 | Ahmad | H04L 67/1097 715/736 |
| 2004/0111284 A1 | 6/2004 | Uijttenbroek | |
| 2004/0168063 A1 | 8/2004 | Revital et al. | |
| 2005/0022129 A1* | 1/2005 | Borenstein | G06F 9/451 715/734 |
| 2005/0119988 A1 | 6/2005 | Buch et al. | |
| 2005/0257245 A1 | 11/2005 | Patrick et al. | |
| 2006/0282433 A1 | 12/2006 | Dutta et al. | |
| 2007/0109018 A1 | 5/2007 | Perl et al. | |
| 2007/0156767 A1* | 7/2007 | Hoang | G06F 16/94 |
| 2008/0147590 A1 | 6/2008 | Bechtel et al. | |
| 2009/0031230 A1* | 1/2009 | Kesler | G06F 16/252 715/764 |
| 2009/0125536 A1 | 5/2009 | Lu et al. | |
| 2009/0144416 A1 | 6/2009 | Chatley et al. | |
| 2010/0125670 A1 | 5/2010 | Dondeti et al. | |
| 2010/0211741 A1* | 8/2010 | Soni | G06F 16/26 711/118 |
| 2011/0302290 A1* | 12/2011 | Westerfeld | G06F 8/71 709/223 |
| 2012/0030188 A1 | 2/2012 | Gutlapalli et al. | |
| 2012/0084325 A1 | 4/2012 | Bansode et al. | |
| 2012/0158783 A1 | 6/2012 | Nice et al. | |
| 2012/0284686 A1 | 11/2012 | Sharrma et al. | |
| 2013/0080301 A1 | 3/2013 | Siauw et al. | |
| 2013/0232480 A1 | 9/2013 | Winterfeldt et al. | |
| 2014/0095445 A1 | 4/2014 | Deshmukh et al. | |
| 2014/0157417 A1 | 6/2014 | Grubel et al. | |
| 2014/0210300 A1 | 7/2014 | Wang et al. | |
| 2014/0250534 A1 | 9/2014 | Flores | |
| 2014/0310300 A1 | 10/2014 | Bhatia et al. | |
| 2014/0344211 A1 | 11/2014 | Allan et al. | |
| 2014/0344625 A1 | 11/2014 | Thatte et al. | |
| 2014/0344778 A1 | 11/2014 | Lau et al. | |
| 2015/0019344 A1 | 1/2015 | Durham | |
| 2015/0094049 A1 | 4/2015 | Hamada | |
| 2015/0163654 A1 | 6/2015 | Lew et al. | |
| 2015/0169786 A1 | 6/2015 | Jerzak et al. | |
| 2015/0324346 A1 | 11/2015 | Sankaran et al. | |
| 2016/0070724 A1 | 3/2016 | Marrelli et al. | |
| 2016/0070725 A1 | 3/2016 | Marrelli et al. | |
| 2016/0092818 A1* | 3/2016 | Kamath | G06Q 10/06316 705/7.26 |
| 2016/0278426 A1 | 9/2016 | Davila et al. | |
| 2016/0294894 A1 | 10/2016 | Miller | |
| 2017/0041317 A1 | 2/2017 | Kurian et al. | |
| 2017/0178055 A1 | 6/2017 | Kotoulas et al. | |
| 2018/0075163 A1 | 3/2018 | Park et al. | |
| 2018/0081879 A1 | 3/2018 | Lontchar et al. | |
| 2018/0081901 A1 | 3/2018 | Cosby et al. | |
| 2018/0081902 A1 | 3/2018 | McKenzie et al. | |
| 2018/0081903 A1 | 3/2018 | McKenzie et al. | |
| 2018/0081905 A1 | 3/2018 | Kamath et al. | |
| 2019/0294613 A1 | 9/2019 | Sullivan et al. | |

OTHER PUBLICATIONS

U.S. Appl. No. 15/648,176, Non-Final Office Action dated Mar. 21, 2019, 14 pages.
U.S. Appl. No. 15/648,197, Non-Final Office Action dated Mar. 27, 2019, 12 pages.
U.S. Appl. No. 15/648,130, Non-Final Office Action dated Nov. 27, 2019, 11 pages.
U.S. Appl. No. 15/648,197, Final Office Action dated Oct. 23, 2019, 14 pages.
U.S. Appl. No. 15/648,231, Non-Final Office Action dated Jan. 27, 2020, 8 pages.
U.S. Appl. No. 15/648,197, Non-Final Office Action dated May 21, 2020, 17 pages.
U.S. Appl. No. 15/648,231, Final Office Action dated Jul. 8, 2020, 9 pages.
U.S. Appl. No. 15/648,130, Non-Final Office Action dated Jun. 15, 2020, 13 pages.
U.S. Appl. No. 15/648,157, Non-Final Office Action dated Jun. 23, 2020, 17 pages.
U.S. Appl. No. 15/648,176, Non-Final Office Action dated Jun. 19, 2020, 18 pages.
U.S. Appl. No. 15/648,130, Final Office Action dated Oct. 6, 2020, 15 pages.
U.S. Appl. No. 15/648,231, Corrected Notice of Allowability dated Oct. 7, 2020, 3 pages.
U.S. Appl. No. 15/648,231, Notice of Allowance dated Sep. 18, 2020, 7 pages.
U.S. Appl. No. 15/648,157, Notice of Allowance dated Apr. 22, 2021, 14 pages.
U.S. Appl. No. 15/648,130, Notice of Allowance dated Nov. 25, 2020, 10 pages.
U.S. Appl. No. 15/648,157, Advisory Action dated Feb. 22, 2021, 4 pages.
U.S. Appl. No. 15/648,157, Final Office Action dated Dec. 3, 2020, 19 pages.
U.S. Appl. No. 15/648,176, Advisory Action dated Feb. 22, 2021, 4 pages.
U.S. Appl. No. 15/648,176, Final Office Action dated Nov. 24, 2020, 19 pages.
U.S. Appl. No. 15/648,176, Non Final Office Action dated Apr. 1, 2021, 22 pages.
U.S. Appl. No. 15/648,197, Advisory Action dated Feb. 22, 2021, 4 pages.
U.S. Appl. No. 15/648,197, Final Office Action dated Nov. 27, 2020, 19 pages.
U.S. Appl. No. 15/648,197 received a Notice of Allowance dated Jul. 22, 2021, 16 pages.
U.S. Appl. No. 15/648,176 received a Final Office Action dated Oct. 1, 2021, 26 pages.
U.S. Appl. No. 15/648,176 received a Non-final Office Action dated Jan. 7, 2022, 26 pages.

* cited by examiner

CHANGE REQUEST VISUALIZATION IN HIERARCHICAL SYSTEMS

CROSS-REFERENCE TO RELATED APPLICATIONS

This application is a non-provisional of and claims the benefit and priority under 35 U.S.C. 119(e) of U.S. Provisional Application No. 62/396,147, filed Sep. 17, 2016, entitled "MASTER DATA MANAGEMENT IN HIERARCHICAL DATA MODELS," the entire contents of which are incorporated herein by reference for all purposes This application is related to U.S. Pat. No. 7,305,419, entitled "HIERARCHICAL REFERENCE DATA MANAGEMENT SYSTEM AND METHOD," filed on Mar. 25, 2004, and issued on Dec. 4, 2007. This application is also related to U.S. Patent Appl. Publ. No. 2016/0092818, entitled "METHOD AND SYSTEM FOR IMPLEMENTING AN ADAPTIVE DATA GOVERNANCE SYSTEM," filed on Sept. 23, 2015. The entire contents of U.S. Pat. No. 7,305,419, and U.S. Patent Appl. Publ. No. 2016/0092818 are incorporated by reference herein in their entirety for all purposes.

TECHNICAL FIELD OF THE INVENTION

The present disclosure relates to various techniques (e.g., methods, systems, non-transitory computer-readable storage memory storing a plurality of instructions executable by one or more processors, etc.) for storing and managing master data in hierarchical data systems.

BACKGROUND

Organizations often store various critical data in databases or other electronic storage formats. The critical data stored by an organization may include data relating to any aspects of the organization, such as transaction data records, technical system data records, business-related data records, and the like. Data that may be used in multiple different data records may be referred to herein as reference data. For instance, within a business organization, data identifying a particular customer, employee, document, product, product line, store, geographic region, computer server, network device, or user terminal, all may be examples of reference data, in that each of these examples of data may be referred to in multiple different data records (e.g., multiple purchase transactions may involving the same customer or product, multiple network monitoring records may identify the same servers or network devices, etc.). Additionally, different types of reference data may be interrelated in a child-parent relationship, sibling relationship, etc. In such cases, the organization data may be referred to hierarchical data, and the arrangement of reference data to reflect these relationships may be referred to as a hierarchy.

Moreover, organizations often have multiple different systems for receiving, storing, analyzing, and outputting data. Such systems may be heterogeneous, so that each system has its own hierarchy or hierarchies of reference data. Each hierarchy may organize different or overlapping sets of reference data according to different criteria. For example, different pieces of data stored or represented within different system hierarchies may correspond to the same reference data. For instance, a first heterogeneous system may store reference data hierarchically based on the organization's internal structure (e.g., business entity, department, store/office, etc.), while a second heterogeneous system may store the same or overlapping reference data hierarchically based on the geography (e.g., continent, country, region, store/office, etc.). These heterogeneous systems may have no knowledge of the hierarchies employed by other systems, even if a portion of the reference data overlaps. In such cases, the organization may generate and maintain a master set of reference data to provide a single source of the shared organization data.

BRIEF SUMMARY

Certain embodiments of the present disclosure relate generally to storing and managing master data in hierarchical data systems.

Various techniques (e.g., systems, methods, computer-program products tangibly embodied in a non-transitory machine-readable storage medium, etc.) are described herein for performing incremental rationalization of hierarchy data. In some embodiments, inputs may be received identifying two or more data dimensions of various applications in a hierarchical data system, and a mapping may be generated between the different data dimensions. After the generation of the data dimension mapping, changes within the data nodes of the data dimensions may be detected during execution sessions of the applications, and in response to the detected changes, data indicating the changed data nodes may be provided to the corresponding applications. Further techniques may relate to the implementation of governance pools within hierarchical data systems. For example, requests may be received to change one or more data nodes within a hierarchical data system associated with a first application. In response to such requests, the affected hierarchical data systems may be determined based on one or more shared data mappings between the first hierarchical data system and each of the affected hierarchical data systems, and one or more data administrator users for each of the affected hierarchical data systems may be identified and retrieved. Various automatic approval request notifications may be generated and transmitted to each of the data administrator users for each of the affected hierarchical data systems, and responses (e.g., approvals) may be received from the various data administrators to the requests to change the data nodes within the hierarchical data system.

Additionally, certain techniques described herein relate to application materialization within hierarchical systems. By way of example, system functionality may be implemented to allow users to interact with their data hierarchies and master data through management of materialized, application-centric views. In some cases, a single user interface may be provided to allow users to perform both application materialization of the user's applications, and master data management. For example, in some embodiments, requests may be received to output the data hierarchies associated with a particular application. In response, the server system may determine that the particular application subscribes to at least one data dimension maintained by an external application, and then retrieve the subscribed-to data nodes of the external application. The server system then may combine the data nodes retrieved from the external application with various application-level data hierarchies maintained by the particular application, and generate and output one or more graphical interface representations of the requested data hierarchies, including combination of data nodes retrieved from the external application with the application-level data hierarchies maintained by the particular application.

Further techniques described herein relate to native support for data intersections as first-class objects, including data intersection mastering. In some embodiments, requests may be received and process for accessing particular intersection data nodes within data dimensions associated particular hierarchical applications. Such dimensions may include one or multiple intersection data nodes. In response, the system may determine that the dimension associated with the application corresponds to a shared master data dimension within a hierarchical master data store, and may access the shared master data dimension via a hierarchy management server. Additionally, the system may retrieve, via the hierarchy management server, the requested intersection data nodes from the shared master data dimension within the hierarchical master data store, and provide the requested intersection data nodes to the particular hierarchical applications. Certain related techniques described herein include the visualization of change requests within hierarchical systems. For example, requests also may be received and processed for updating data within data hierarchies associated with hierarchal application. In response to such requests, the system may determine one or more additional data hierarchies affected by the requested data update, wherein the additional data hierarchies may be associated with the current application and/or various external applications. The system may retrieve the additional data hierarchies associated with the external applications, and may generate and/or output graphical interfaces including representations of the data hierarchies associated with the particular application and the representations of the additional data hierarchies associated with the external applications within the same graphical interface. In some cases, the graphical interfaces may further include graphical representations identifying the requested data update within each of the data hierarchy representations shown in the graphical interface, as well as various additional features related to analyses and visualization of change requests within hierarchical data systems.

Still additional techniques described herein relate to hierarchy preparation including various intelligence components and automated processes for importing data into hierarchical data systems, in order to ensure referential integrity of the hierarchy and all hierarchy entities. For example, in some embodiments, input may be received identifying data sources for importation and/or target data hierarchy within hierarchical master data stores for the requested data importation. In response to the inputs, the system may access the various data sources, and load data from each of the data sources into temporary storage associated with the hierarchical master data store. Further, the system may execute various validations and/or grid actions on the data loaded into the temporary storage, after which the loaded data may be imported from the temporary storage into the target data hierarchies within the hierarchical master data store.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Figures 19A, 19B:
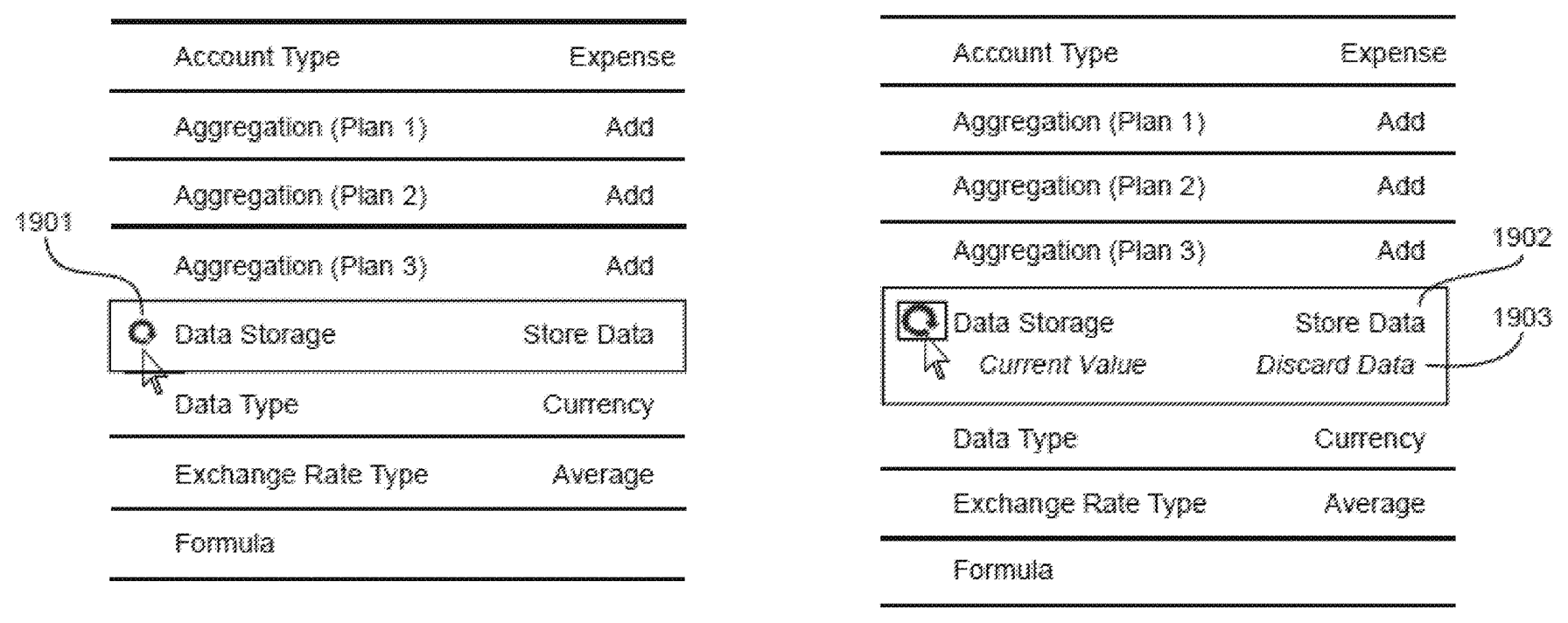

FIGS. 19A and 19B are example screens of a user interface illustrating techniques for operation visualization, in accordance with certain embodiments described herein.

FIG. 21A is another example screen of a user interface illustrating techniques for operation visualization, in accordance with certain embodiments described herein.

FIG. 21B is another example screen of a user interface illustrating techniques for operation visualization, in accordance with certain embodiments described herein.

DETAILED DESCRIPTION

The present disclosure relates to techniques (e.g., methods, systems, non-transitory computer-readable storage memory storing a plurality of instructions executable by one or more processors, etc.) for storing and managing master data in hierarchical data systems. Several separate but related concepts, embodiments, and examples are discussed in the following sections, including (1) an overview of data mastering in a hierarchical data model, (2) techniques for incremental rationalization in a hierarchical data model, (3) techniques for implementing governance pools in a hierarchical data model, (4) techniques for application materialization in a hierarchical data model, (5) techniques for data intersection mastering in a hierarchical data model, (6) techniques for change request visualization in a hierarchical data model, and (7) techniques for hierarchy preparation in a hierarchical data model.

Overview of Data Mastering in Hierarchical Systems

As noted above, various techniques described herein relate to storing and managing master data in hierarchical data systems. For example, a single organization may operate multiple different systems for receiving, storing, analyzing, and outputting data. Such systems may relate to any aspect of the organization, including business-related systems, employee-related systems, customer-related systems, vendor-related systems, product-related systems, systems relating to the technical infrastructure of the organization, etc. Additionally, an organization's systems may be heterogeneous, so that each system has its own hierarchy or hierarchies of reference data, and each hierarchy may organize different or overlapping sets of reference data according to different criteria. These heterogeneous systems may have no knowledge of the hierarchies employed by other systems, even if a portion of the reference data overlaps.

Figure 1:
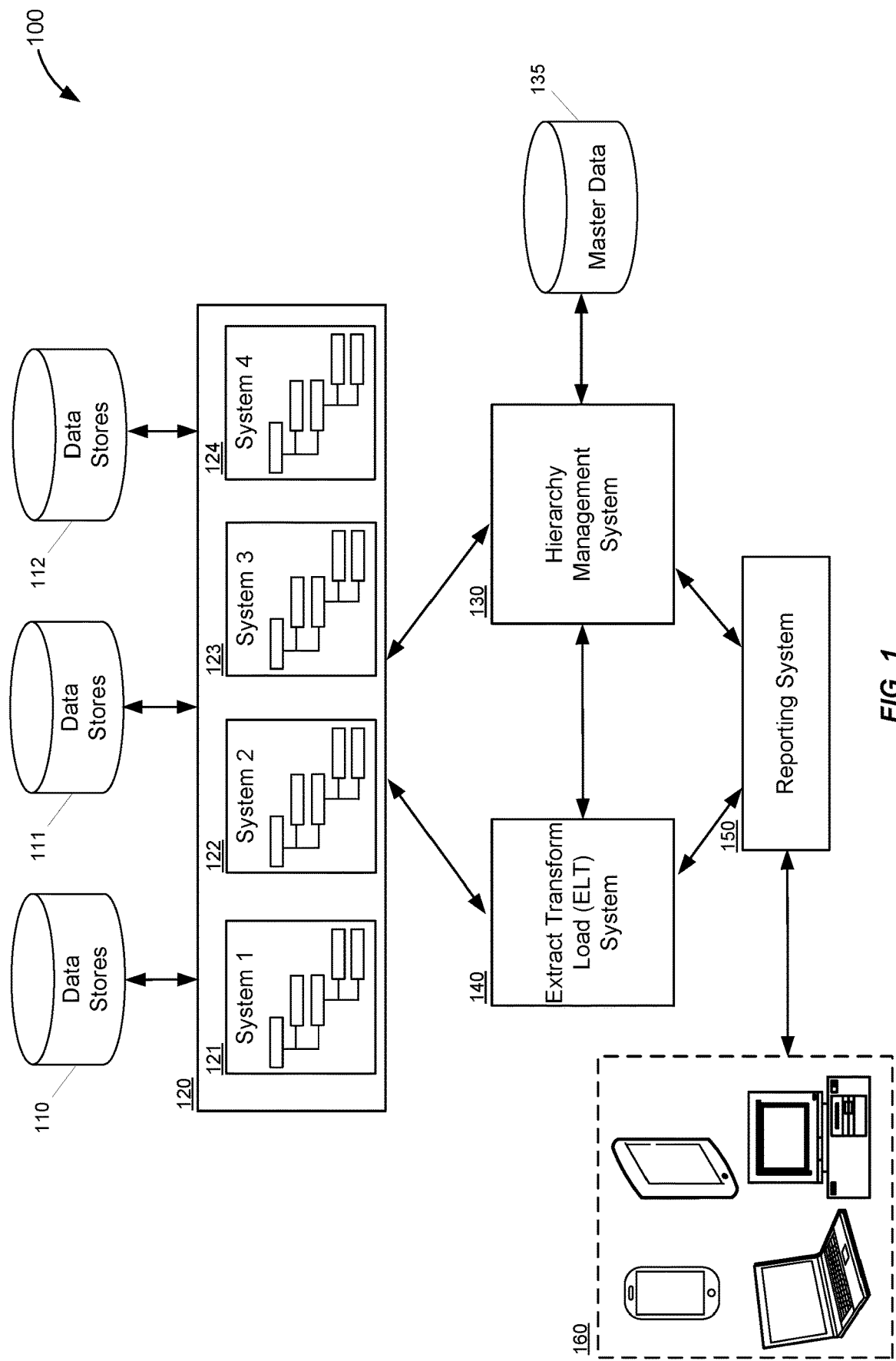
FIG. 1 shows an example hardware and/or software architecture, in accordance with certain embodiments described herein.

Referring now to FIG. 1, an example hardware and/or software architecture 100 is shown on which certain master data storage and management techniques described herein may be implemented. In this example, architecture 100 includes one or more data management systems 120 configured to access data from one or more data stores 110-112. Data management systems 120 may include a plurality of separate (e.g., heterogeneous) systems 121-124, which in this example are shown as hierarchical data systems 121-124. As discussed above, systems 121-124 may correspond to data systems of an organization's business-related applications, employee management applications, resource management applications (e.g., server management, computer network management, etc.), and/or any other specialized hardware/software systems implemented for an organization.

Data stores 110-112 may be databases (e.g., Microsoft SQLServer, Oracle, Sybase, ODBC or other database known in the art). Additionally or alternatively, data stores 110-112 may be cloud-based data sources, and one or more systems 121-124 may correspond to cloud applications. Thus, the hierarchy management server 130 may be configured to natively push data to and/or pull data from such external applications, and to validate that the data is correct and complete for the integrated application. This may include the ability to register external applications with the hierarchy management server 130, so that the external applications may play the role of publisher and/or subscriber in the data management process. Certain non-limiting examples of cloud-based applications that may be supported in such embodiments include, for example, ORACLE Planning and Budgeting Cloud Service (PBCS), ORACLE Enterprise Performance Reporting Cloud Service (EPRCS), ORACLE Financial Consolidation and Close Cloud (FCCS), ORACLE Hyperion Financial Data Quality Management, Enterprise Edition (FDMEE), and ORACLE Fusion General Ledger (G/L), among others.

Additionally, architecture 100 may include a reporting system 150 to report data to client various client devices 160 (e.g., human or programmatic users). Each hierarchical data system 121-124 may use its own hierarchy of reference data to store, access or report on data of interest from data sources 110-112. Architecture 100 can further include an Extract Transform Load (ETL) system 140 to extract data from data management systems 120 and format the data to the hierarchy of reporting system 150.

As discussed above, data systems 121-124 may be implemented as separate and heterogeneous systems, and may have little or no intercommunication and little or no knowledge about the other systems 120. Nonetheless, two or more of the systems 120 may be implemented using a hierarchical data model, and there may be certain overlap in the reference data of systems 121-124. For example, a financial data system 121 may use a hierarchy to organize particular expenses, and the data hierarchy may include reference data related to the line of business (LOB) structure of the organization (e.g., related to departments, divisions, sections and so on), etc. Additionally, a separate costing system 122 may use a data hierarchy to organize data which includes reference data related to the geographical location at which particular expenses occur. While some pieces of reference data may overlap between these two hierarchies, financial data system 121 may have little or no knowledge about the costing system's 122 hierarchy, and the costing system 122 may have little or no knowledge about the financial data system's 121 hierarchy.

In this example, the software and/or hardware architecture 100 may include a hierarchy management server 130, which may be implemented a specialized hardware server, specialized software (e.g., a hierarchy management program), and/or a combination of specialized hardware and software. The hierarchy management server 130 may manage the multiple hierarchies of architecture 100, and may maintain a master set of reference data in a master data store 135, representing the hierarchical reference data used by source data management systems 121-124. In some embodiments, the hierarchy management server 130 may use the master data to instantiate centralized hierarchies and publish the centralized hierarchies to systems 121-124. Centralized hierarchies can be maintained, analyzed and validated before being sent to subscribing systems. In some cases, the hierarchy management server 130 also may formalize hierarchy management, for example, by maintaining a hierarchy object model for hierarchy management. The hierarchy object model may include representations of reference data across hierarchies (referred to "global nodes") and representations of the reference data in a particular hierarchy (referred to as a "local nodes"). As discussed below, the hierarchy object model may associate properties with particular pieces of reference data and can enforce inherencies between properties across different levels of a hierarchy and across hierarchies.

Hierarchy management server 130 may serve as the "system of record" for hierarchical reference data, and may reconcile hierarchical reference data from different source data management systems 121-124, etc. In some embodiments, the hierarchy management server 130 may publish hierarchical reference data for loading into selected systems 121-124, and may load hierarchical reference data from systems for audit and validation purposes. The system in a particular software architecture to which the hierarchy management server 130 may publish data, or from which the hierarchy management server 130 may load data, can be defined to suit the needs of a particular organization.

As part of maintaining the master data for the hierarchical system, the hierarchy management server 130 may receive and process hierarchy change requests associated with individual hierarchies. As noted above, individual hierarchical data systems 121-124 may have no knowledge of the hierarchies of other data systems 121-124, yet it may be desirable (and/or required) for changes in one of these data hierarchies to be reflected in one or more other hierarchies. Therefore, after receiving a change request, the hierarchy management server 130 may determine one or more additional hierarchies affected by the requested change, updated the additional hierarchies to reflect the change, and validate the change in the first requested hierarchy and the additional affected hierarchies. In this example, the hierarchy management server 130 may provide various technical advantages, for example, by allowing inherencies to be enforced within a hierarchy and across hierarchies, by being able to automatically apply business rules and validations across multiple hierarchies, and/or by automatically propagating hierarchy changes across multiple hierarchies.

Master data store 135 may include a copy of all the pieces of reference data being managed by hierarchy systems 121-124. Thus, the master data store 135 may maintain copies of data for the individual hierarchies within systems 121-124. Duplicate copies of particular pieces of reference data can be maintained in the master data store, or a single copy of a piece of reference data that appears in multiple hierarchies can be maintained. For example, a single copy of a piece of reference data can be maintained for multiple hierarchies, or a copy can be maintained for each hierarchy 121-124. Additionally, properties associated with each piece of reference data, the relationships between pieces of reference data for various hierarchies, business rules and other arbitrarily defined rules that apply to each hierarchy may be maintained by the hierarchy management system 130.

In some embodiments, hierarchy management system 130 may retrieve data from and/or provide data to the individual subscribing data systems 121-124, one or more ELT systems 140, and/or one or more reporting systems 150. Data hierarchies (or just "hierarchies") may be published to subscribing systems in specific formats based on the particular subscribing system (e.g., readily loadable formats specific to the subscribing system). For example, if hierarchy is established at particular hierarchical data system 121, the hierarchy may include pieces of reference data, and associated properties and relationships. The hierarchy management system 135 may import the reference data, properties and/or the relationships from the data system 121. By storing pieces of reference data, relationships and properties, for each hierarchy being managed, hierarchy management server 130 may maintain a master set of reference data, and/or may instantiate centralized hierarchies that correspond to the individual data hierarchies within systems 121-124. Centralized hierarchies may be used to manage the hierarchies of subscribing systems.

As noted above, the hierarchy management server 130 may instantiate one or more centralized hierarchies from a master set of reference data within master data store 135. Each centralized data hierarchy may represent one or more hierarchies within subscribing systems 120. Additionally, changes to particular hierarchies (e.g., either a centralized data hierarchy or a hierarchy within a subscriber system 120) may be propagated to the other related hierarchies, and such changes may be validated across hierarchies. For example, when adding a new data item to a particular hierarchy (e.g., within a particular data system 121), the new data item may be added to other corresponding hierarchies (e.g., a centralized data hierarchy and/or corresponding hierarchies with other data systems 120) as well. For example, the hierarchy management system 130 may import the changes into the master set of reference data in the master data store 135. After importing the updated data, the hierarchy management system 130 may apply a defined set of rules to the updated master hierarchy to determine if the hierarchy is valid. If the centralized hierarchy is valid, the hierarchy management system 130 may determine other hierarchies to which the new piece of reference data should be added, and also may determine the associated parameters and relationships to be added. Business rules associated with a hierarchy of an individual data system (e.g., 121) may be applied to determine if a piece of reference data is valid to be added to the corresponding centralized hierarchy in the master data store 135. If the new piece of reference data is a valid addition to the centralized hierarchy, the hierarchy management system 130 may export the centralized hierarchy to the other affected systems (e.g., 122-124) to update their individual data hierarchies. However, if the new addition to the centralized hierarchy is not valid, then the hierarchy management system 130 may notify the individual system (e.g., 121) that requested the data addition that the update is invalid. In this case, the hierarchy management system 130 may export an earlier version of a centralized hierarchy that did not include the new piece of data to the other affected systems (e.g., 122-124), to restore the original hierarchy on all affected systems.

In some embodiments, a validation may be performed for each centralized hierarchy in which a particular change will appear. For example, if an addition at a data hierarchy of an individual system 121-124 is determined to also affect a centralized hierarchy in the master data store 135, then a validation process may be initiated on the centralized hierarchy before the hierarchies of other subscribing systems 121-124 are updated. If the change to the centralized hierarchy is determined to be valid, according to predefined rules associated with the centralized hierarchy, then the change may be propagated to corresponding hierarchies in the other individual systems 121-124. In some cases, new pieces of reference data may be added into one or more of the subscribing systems 121-124 (and then retrieved by the hierarchy management system 130), while in other cases the hierarchy management system 130 may directly receive the hierarchy changes. In either case, the addition of a new piece of reference data may be added directly to the appropriate centralized hierarchy stored within the master data store 135. The centralized hierarchy may be validated, after which the change may be propagated to any other affected centralized hierarchies in the master data store 135, and those other centralized hierarchies also may be validated. If the changes are valid across all of the affected centralized hierarchies, then the hierarchy management system 130 may export the updated hierarchies to each of the subscribing data systems 121-124 that stored corresponding hierarchies. Additionally, when an update is made to one or more of the centralized hierarchies, the hierarchy management system 130 also may generate new ETL mappings, and may publish the ETL mappings to ETL system(s) 140. Thus, the hierarchy management system 130 may become the point of input for all hierarchy changes, thereby allowing hierarchy changes to be receives, entered, propagated (internally within the centralized master data), and validated at a single system before the change is propagated to the other (external) subscribing systems 120 across the organization.

Thus, the hierarchy management system 130 may act as a hub where centralized hierarchies may be maintained, analyzed and validated, before being sent to various subscribing systems 120 (e.g., any systems or applications that push data to or pull data from hierarchy management system 130). Hierarchy management system 130 may manage hierarchies and alternate views, and may store additional information used to support a subscribing system, for example, alternate names and descriptions, formulas, allocation mechanisms and percentages and aggregation methods. In some embodiments, the hierarchy management system 130 also may provide users with a single point of access to manage the hierarchies for all or for certain selected applications across an organization, thereby simplifying and consolidating the tasks of hierarchy management. Hierarchy management system 130 also may be used to manage hierarchical reference data (e.g., chart of accounts, cost center rollups, product structure, customer relationships and other hierarchical reference data) and other reference data mappings (old G/L account to new G/L account).

In some embodiments, for some or all of the centralized data hierarchies stored in the master data store 135, the hierarchy management system 130 may maintain multiple versions of the hierarchy. In such cases, the hierarchy management system 130 may maintain reference data, relationships and/or properties for each version of a particular centralized hierarchy, as well as data identifying the changes that have to that centralized data hierarchy over time. Such versioning capabilities may allow the hierarchy management system 130 to access and provide older versions of a centralized data hierarchy, and/or to identify the previous changes that have been made to the centralized hierarchy over time. The hierarchy management system 130 also may maintain a set of permissions associated with the each of the centralized hierarchies stored in the master data store 135, including permissions associated with particular versions of the centralized hierarchies and/or permissions associated with particular pieces of reference data. In such embodiments, only users with the appropriate permissions may be permitted to update a particular centralized hierarchy, version, or piece of reference data.

Additionally, for particular nodes with data hierarchies, the hierarchy management system 130 may compare property values of the particular node to criteria. Such property values may be accessed from a local node (e.g., a particular node within a subscriber data system 120), a corresponding global node, or a controlling hierarchy. In some embodiments, in order to access (and/or set) properties, the hierarchy management system 130 may traverse up the hierarchy based on the parents of each node, or down the hierarchy based on the children listed in each node. In some embodiments, the processes for hierarchy traversal may be implemented as defined classes that can be associated with a hierarchy in, for example, a hierarchy object. Additionally, the hierarchy management system 130 may include defined processes for exporting data relating to particular hierarchies. Thus, certain techniques described herein may apply various business, validation and export rules to hierarchies. Further, when a local node is analyzed, property values may be accessed directly from the local node, from a global node or from other hierarchies so that property values do not have to be redundantly stored.

Incremental Rationalization in Hierarchical Systems

Certain techniques (e.g., methods, systems, non-transitory computer-readable storage memory storing a plurality of instructions executable by one or more processors, etc.) described herein relate to incremental rationalization of hierarchy data. Data rationalization refers to the process by which pieces of reference data stored within the data hierarchies of individual systems 121-124, are extracted from the individual systems and added to the master data of the organization. That is, if multiple different data hierarchies maintained by systems 121-124 share overlapping reference data, then the pieces of overalapping reference data may be extracted from the individual system hierarchies and added to a centralized hiearchy within the master data store 135. For example, if a first user operates a first application associated with the hierarchical data system 121, and a second user operates a second application associated with a different data system 122, agreement may be reached between the two systems to share their overlapping data. For instance, assuming that both data systems 121 and 122 operate systems associated with the same organization, they may share a common set of reference data representing the organization's offices, data centers, computer servers or devices, locations, employees, customers, stores, products, or suppliers, etc. Although this organization data may periodically change, it may be determined by one or both systems that there are technical advantages to maintaining a single copy of the date within a centralized hiearchy, rather than multiple copies of the data within the individual systems 121 and 122. Thus, after determine which reference data hierarchies are to be rationalized, the respective data nodes, along with the metadata properties, hierachical relationships, etc., may be shared by rationalizing the data into a master data store 135. Nonetheless, as described below in more detail, each user and/or subscriber system 120 may maintain their own preferred views and terminologies for the shared rationalized reference data. The incremental rationalization techniques described herein thus may provide advantages by allowing end users, which may refer to human and/or programmatic clients, to make rationalization decisions (e.g., bilateral or multi-lateral rationalization determination) on the fly and during the ongoing operation of their respective systems 120, rather than having to initially make rationalization determinations. Additionally, in certain embodiments, the hierarchy management system 130 may support branching features which allow end users to view and evaluate rationalization scenarios before finally committing to the rationalization.

Figure 2A:
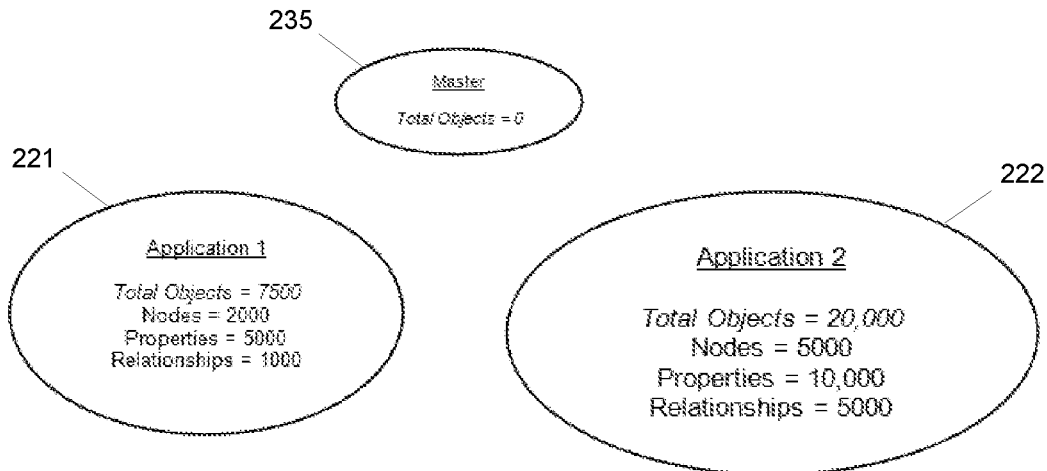
FIG. 2A is a diagram representing a hierarchical data system without shared reference data, in accordance with certain embodiments described herein.
Figure 2B:
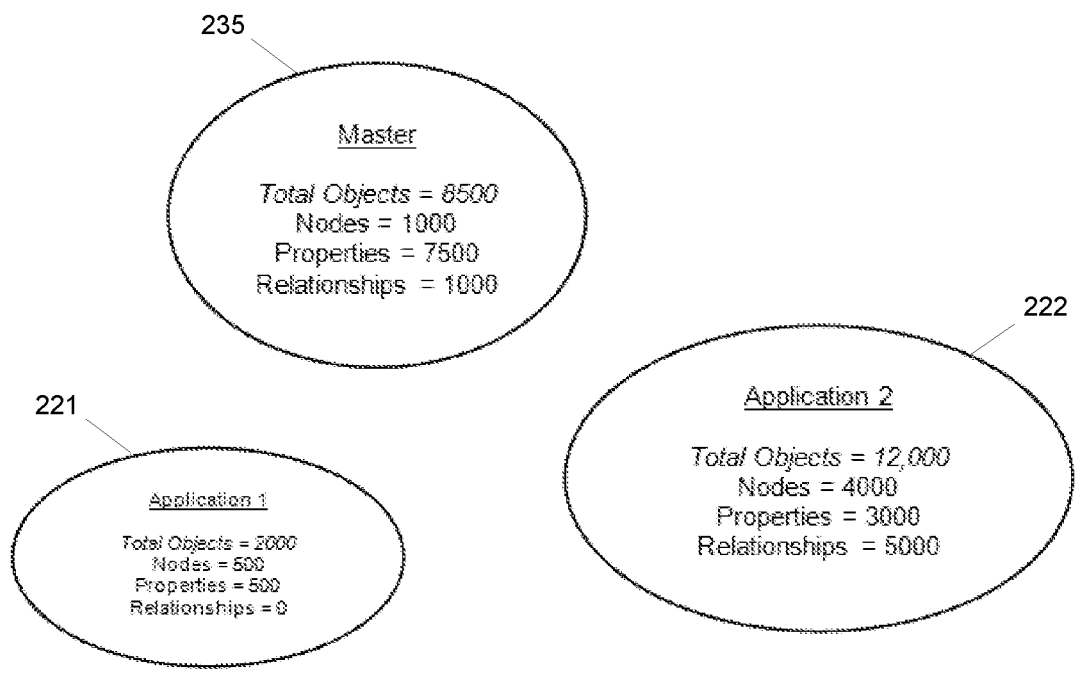
FIG. 2B is a diagram representing a hierarchical data system without shared reference data, in accordance with certain embodiments described herein.
Figure 3:
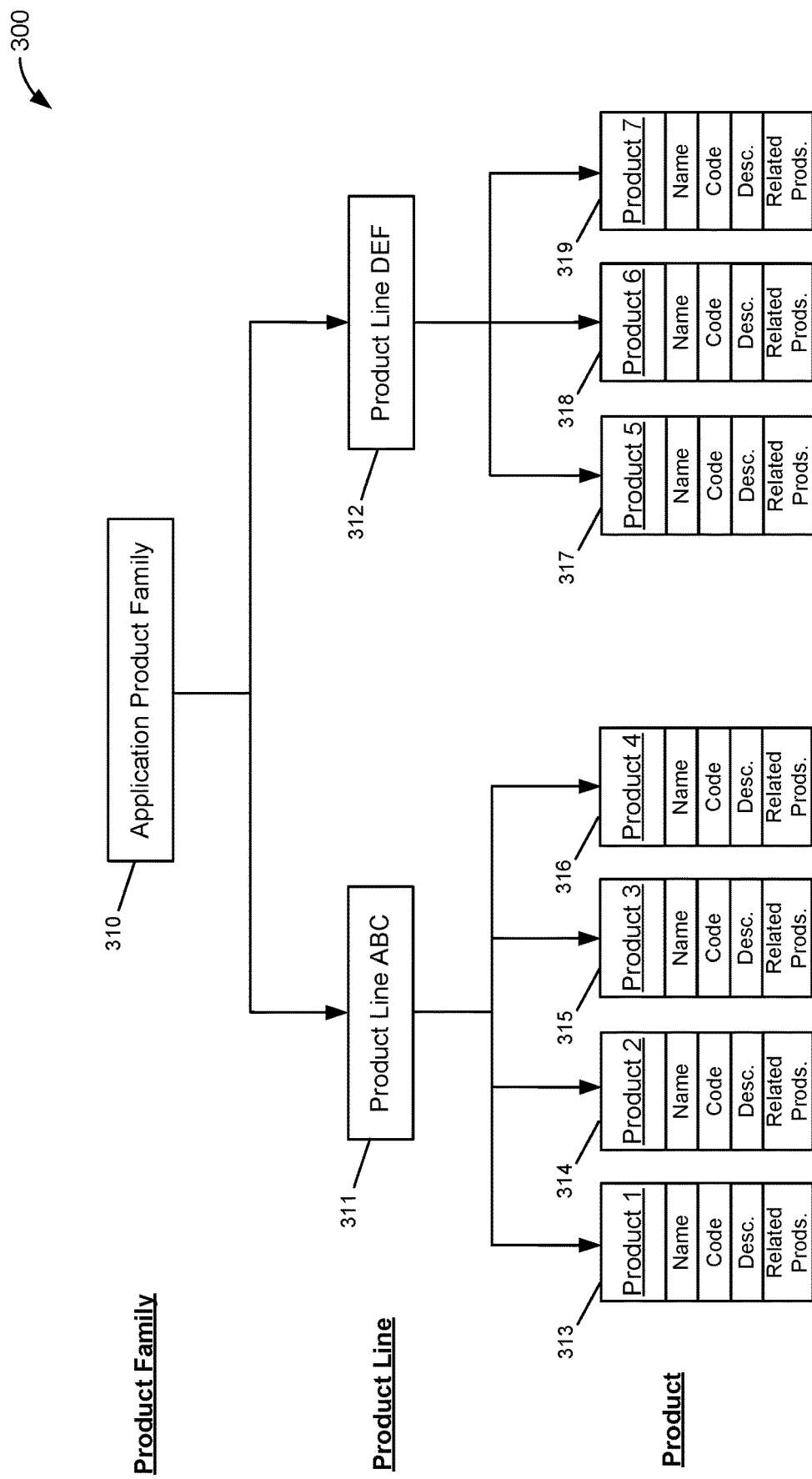
FIG. 3 is a hierarchical diagram representing an example product hierarchy, in accordance with certain embodiments described herein.

Referring briefly to FIGS. 2A and 2B, a set of diagrams is shown illustrating an example of master data rationalization. In these examples, the application data sets 221 and 222, and the master data set 235, may be in the form of tables and databases, where the rows of the tables may represent data nodes (or data entities) and the columns of the table may represent various data dimensions. A data dimension is a set of related data values, such as the values in a column of a database table, or correlated fields in an XML file that are marked with a common tag, and thus may represent different values, properties, or attributes of the same type. For instance, in a data system corresponding to a eCommerce and/or retail business or organization, data dimensions may correspond to different sets of reference data relevant to the organization, such as the set of all customers, the set of all employees, the set of all products, the set of all product lines, the set of all stores, the set of all sales representatives, the set of a data centers, etc. In some cases, data dimensions may be organized into one or more data hierarchies, such as products to product lines to product manufacturers, stores to states to regions to countries, employees to departments to business units, and so on. A data dimension thus may represent a single tier/level within a larger data hierarchy, or may represent multiple tiers/levels.

In this example, the link point across the master and application levels may be by node, where an application node (i.e., a particular data node within a data hierarchy of a system or application 121-124) points to a master node (i.e., a node within a centralized data hierarchy within a master data store 135). In some embodiments, the hierarchy management system 130 may be configured so that application nodes may be linked with (e.g., may point to) one and only one master node, while each master node may be linked to by any number of separate application nodes. In some cases, a master node may be created with no application nodes initially pointing to it, but only after one or more incremental rationalizations have been performed will the master node have application nodes linked to it. Referring to the example diagram in FIG. 2A, two hierarchies 221 and 222 are represented corresponding to two separate hierarchical data systems (e.g., 121 and 122). FIG. 2A also illustrates that no reference data is shared between the data systems, and thus the master data store is empty 235. Referring now to FIG. 2B, at a later time as rationalization progresses within the data systems executing on the architecture 100, each incremental rationalization process causes shared nodes, properties, and relationships to be generated within the master data store 235, and correspondingly the data of each subscribing system 221 and 222 may be reduced. As this example illustrates, the overall number of objects that are stored within the architecture 100 may be reduced as the amount of reference data sharing increases via rationalization processes. This is a reflection of reduced maintenance complexity, and demonstrates a movement in the direction of dimension maturity.

The two-level model illustrated in this example may provide the ability for data in the master data store 235 to be shared across multiple data systems/applications 120, while at the same time allowing the applications to override the parts of the dimension that are application-specific. In some embodiments, newly registered data systems/applications 120 operating within the architecture 100 may be permitted to remain out of the mastering process for an predetermined initial period of time, during which they maintain their own separate reference data hierarchies without any sharing or mastering. After the initial period of time, the data systems/applications 120 may be permitted (or may be required in some cases) to use the corresponding shared central data hierarchies in the master data stores 135. Additionally, in some embodiments, similar application override capabilities (e.g., allowing individual data systems/applications 120 to opt out of the data mastering) may be supported for node property values, including node name and description, even when not supported for the nodes themselves. Additionally, in some cases, even aspects of the property definition may be able to be overridden by independent data systems 120. In such embodiments, the ability to override a node name at the application level for all nodes may provide a built-in mechanism for specific naming conventions by an application 120.

In some embodiments, application nodes that have been mastered may have both an application node type (stored at the subscriber data system 120) and a master node type (stored at the master data store 135). In some cases, this may be implemented not as an override, but as two separate node type values, both of which available at the node. Support such node type dualities may provide the ability for nodes to get property values from both the application level and the master level. Additionally, supporting two separate node types may allow both types to contribute to a node's validations and user group security. The supporting of both application and master levels also may allow chunk objects to be rationalized, as described in more detail below. For instance, a particular node may have a "PBCS.CostCenter" node type at the application level, while having a "Cost Center" node type at the master level. Such examples may allow the initial node set and hierarchy set created during the data import to reference PBCS.CostCenter nodes for their rules and filtering, while at the same time allowing the eventual master node sets and hierarchy Sets to refer to Cost Center master nodes.

Further, two-tier models as described above also may allow the ability for an organization to control which values may be overridden by individual applications, and which value may be required to come from the master data. For example, an organization may determine to standardize certain descriptions for a set of products (or any other reference data) across all subscriber systems 120, so that these can be managed at the master level 130-135 and pushed down to all subscriber systems 120 with no override capability, thereby ensuring consistency for the reference data across the applications of all subscriber systems 120. As discussed in more detail below, in order to support this two-tier mastering approach, the hierarchy management system 130 may create a set of chunk objects for each subscriber system/application 120, and a set of chunk objects for each master.

Further, implementations such as the example architecture 100 may allow organization users to implement and begin using various data systems 121-124 independently, without any up-front data rationalization and/or other configuration. Rather than requiring up-front data rationalization, end users (e.g., individual users or administrators of subscriber systems 120) may subsequently have the ability to rationalize their data with other 120 and/or the master 130-135 in order to create efficiencies in the management of master data and to reduce the maintenance effort. Accordingly, various rationalization tools may be implemented and supported within the architecture 100 to allow users to combine and share data nodes, properties, and/or hierarchies, all within a controlled and governed framework. In some embodiments, the hierarchy management system 130 may support automated tools to allow users to initiate and perform incremental data rationalizations (e.g., for individual reference data hierarchies) across multiple systems 120 of an organization. Such incremental rationalizations may occur organically through incremental efforts of end users and administrators of subscriber systems 120, as opposed to requiring an up-front and comprehensive matching and rationalization effort.

In such embodiments, the hierarchy management system 130 may provide one or more software tools to allow end users (e.g., human or programmatic software clients) to identify an existing data system/application 121-124 (e.g., a cloud-based application), and then provide an interface to allow the dimensions of the system/application to be managed. For instance, the hierarchy management system 130 may provide a set of rationalization tools that allow end users to "evolve" the data and data management process as they use the various applications/systems 121-124 of the organization. Using such rationalization tools, the hierarchy management system 130 may allow administrative users to load data from applications 121-124 without little or no pre-load implementation configuration. Users also may be able to import dimensions from existing systems/applications, text files, spreadsheets, or database tables with little or no implementation setup (e.g., only the import process requirements). In such cases, the importing of data from applications/systems 121-124 may itself create the requisite chunk(s) (e.g., nodes types, hierarchy sets, node sets, views, and view sections, etc.) that allow dimensions to be imported and immediately managed via the hierarchy management system 130. Additionally, in some embodiments, governance for all changes may be enabled and in effect concurrently with the start-up of the application.

Figure 4:
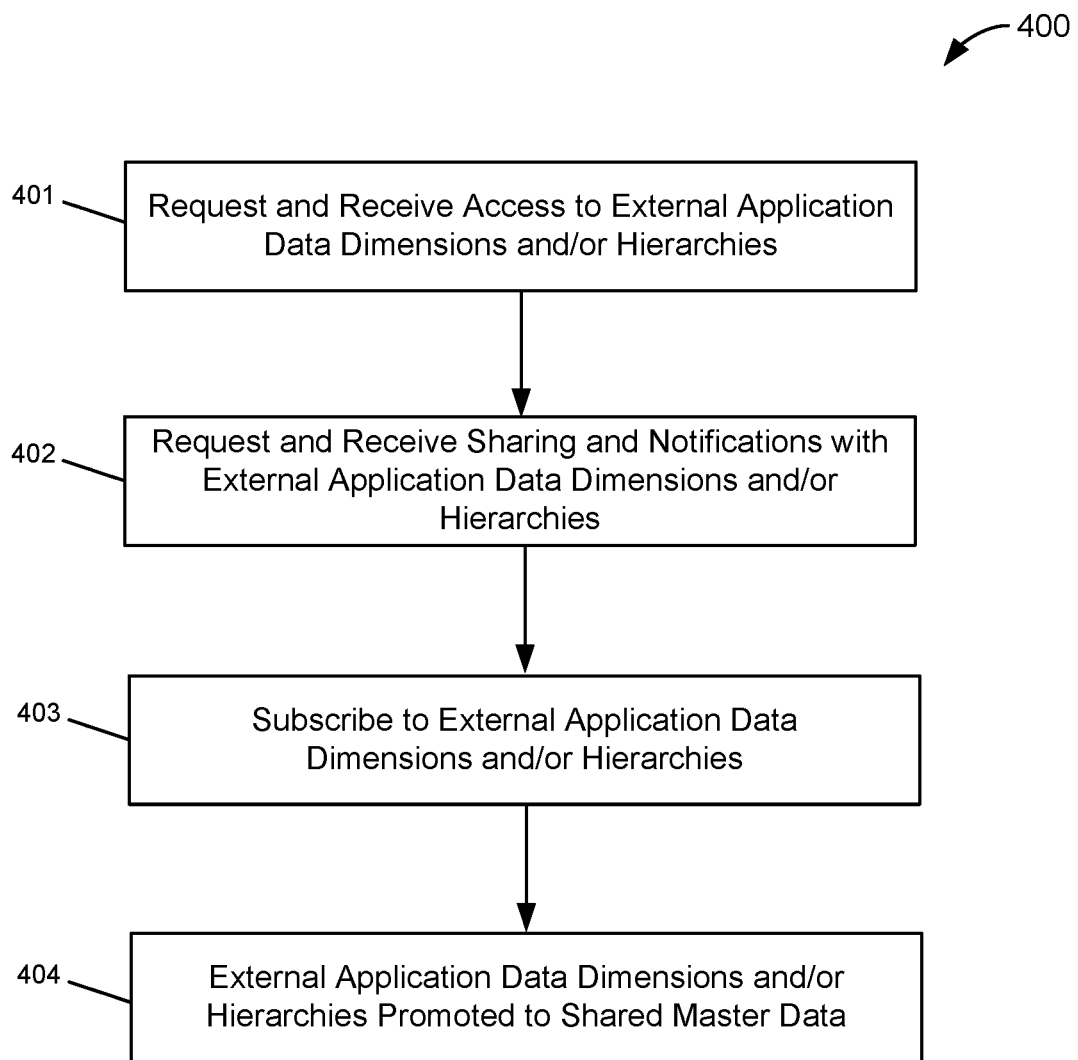
FIG. 4 is a flow diagram illustrating an example process of incremental rationalization, in accordance with certain embodiments described herein.

Referring now to FIG. 4, a flow diagram is shown illustrating an example process of incremental rationalization in accordance with certain embodiments described herein. As discussed below, steps 401-404 in this process each may correspond to separate processes implemented by various components within an organizational architecture 100 for sharing and managing data hierarchies. In some cases, a data dimension/hierarchy sharing may progress from step 401 to 404 as shown in this example, while in other cases the entities involved (e.g., external applications/data systems 120, the hierarchy management system 130, other application-level and organization-level administrators, etc.) may implement only step 401, 402, 403, or 404 for the data dimension/hierarchy sharing solution.

In step 401, a first application 121 executing within the distributed system 100 may request and receive access to one or more data dimensions and/or hierarchies of a different application 122 within the system 100. For example, two end users or administrators of different applications 120 executing within the same organization infrastructure 100 may determine that both applications 120 maintain one or more similar application-level data hierarchies. For instance, application users or administrators may communicate to determine that both applications maintain and user a product dimension/hierarchy 300, or an employee dimension/hierarchy, a customer dimension/hierarchy, etc. In such cases, one or both of the users/administrators of the applications may grant permissions to the other application 120 to view the corresponding dimension/hierarchy. Thus, each application may evaluate the quality of their own data dimension/hierarchy, and may revise their own data dimension/hierarchy based on the corresponding data dimension/hierarchy of other applications 120. In these examples, neither the hierarchy management system 130 nor any other organization-level administrator need be involved to implement the application-to-application permissions in step 401.

In step 402, two or more applications 120 executing within the distributed system 100 may request and receive sharing permissions and notifications for their respective data dimensions/hierarchies. Continuing the above example, if an administrator of a first application 121 determines that a corresponding data dimension/hierarchy in a second application 122 is valuable, the first application 121 may register for sharing and notifications of changes to the corresponding data dimension/hierarchy of the second application. For instance, if a products hierarchy 300 (or any other data dimension or hierarchy) is changed within the second application 122, then the first application 121 may receive a notification of the change and/or permissions to import the change into the first application's 121 own products hierarchy 300. In some cases, the individual applications 120 may be configured to provide real-time notifications (e.g., via email, text, or application-based notifications) to authorized users of other applications 120 that have registered for sharing permissions and notifications. The notifications may contain data describing the changes to the corresponding data dimension or hierarchy, or may direct the authorized user to another location (e.g., via a URL or application admin link) to a separate display screen graphically representing the changes to the data dimension or hierarchy of the other application 120. From the notification and/or related user interface, the authorized user of the first application 121 may view and accept (or deny) the changes from the second application 122, so that the changes to the shared data dimension/hierarchy of the second application 122 may be automatically imported into the corresponding data dimension/hierarchy of the first application 121.

In step 403, two or more applications 120 executing within the distributed system 100 may implement an automated subscription process for a pair of similar or related data dimensions/hierarchies. An automated subscription process may be similar to the sharing permissions and notification process described above in step 402. However, after reaching a high level of confidence with a shared data dimension/hierarchy, a sharee (or recipient) application may determine that notifications are no longer needed and all changes from the data dimension/hierarchy of the sharer application 122 should automatically be transmitted and imported into the corresponding data dimension/hierarchy of the sharee application 121. The automatic receipt and important of changes from an external data dimension/hierarchy into an internal data dimension/hierarchy of an application 121 may be referred to as a subscription. As in the data hierarchy sharing processes described above in steps 401 and 402, the automated subscription process in step 403 need not involve the hierarchy management system 130 or any other organization-level administrative process. Rather, any of the data hierarchy sharing processes of steps 401, 402, and/or 403 may be performed autonomously (and incrementally from 401-403, if desired) by any combination of applications 120.

In step 404, data dimensions/hierarchies from one or more of the external applications 120 may be designated as shared master data and imported into the master data store 135 by the hierarchy management system 130. For example, if two or more applications 120 operating within the organization computing infrastructure 100 are sharing the same data dimensions/hierarchies (e.g., via sharing and notifications in step 402, or automated subscriptions in step 403), the hierarchy management system 130 may determine that the data dimensions/hierarchies should become master data and made available to the applications 120 through a centralized master data store 135 and/or hierarchy management system 130 of the organization infrastructure 100. The determination to import data dimensions/hierarchies of one or more applications 120 into the master infrastructure may be initiated by a request from one or more applications 120, by application-level or organization-level administrators, and/or by automated processes executing with the hierarchy management system 130.

As discussed above, when data dimensions/hierarchies of applications 120 are imported into the master data store 135, the corresponding application-level data dimensions/hierarchies may be deleted. Thus, after the data has been mastered, an application 120 requiring access to the data dimension may retrieve the shared master data dimension using the hierarchy management system 130. In some cases, applications 120 may be permitted to keep their corresponding application-level data dimensions/hierarchies rather than deleting them from the application storage. For example, certain applications 120 may be permitted to append and/or override data from the master with their own data dimensions/hierarchies. As another example, an application 120 may be permitted to maintain and apply an additional (or alternative) set of data node properties, which may be applied by the application to the nodes of the data dimension(s) retrieved from the master. Thus, certain applications 120 may be permitted to append or override the data nodes properties, instead of or in addition to appending or overriding the data nodes themselves. In other embodiments, some or all of the external applications 120 operating within the organization computing infrastructure 100 may be required to use the shared master data dimension as is, without altering or appending any additional data nodes, properties, or relationships, to the shared master data dimension.

The determination to "master" one or more data dimensions/hierarchies from an application 120, by importing the data into the master data store 135 and providing access to the data via policies in the hierarchy management system 130, may be performed by automated processes, manual processes, or a combination of automated and manual processes. For example, referring now to FIG. 5, an example flow chart is shown for determine when and how application-level data dimensions may be mastered within the organization infrastructure. In this example, the hierarchy management system 130 (alone or in communication with the external applications 120) may monitor the various data dimensions being shared, copied, and subscribed to among of the applications 120. For example, in step 501, the hierarchy management system 130 may determine that a particular data dimension or hierarchy maintained by a first application 121 is being subscribed to by three additional applications 122-124. In some embodiments, the system data regarding the number different applications 120 sharing and/or subscribing to data dimensions/hierarchies of other applications 120 may be periodically monitored by the hierarchy management system 130, for example, by periodically requesting and received subscription and/or sharing data from each of the applications 120. In step 502, if the hierarchy management system 130 determines that a particular data dimension or hierarchy maintained by a first application 121 is being shared, copied, or subscribed to by more than threshold number of other external applications 120 (502:Yes), then the hierarchy management system 130 may determine that the data dimension or hierarchy should be imported into the shared master data hierarchies in the master data store 135. In step 503, the particular data dimension or hierarchy from the application 121 is imported into the shared master data store 135, and in steps 504-505 the corresponding data dimensions/hierarchies are deleted from the application 121 that previously maintained the data dimension/hierarchy (step 504) and the other applications 120 that has previously subscribed to the data dimension/hierarchy of the first application 121 (step 505).

Figure 5:
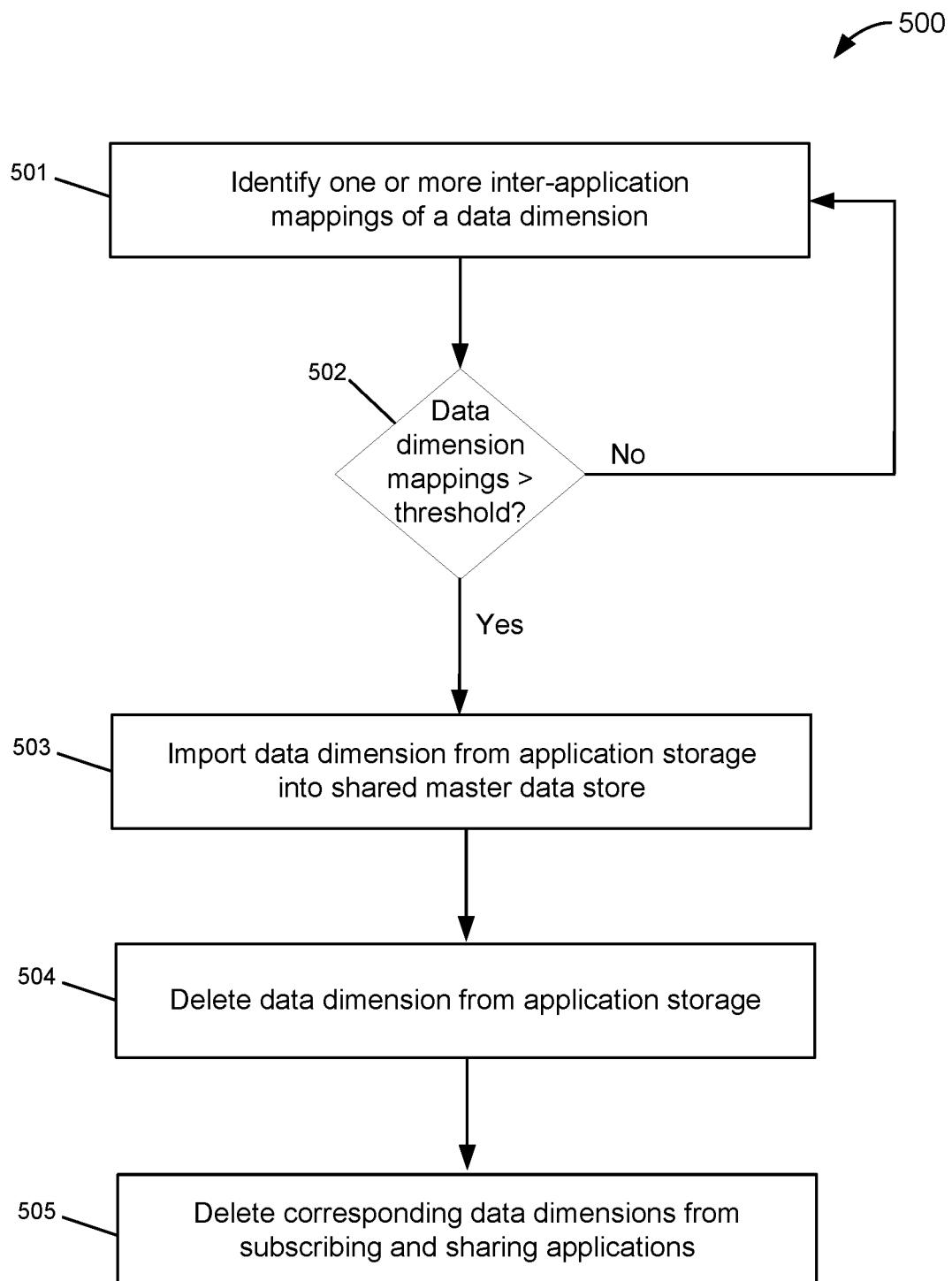
FIG. 5 is a flow diagram illustrating an example process of determining when and how application-level data dimensions may be mastered within an organization, in accordance with certain embodiments described herein.

In the example of FIG. 5, each of the affected applications 120 may be notified and their subscriptions changed so that the data dimension/hierarchy will be retrieved from the hierarchy management system 130 and master data 135. However, in other examples, certain applications 120 may be permitted to keep and use some or all of their corresponding data dimension/hierarchy. For example, the hierarchy management system 130 may determine that some but not all of the data nodes from the data dimension of the first application 121 should be imported to create the shared master data dimension. In this case, the first application 121 may be permitted to maintain an application-level data dimension/hierarchy with the non-mastered data nodes, that can be combined with the mastered data dimension/hierarchy, so that the data dimension/hierarchy of the application does not change. As discussed above, in other examples, certain applications may be permitted to maintain corresponding an application-level data dimension/hierarchy, which may include a different set of data nodes and/or properties that may override or be appended to the master data hierarchy.

Using the hierarchy management system 130 to centrally manage the data hierarchies of multiple subscriber applications 121-124 may potentially provide the advantages of a single point of maintenance for the shared references data, as well as lowering the overall storage requirements of the organization. The incremental rationalization process, by which users and their corresponding applications may make agreements to begin sharing data and metadata between applications 121-124, may move maintenance processes that are initially siloed gradually towards centralized master processes, thereby potentially gaining efficiencies in these processes. Rather than an application moving its reference data from siloed to fully rationalized at once, the hierarchy management system 130 may allow users to evolve their reference data hierachies (or dimensions) from siloed to fully rationalized over time, by rationalizing individual data hierachies (or portions thereof) and/or individual corresponding metadata properties and relationships, thus resulting in as little data disruption as possible. Additionally, the hierarchy management system 130 may be configured to handle the evolution process without requiring external data transformation processes or large manual metadata changes. In some embodiments, the hierarchy management system 130 may be configured to monitor the data systems/applications 120 within the organization, but to allow each new application 120 to be deployed and to initially execute independently (e.g., without knowledge of or data conflicts with any other applications 121-124). Then, at a later time, the new data systems/applications 120 may start sharing data incrementally, by making individual determinations for each application of particular reference data commonalities with other data systems/applications 120 in the organization. The data sharing/mastering process thus may happen incrementally, through a series of small determinations made by end users and/or administrators (e.g., human or programmatic) associated with specific applications 120, and after the initial deployment and execution of the specific data systems/ applications, rather than implementing top-down modeling efforts and/or performing data rationalization during initial configuration of the organization architecture 100.

In some embodiments, the hierarchy management system 130 may provide rationalization tools, accessible to subscriber systems/applications 120, which are configured to be as non-disruptive as possible to the continuing operation of the systems/applications 120. For example, from the standpoint of an application 120 or end user/administrator, the incremental rationalization may be performed by the hierarchy management system 130 so as not to affect the data nodes, relationships, or property values of the application's data hierarchies. Instead, the incremental rationalization processes managed by the hierarchy management system 130 might simply affect the way that the data nodes/properties/relationships are managed and shared. Even in such cases, certain rationalization decisions may affect data on purpose. Thus, incremental rationalization performed by the hierarchy management system 130, by which certain hierarchical reference data, properties, and/or relationships in one or more data systems 120 are determined to be corresponding data and are transitioned from application-specific storage to the master data store, may be performed entirely transparently to the operation of the affected data systems/applications 120. However, certain incremental rationalization processes performed by the hierarchy management system 130 may be intentionally not transparent to the subscriber systems 120. For instance, an organization administrator may determines that all PBCS applications 121-124 will be required to use the aliases from a NorthAmerica-PBCS instance. In this example, the applications 1210124 may see changes to their aliases. However, in some embodiments, without a specific administrative decision to the contrary, the rationalization processes performed by the hierarchy management system 130 may be entirely non-disruptive to the operation of the subscriber systems 120.

In some embodiments, the hierarchy management system 130 may include a number of rationalization tools (e.g., a rationalization workbench), including tools for rationalizing (or mastering) data nodes, properties, relationships, maps, property definitions, chunks, and chunk chains. In some cases, the hierarchy management system 130 may include a set of small, single-purpose tools for each of these types of data, along with the logic to mix and match the appropriate combinations of tools depending on the needs for a particular rationalization, thereby avoiding the use of a single large, unwieldy tool, and also allowing additional rationalization tools to be added through different releases of the hierarchy management system 130. Various examples of different types of rationalizations and corresponding rationalization tools are described in the following paragraphs.

Node rationalization may refer to the process of merging two or more nodes from multiple node types into a single node type. The source node types can be application node types (e.g., a node type that is valid within a subscriber system 120) or master node types(e.g., a node type that is valid within a master data store 135), but the target node type must be a master node type. The target master node type may already exist within the master data store 135, or may be created as part of the node rationalization process. A node rationalization software tool supported by the hierarchy management system 130 may include settings to control how the differences across the various note types are to be handled. In some embodiments, only node types of the same dimension type may be permitted to be rationalized together.

The first step of node rationalization may be to copy the target nodes into the source. This may include copying the nodes from an application node type into a master node type (e.g., for application-to-master rationalization), or may include copying the nodes from one master node type into another master node type (e.g., for master-to-mater rationalization).

Figure 6:
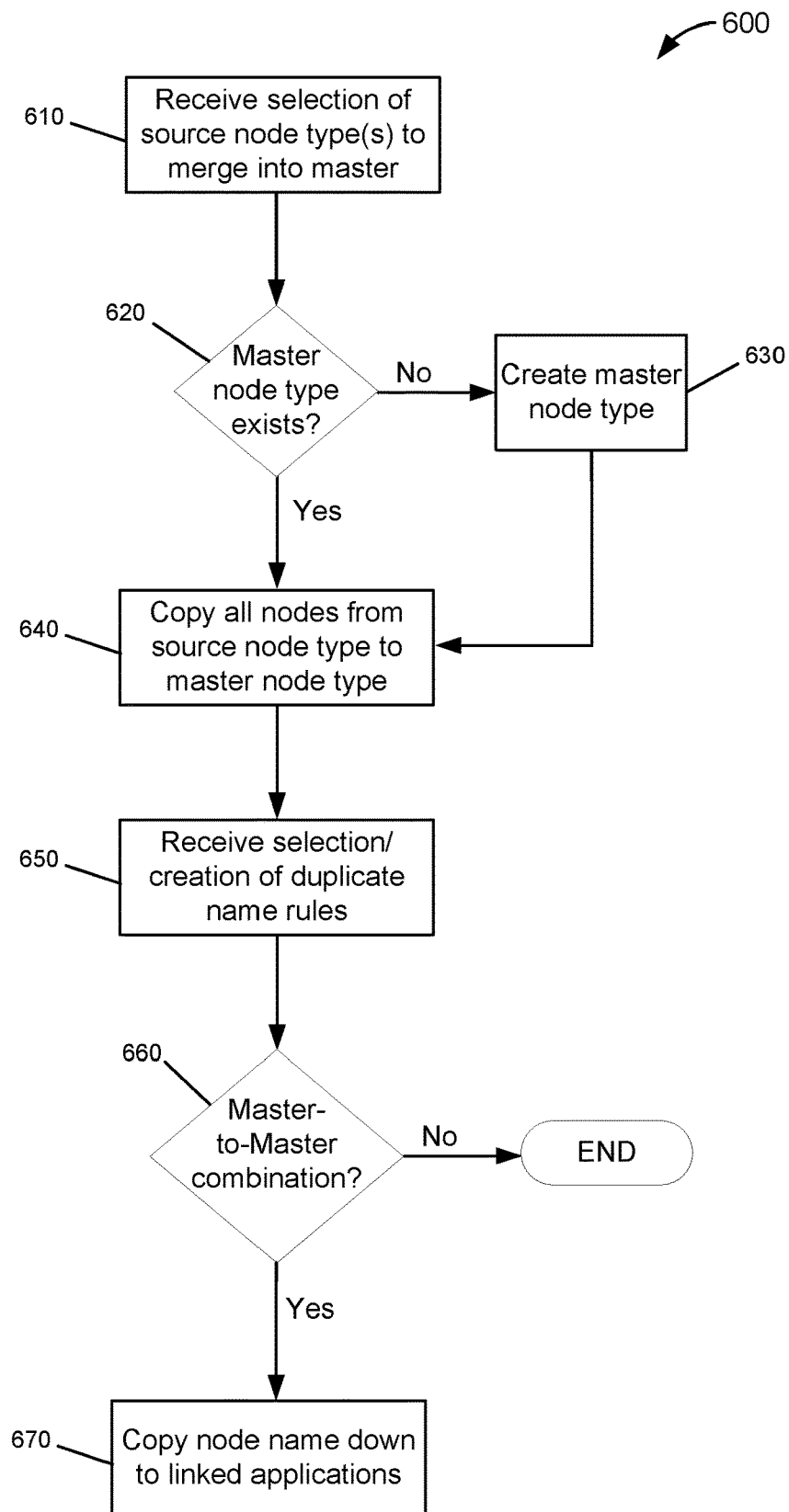
FIG. 6 is a flow diagram illustrating an example process of combining two node types, in accordance with certain embodiments described herein.

Referring now to FIG. 6, a flow chart is shown illustrating an example process of combining two node types. In step 610, the hierarchy management system 130 may receive input (e.g., human user or programmatic input) selecting one or more source node types to be merged into a master node type. In step 620, the hierarchy management system 130 may access the master data store 135 to determine whether or not the master node type already exists. If the master node type does not exist, it may be created as part of the node type combination process in step 630. In step 640, all nodes from the source node type may be copied into the master node type. Copying nodes from one type to another may include, for example, creating a new node ID, and copying the source node name into the target master node name. In step 650, the hierarchy management system 130 may receive input (e.g., human user or programmatic input) selecting and/or defining one or more duplicate name rules to be used to resolve node name conflicts. A node name conflict may occur, for example, when a particular node name already exists in the master node type within the master data store 135. Node name conflict rules may include, for example, prefixing and suffix options, and/or iterative numbering (e.g., using the next number in a series) until a unique node name is identified. Finally, in step 660, if the hierarchy management system 130 determines that the node type combination is a master-to-master combination, then in step 670, the hierarchy management system 130 may copy the node name down to any subscriber applications 120 that are linked to the source master, in order to preserve the existing node names. For example, if ABC is a source node, and ABC already exists in the target master node type, it may be renamed based on the duplicate name rules (e.g., to ABC.1). However, if any of the subscriber applications 120 that use the source master are getting their node name from the master, then the node name ABC may be pushed down to the application level, in order to avoid data disruption in the form of a rename event.

In some embodiments, property rationalization may be performed after node rationalization, and might only be available for application nodes that are shared (e.g., linked to master nodes). Property rationalization may refer to techniques and processes performed by the hierarchy management system 130 that relate to maintaining the property values stored at the master level (e.g., within a master data store 135), and implementing rules that define how those property values are cascaded down to the subscriber applications 120. Additionally, the property rationalization techniques provided may allow survivorship rules to be established that determine how master values may be calculated based on the accuracy and/or frequency of the application-level values.

Hierarchy rationalization may, in some embodiments, be performed after property rationalization to create (or to attempt to create) common hierarchies across applications. Various hierarchy rationalization tools supported by the hierarchy management system 130 may include tools that provide end users the ability to define a hierarchy structure changes in subscriber data systems/applications 120, and/or in the master hierarchies, and have that change affect all of the linked applications 120. However, since not all nodes within all of the master hierarchies may necessarily be needed in all linked application hierarchies, the hierarchy rationalization processes supported by the hierarchy management system 130 may include filtering features that allow users/applications to include or exclude particular nodes that are not in their hierarchies. The filing features that allow including/excluding of nodes may be controlled by mastering rules and/or ownership settings that may determine (1) which data systems/applications 120 are permitted to update particular hierarchies, (2) which applications may be required to take all changes from the master, and (3) which applications have the option of filtering out certain nodes. Additionally, the data systems/applications 120 that participate in hierarchy rationalization may be provided features around viewing nodes that have been previously excluded, with options to re-include them later.

In some embodiments, hierarchy rationalization may differ in scope from the node and property rationalization processes described above, in that hierarchy rationalization may be implemented as an all-or-nothing process in some cases. For example, user-initiated incremental (or step-wise) rationalization might not be supported for hierarchy rationalization in some embodiments, even when incremental rationalization is supported for node and/or property rationalization. In such embodiments, users might not be provided the option of selecting one or more relationships at a time to move to the master. Instead, options may be provided to users/applications via the hierarchy rationalization tools allowing the application to subscribed to an entire hierarchy, or not to subscribe.

Additionally, in various embodiments, the hierarchy management system 130 may support one or more features of hierarchy rationalization processes to make those processes as non-disruptive as possible to the subscriber applications 120. For example, in some cases, robust comparison tools may be configured to show how many changes and filtered nodes will be required to share a particular hierarchy, before the decision to share the hierarchy is confirmed by the user/application. Additionally, the hierarchy rationalization tools may include the option to exclude certain nodes at the application level. In some embodiments, hierarchy rationalization tools may support notification requests that list all changes, thereby providing users/applications advanced information describing how the potential hierarchy rationalization may affect the applications. Finally, certain hierarchy rationalization tools may support versioning and rollback, allowing users/application the option to return to a pre-rationalization state.

In some examples, it may be more efficient to rationalize hierarchies that have a significant portion of shared structure across different application hierarchies. However, in some cases, it may be possible to rationalize two hierarchies that have little or no overlap of shared structure. In such cases, the resulting master hierarchy set may simply have two top nodes with no shared relationships below them. This technique may be desirable, for example, in order to begin a more incremental or step-wise process of building common relationships within the master.

In some embodiments, the hierarchy management system 130 also may support map rationalization. A map rationalization may allow users/applications to rationalize map sets, that is, to move mappings from the application level to the master level for sharing. In some implementations, map sets may be individually rationalizable, like nodes and properties, while in other implementations only all-or-nothing rationalization may be supported for map sets, with include/exclude options as in relationship/hiearchy rationalization.

Additionally, as part of the rationalization process, the hierarchy management system 130 may support property definition rationalization. That is, the rationalization tools of the property definition rationalization may allow administrative users to combine two properties into a single property.

In some embodiments, the hierarchy management system 130 also may support chunk rationalization. Chunk rationalization may include the ability to replace application level objects in a chunk chain with master level objects. Processes for replacing an application-level chunk object with a master chunk object may include comparing the application node types in the definition of the application chunk object to the master node types in the definition of the master chunk object. A node type mapping feature may be used to facilitate such comparisons. In some cases, only objects with valid application node type to master node type mappings may be used during a chunk rationalization process. However, even when valid node type mappings are considered, replacing an application chunk object with a master object may potentially be disruptive to the subscriber applications 120 in some cases. Thus, in some embodiments, one or more chunk rationalization tools supported by the hierarchy management system 130 may allow the user/application initiating a potential chuck rationalization to see and review data differences due to the replacement of the old application chunk object with the new master object, before committing to the chunk rationalization.

In various examples, two different styles of chunk rationalization may be supported: a promotion chunk rationalization and a replacement chunk rationalization. In promotion chunk rationalization, an application object may be promoted to a master. When promoting an application object to a master, the hierarchy management system 130 may be configured to automatically create the master based on the application object, and may attempt to replace (to the extent possible) application node types with master node types, based on the node type mappings. In replacement chunk rationalization, an application chunk may be replaced with an existing master. When replacing an application chunk with an existing master, the difference feature of the rationalization tool may be used to inform the user/application what will change due to the replacement. Additionally, in embodiments, a notification request may be optionally generated, or may be required, for view sections that incur any data changes due to the replacement. Additionally, because of the complexity of replacing chunk chain objects, the hierarchy management system 130 may include the ability to lock certain chunk objects, and their associated chains, when doing chunk rationalization.

Chunk chain rationalization (CCR) also may be supported in some embodiments. Chunk chain rationalization tools of the hierarchy management system 130 may support promoting of validations and user groups up a chunk chain, in order to get more reuse and promote standardization. In some cases, chunk chain rationalization may be performed so as not to affect the actual chunk objects themselves. A CCR tool also may include a user interface with a visual designer component, to allow users/applications to view and maintain the placement of validations and user groups on the chunk chain. The same or a similar visual component may be used to allow users/applications to inspect the chunk objects, their place in the chain, and other dependent objects.

Governance Pools in Hierarchical Systems

Certain techniques (e.g., methods, systems, non-transitory computer-readable storage memory storing a plurality of instructions executable by one or more processors, etc.) described herein relate to implementing governance pools in hierarchical data systems. In some embodiments, an automated governance process may be used to process and expedite all data and metadata changes within the master data store 135 and/or individual system data systems 121-124. As described below, the automated governance process may determine a number of different contextual pools (e.g., an enrichment pool, approval pool, review pool, etc.), output invitations to users of the contextual pools, and manage feedback received from users of the contextual pools. The users of the particular contextual pools may be determined based on the type of change, and/or any data correction/enrichment that needs to occur, and the appropriate users will be invited to the various processes (e.g., approval, enrichment, and review) for the requested change. Along with changes to nodes, relationships, and property values, users will be able to request changes to metadata, like new properties, new validations, changes to existing workflow, etc. In various embodiments, such automated governance process may be invoked in response to changes to nodes, relationships, and property values, as well as requested changes to metadata, like new properties, new validations, changes to existing workflow, etc.

Figure 7:
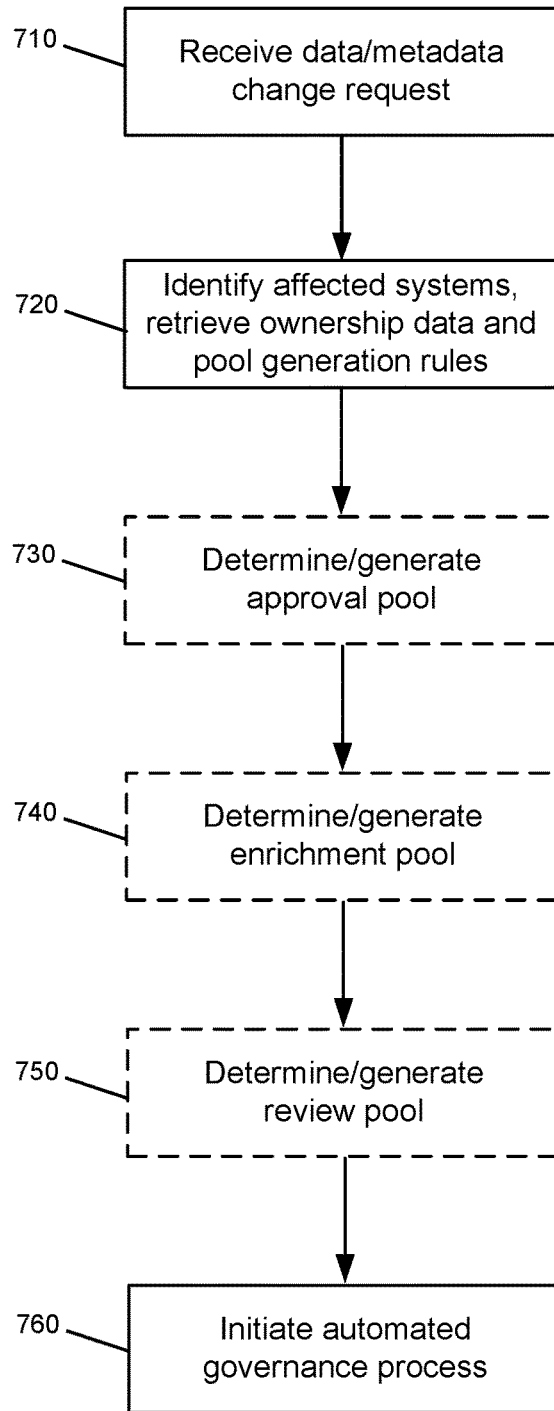
FIG. 7 is a flow diagram illustrating an example process of generating contextual pools in response to change requests, in accordance with certain embodiments described herein.

Referring now to FIG. 7, a flow diagram is shown illustrating an example process for generating a plurality of contextual pools in response to a change request. In step 710, a receive is received, for example, by a request object within the hierarchy management system 130 or elsewhere within a hardware/software architecture 100. In this example, the request may correspond to a request to add/modify/delete data or metadata (e.g., properties) from the shared data within a master data store 135. As discussed above, the master data may correspond to reference data shared by multiple different heterogeneous systems 121-124 implemented within an organization's architecture 100. In step 720, the request object may identify one or more systems/data hierarchies affected that would be affected by the requested change, and may retrieve the ownership data associated with each of the requested systems/hierarchies and a set of pool generation rules. Steps 730-750, one or more of which may be optional in various embodiments, correspond to the determination/generation of an approval pool, enrichment pool, and review pool, respectively. Each of these pools may be determined dynamically, based on the current set of rules for pool generation, the affected systems currently linked to the system for which the change was requested, and the current owners of the affected/linked systems. Although three separate contextual pools are used in this example, more or less pools may be generated in other implementations. Additionally, in some embodiments, users included in one or more contextual pools during a change request may opt of the current change request process and/or additional processes generated by change requests for same objects in future. Finally, in step 760, the request object may initiate the automated governance process, through which the multiple users identified in the various pools may collaborate to review, modify, and approval the requested change.

As discussed below, after the initiation of the automated governance process, an object model may handle the processing of the interactive requests by inviting and coordinating communications with the users in each of the determined contextual pools. In some cases, the object model might not enforce any order with respect to the users in a particular contextual pools; however, responses from all members of a first pools must be received before the automated governance process proceeds to the next pool in the sequence. In this example, the approval pool is an automatically generated set of users that are required to approve the requested change. This list may correspond to different owners/administrators on the different linked systems that would be affected by the requested change. After completing the approval phase, the automated governance process may proceed to the enrichment phase, which is designed to retrieve and/or determine any required information that was not provided with the change request, or any incorrect information associated with the change request. As an example, in a request to set up a new general ledger account, the enrichment phase may include one or more users to provide needed international codes, tax codes, etc. The enrichment process also tracks what process steps still need to be completed, evaluates the validity of the contributions from the pool users, and determines which users are delaying the overall change request process. After the enrichment phase, the change request is complete and valid. Next, the review pool includes users that are required to give final approval for the completed and valid change request. Finally, following a successful review phase, a committer may access the automated governance system to apply the change.

Unlike systems in which every workflow model must be pre-configured and each stage and participating group defined up-front, the automated governance process described herein may use an inference-based workflow model that uses security and roles to determine which users should be invited into the governance process at which points. As noted above, the pool approach may allow users to work in parallel and does not require users to work on a request in any particular order. When a particular user opens a request, that user may see only the items for which they have access and the issues that they can fix. Additionally, a user may be able to do some partial work on a request and then throw it back in the pool for a different user to finish. In the above example, the only required steps in the request may be the request submission step and the commit step. The processing through the interactive and collaborative pools in the approval phase, enrichment phase, and review phase may occur based on the settings of the view and the correctness of the request. For example, a change request to add a new cost center into a shared data hierarchy may require an approval, whereas an update to PBCS properties may only require a review.

Figure 8:
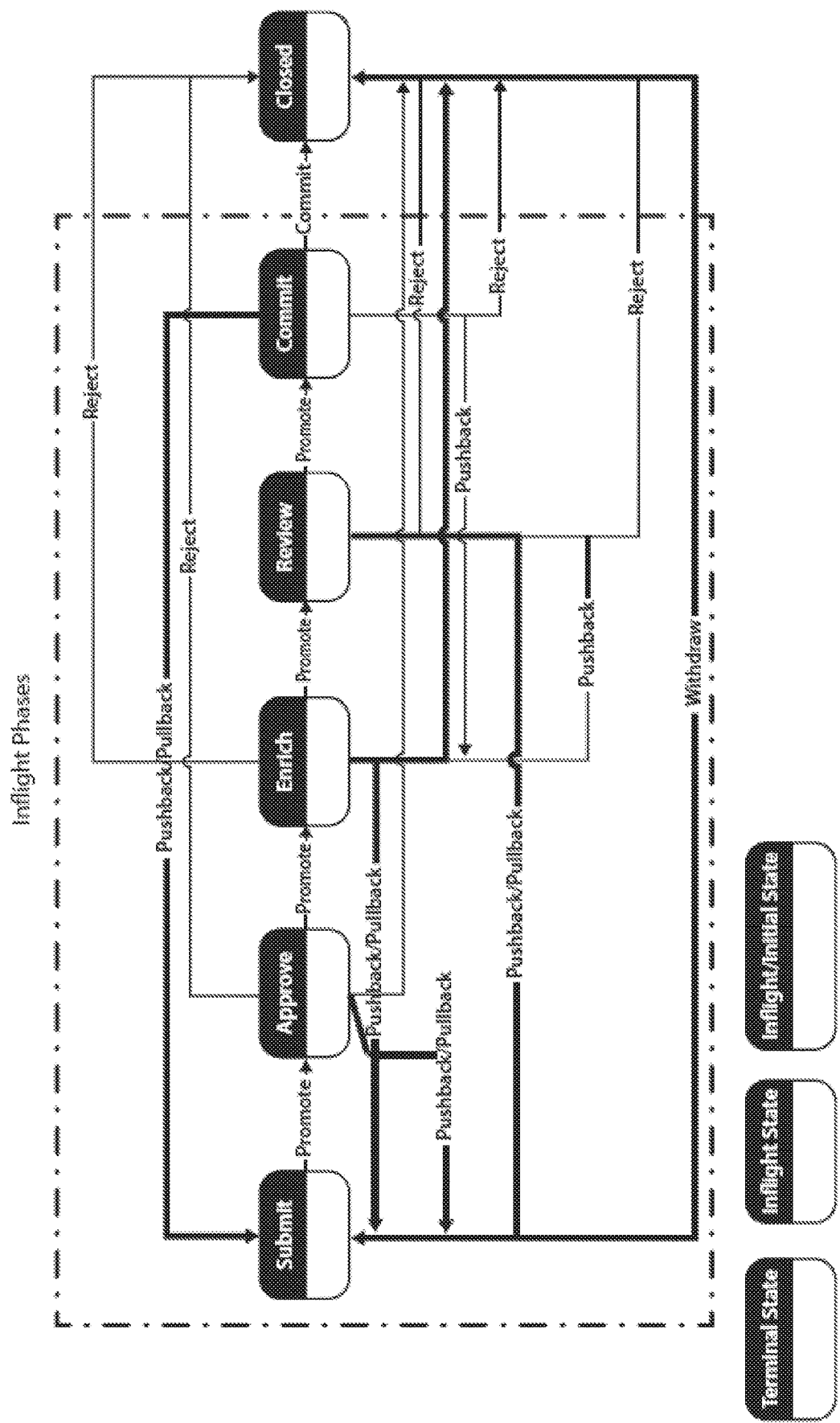
FIG. 8 is an example state diagram illustrating a state machine for processing change requests, in accordance with certain embodiments described herein.

Referring now to FIG. 8, an example state diagram is shown illustrating a state machine for processing change requests according to certain embodiments described herein. The state diagram of FIG. 8 includes a submit state, an approve state, an enrich state, a review state, a commit state, and a close state. As discussed above, in different embodiments, the state diagram may have more or less states. Also shown in FIG. 8 are the transitions, represented the process of the request object moving between states. As discussed below, each transition may be associated with a combination of one or more conditions/actions that may cause the request object to transition between states. As shown in FIG. 8, the following illustrative examples corresponds to state transition actions that may be performed by a user and/or by the system. Promote transition actions move the request to the next phase. In this example, promotion from the Commit state results in the request being committed. Pushback transition actions change the phase (or state) to either the Submit or Enrich states in this example. In some cases, the user may decide which phase to send the request back to. For example, as shown in FIG. 8, if the request is in the Review or Commit phase, the user may select which phase to send the request back to. Withdraw transition actions correspond to a withdraw of the request by the submitter. Once the request is withdrawn, the lifecycle may be complete and the state changes to the Closed state. In some cases, in order to withdraw a request the submitter may first have to first pullback a request. Pullback transition actions, in some examples, may be done only by the submitter. Pullback actions may be performed in any phase. For example, a submitter can pullback a request to either make a modification or to withdraw a request. Escalate transition actions may change the state of the request, while keeping the request in the same phase. Reject transition actions correspond to the lifecycle of the request being completed. In some cases, reject transition actions may be implemented to differentiate from pushback, where in reject transitions the request is sent to closed phase. Commit transition actions correspond to the committing of a request by the user. In such cases, the request may go to the closed phase and the request changes may be applied to the target view.

Figure 9:
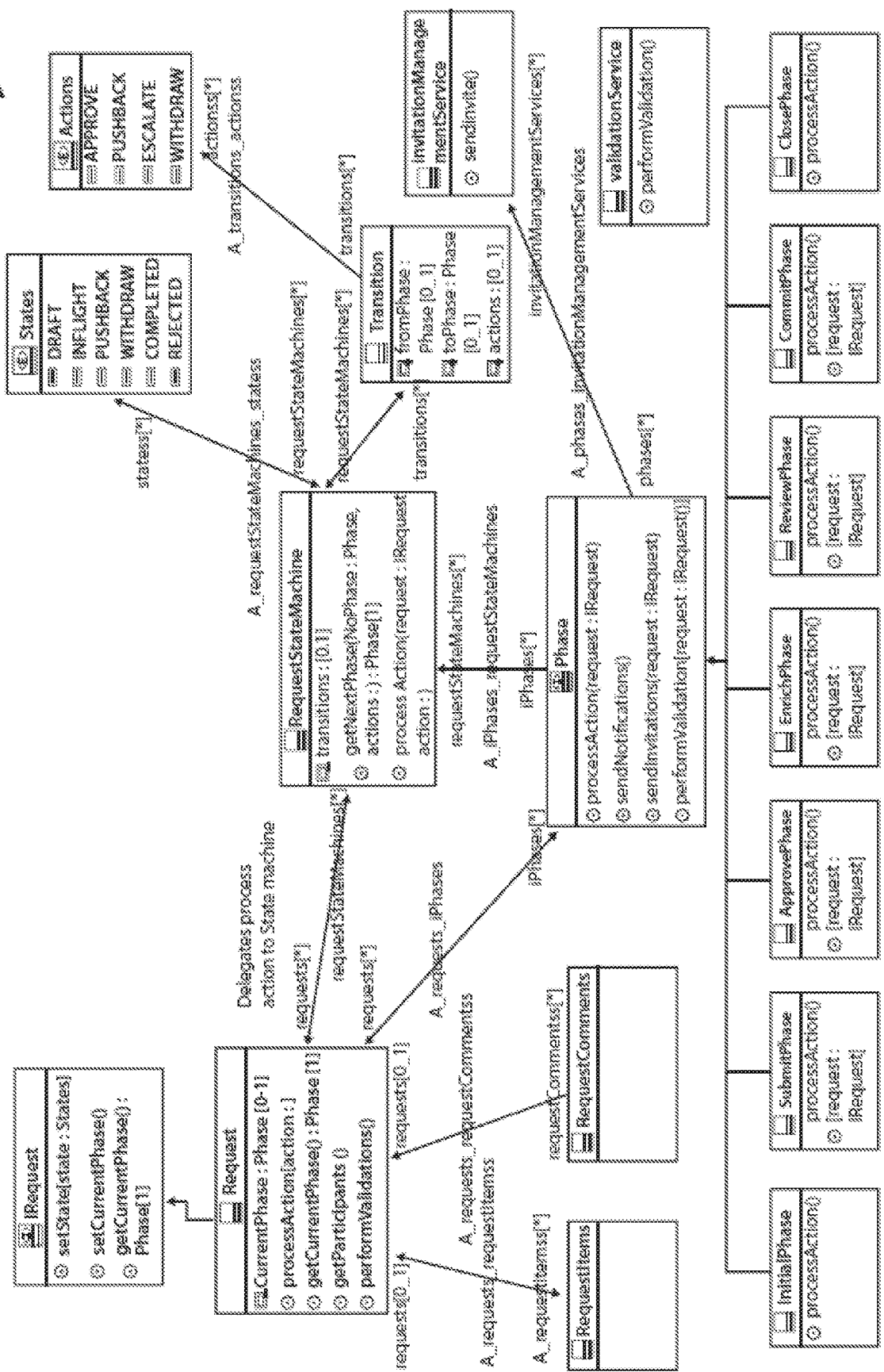
FIG. 9 is an example object model that may be used to handle the processing of change requests, in accordance with certain embodiments described herein.

Referring now to FIG. 9, an example object model is illustrated that may be used to handle the processing of change requests, for example, through the state transition of FIG. 8, including the various services that may be invoked to support the request lifestyle. As shown in FIG. 9, the end user (e.g., human or programmatic client) may interact with the request object. In some embodiments, the end user may never interact with the state machine or phase model. All user actions may be recorded within the request. Depending on the action the user takes (e.g., submit, promote, validate, reviewed, commit, etc.), the request may first record any actions, and then may delegate the orchestration of the request to state machine by providing the handle to request object. That may allow the state machine and phase implementation to call various methods on the request object.

In some embodiments, this may be implemented as a multi-user system, and may be configured to support many concurrent users working on a request at the same time, potentially on different items. However the state machine may work on the request as a whole and run validations at both the item and request level. As such any create, read, update and/or delete (CRUD) operations performed on the request may be synchronized. This may ensure consistency of the system. However, the system also may implement an optimistic locking mechanism. In some cases, the system might not support a provision for the user to claim and lock a request. All users may work on a request at the same time. By ensuring that CRUD operations on requests are synchronized, the system may allow multiple users to process the request simultaneously. This may potentially lead to users seeing stale data, which the system may handle, and inform the user that the state has changed since they last queried.

The object model shown in FIG. 9 is one example design of how the state machine shown in FIG. 5 may be implemented. The design shown in FIG. 9 may implement certain requirements and provide certain advantages. For example, the object model of FIG. 9 may be designed to easily accommodate the addition of new transitions and conditions, and may provide a modular way to handle different behaviors in different states. Additionally, in the object model shown in FIG. 9, both transitions and conditions may be configurable and may require minimal changes to the code. Additionally, the request object model may be agnostic of the state machine and its implementation. The model also may allow for the addition of new functionality, for example, relating to the state behavior, in a incremental and non-invasive manner, and also may allow for the addition of different request types in a seamless manner.

The object model shown in FIG. 9 includes three distinct parts: Requests, RequestStateMachine, and RequestPhaseModel. In this example, the requests may store a pointer to the current phase that the request is in, and nothing else. The request may have no knowledge about its lifecycle events; however, it may provide the necessary methods for the clients to manage lifecycle events. As noted above, the request is the object with which clients/users interact. As such, the request interface may expose all the necessary lifecycle events, although the request may delegate lifecycle management to the state machine.

As shown in FIG. 9, the object model may implement the state machine for change requests. Lifecycle management of the request may be delegated to the state machine. The request may be the primary client of the state machine, and every time the user performs an action on a request, the request may delegate the action to the state machine. In some embodiments, the state machine may perform, for example, the following four functions. First, the state machine may introspect the incoming request and determine if any operations should be performed in the current phase. This may be done by incoming the appropriate lifecycle methods on the Phase Interface. The proposed phase design may a) provide common functionality across all phases while allowing for the option to override any phase specific behavior in the inherited classes, and 2) provide functionality to easily add any new phases in the future. Second, the state machine may query the transition map to determine the next phase based on the action performed by the user. As noted above, the user may be a person or an automated action instantiated by the system. Once the next phase is determined, the state machine may call the appropriate lifecycle methods for that phase. Third, the state machine may set the phase in the request object. And fourth, the state machine may return appropriate status back to request to report back to the user, if required.

In this example, the Request Phase Model portion of the model may be responsible for handling the various phases of the request. The model may provide the flexibility to both provide common functionality shared by all phases as well as the ability to override and augment behavior in any phase as required. This may also very easily be exposed to handle phases of different request types.

Additionally, the Invitation Management Service in this example may send out notifications to all participants, based on approval group setting with a link to the request and the action they have to take. If a user has previously opted out, they should not be sent a notification. The Invitation Management Service also may handle auto-renege, so that when a user performs an action, the Invitation Management Service may be invoked to determine if the invitation can be reneged from other participants. If so, then the user will no longer see the notification in their queue. Opt-out information may be preserved by the Invitation Management Service during pushback. Additionally, the Invitation Management Service may update the request for the list of invitees. This may ensure that repeated invitations are not sent. Other things like opt-outs and auto-renege also may require this information. This information may be maintained per phase as the list of invitees may be different in different phases. A new data model object may be created to track all the invites and action taken by participants.

The validation engine may be configured to run both request and request item level validations for the phase in questions. In some embodiments, most or all validations of the current and all prior phases may have to be run during the validation process. The validation engine also may perform the necessary CRUD to update the request and request item specific tables. In general, validations mayu performed on data that the user is requesting, for example, nodes and property values. In some embodiments, there may be three distinct categories of validations: user-defined validations, system validations, and phase validations.

User-defined validations are validations defined by the user. These validations may be functional in nature, or may require adherence to a certain business process. The system may expose an interface for users to create and manage user-defined validations. These validations may then be tied to a view, which in turn may be executed when changes are requested on a view. Validations also may be defined up and down the chunk chain, and the engine may run all the validations as appropriate and report back status to the phase.

System validations might not be defined at any location, but may be run as part of every request to ensure consistency of the system. Some examples of system validations include validating the uniqueness of names, validations to detect foreign key violations, validations to detect loops and cycles in a hierarchy. If the system detects any system validation failures, the request may automatically be sent back to the submitter for modification. Until the violations are addressed, the system may not allow the user to promote the request to the next phase.

Phase validations may include different validations specific to different phases. For example, when a request is submitted, a specific set of submit phase validations may be performed. A severity may be assigned to each validation, and the severity may determine if the request is promoted to subsequent phase. For example, if a validation failure is a warning, then a notification may be sent and the request may be promoted to the Approve Phase. Otherwise, the request may not be moved, and the submitter may be informed of the validation failure(s). In some embodiments, when a request reaches the enrich phase, all validations may be executed. Based on that new request, actions may be created and invites sent to stakeholders based on approval group settings. Remedy actions may include, for example, actions such as creating a new child, moving an existing node, stranded parent, etc. Similarly, the commit phase also may run all the validations, both on entry and just before the request is finally committed to the system. Validation errors may be flagged in the request, and the users may be informed based on the approval group settings for this phase. Users may either take action on those validations, or may push the request back to the enrich or submit phase.

After the request is committed, new requests may be spawned off for certain use cases, such as for membership requests and/or notification requests. For example, for a membership request, if the object is mastered, then other views may have subscribed to the changes and they may be informed via a membership request to either include the changes. In a notification request, the changes done may be propagated to another application/view, and the stakeholders may be informed of the change.

In some embodiments, when a request is pushed back or when any backward movement occurs, any and all approval flags may be cleared out. This may force re-approvals as the request moves back through the pools. New notifications may be sent out once a request is pushed back. Additionally, in some cases, an instructional request may be transmitted to make sure that the request description is changed. In such cases, this validation may not be cleared, but the person pushing back may be asked if they want to reset the validation.

The Policy Compliance Engine is potentially a separate service, or may be implemented as part of the validation service. The policy compliance engine/service may be responsible for ensuring compliance to the business process. Policy compliance might not focused on the actual data, but may verify compliance of policies such as the four-eyes principle, a policy to require approval and promotion in each phase, a policy designating how pushbacks will be handled, etc.

Additionally, validations may be triggered at various points of the request lifecycle. Depending on the validation, the system may determine when a particular validation is fired. The three possible trigger points of a validation may be OnSubmit (e.g., by user in the submit phase), OnPromote (e.g., initiated by a user or the system), or OnDemand (e.g., may be triggered in any phase by an explicit validate action).

Application Materialization in Hierarchical Systems

Reporting systems with data visualization functionalities can provide users with the capability to convert diverse data into information that can be easily visualized and deciphered to exploit the information and learn more about the business. Visualization components can emphasize high-level patterns and trends in large and complex datasets. One way of presenting vast amounts of data as comprehendible information is by representing the data in a treemap format. A treemap is a visual representation of a dataset, which is typically hierarchical in nature.

A treemap generally includes a collection of two-dimensional cells of rectangular shape, each of which represents one or more data entries of the dataset. The cells of a treemap have characteristics, such as area, color, and texture, that represent the data. The cell characteristics may also be known as graphical attributes. If the dataset is in the form of a table in a database, the rows of the table may be represented by treemap cells and the columns of the table may represent various data dimensions. A data dimension is a set of related data values such as the values in a column of a database table or correlated fields in an XML file that are marked with a common tag. The data dimensions may be mapped to different cell characteristics of the treemap visualization. Thus, a viewer of the treemap can gain insight into data by examining a grouping of cells and cell characteristics.

Certain techniques (e.g., methods, systems, non-transitory computer-readable storage memory storing a plurality of instructions executable by one or more processors, etc.) are described herein to allow users to interact with their data hierarchies and master data through management of materialized, application-centric views. In some embodiments, a single user interface may be provided to allow users to perform both application materialization of the user's applications, and master data management. A hierarchy management system 130 and/or other components within an organization's software/hardware architecture 100 may generate and render user interfaces through which users may manage their data hierarchies alongside the master data, using similar/identical views for materialization of application data and master data. In other words, users may be able to view/edit their application data hierarchies and/or master data in the same manner and at the same time. The data sharing rules pertaining to the application hierarchies and master data may be implemented automatically behind the scenes and transparently to the user. Thus, using the application materialization techniques describe herein, users may share their data via incremental rationalization with other users/applications, while continuing to use their application view without any noticeable changes, thereby making rationalization completely transparent to the users. The user's application view may remain identical, but the underlying rules that maintain and manage the master data/rationalization may automatically synchronize through the master.

Figure 10:
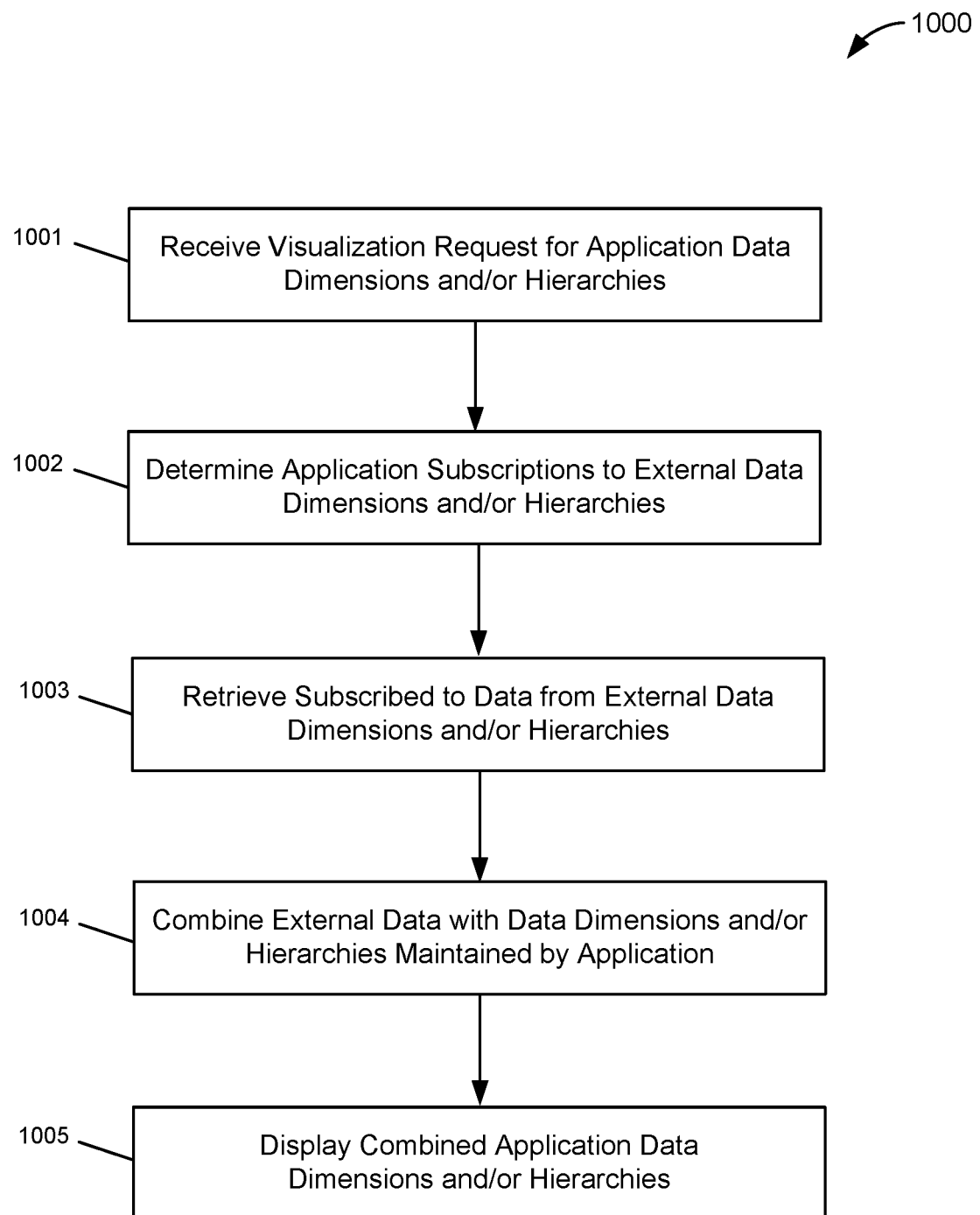
FIG. 10 is a flow diagram illustrating an example process of generating contextual pools in response to change requests, in accordance with certain embodiments described herein.

Referring now to FIG. 10, a flow diagram is shown illustrating an example process for materializing (or visualizing) the data dimensions and/or hierarchies of an application 120, when some or all of the application data is mastered. In step 1001, a visualization request is received for an application 120 operating within an organization computing infrastructure 100. The request may be received via the application 120 itself, or using an administrative tool supported by the application 120 and/or the hierarchy management system 130 to allow authorized users to view and interact with graphical representations of their data dimensions and hierarchies. The request also may identify a view level at which the data hierarchies for the application 120 are to be visualized. In some cases, the view level simply may be the top-level application view, which may correspond to a request to view all of the data dimensions/hierarchies associated with the requesting application. In other cases, a user may identify a particular data hierarchy, sub-hierarchy, or dimension as the "view" for the materialization request.

In step 1002, in response to the visualization request in step 1001, the application 120 may determine one or more external data hierarchies or dimensions which store at least a portion of the requested application data. For example, as discussed above, an application 120 may subscribe to particular data dimensions or hierarchies from other external applications 120. Additionally, some or all of the requested application data may be mastered, and thus may reside in a master data store 135 managed by a hierarchy management system 130. Thus, in step 1003, the application 120 may retrieve various application data from one or more subscribed-to external applications 120 and/or from the master data repositories of the infrastructure via the hierarchy management system 130. Depending on the application visualization view requested in step 1001, the application 120 might or might not need to retrieve data from all subscribed-to external systems and masters. For instance, if the visualization/materialization request corresponds to a data view of a particular data dimension maintained solely by the application 120, then no data retrieval from an external application or master may be necessary, even if the application 120 subscribes to external applications and/or master data for other data dimensions.

In step 1004, the application may combine data received from external applications 120 and/or master data in step 1003, with additional data maintained by the application 120 itself. For example, as discussed above, certain applications 120 may permitted to maintain their own version of an application-level data dimension/hierarchy, with non-shared and non-mastered data nodes, properties, and/or relationships. In such cases, application 120 may retrieve a portion of the requested data to be visualized from subscribed-to external applications and/or master data, and then combine the retrieved data with the non-shared and non-mastered data maintained internally by the application. 120. During the combination process in the 1004, the subscribed-to or master data may be modified based on the preferences and/or authorization level of the application 120, for example, by adding or modifying the properties or relationships of retrieved data nodes, and/or by appending application-level data nodes to a master data dimension or hierarchy retrieved via the hierarchy management system 130. Finally, in step 1005, the combined application data may be displayed, at the requested view level, using interactive graphical interfaces to represent the requested data dimensions and hierarchies.

Additionally, in some embodiments, the hierarchy management system 130 may present the user with data records and relationship structures that are filtered and shaped similarly to their subscribing application. Additionally, the scope of the changes may be aligned with the subscribing system's integration methodology. For example, the integration may support sending entire datasets, individual records, or a set of changes based on a last integration event. The hierarchy management system 130 may use the various underlying functionalities described herein, such as application views and application adapters, to present users with a dimension editing experience that is similar or identical to the external application's dimension editing experience.

Figure 11:
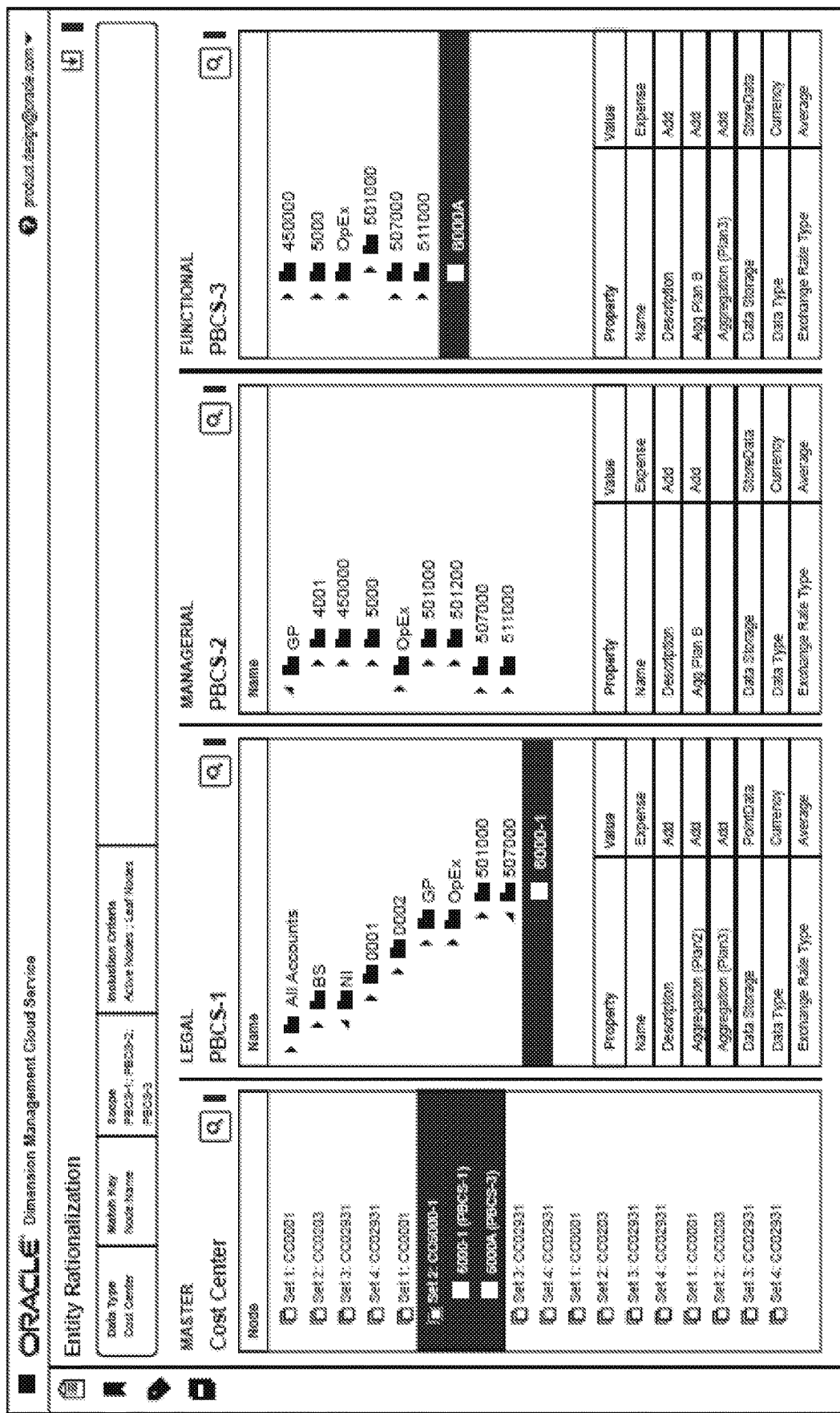
FIG. 11 is an example screen of a user interface illustrating various application materialization techniques, in accordance with certain embodiments described herein.
Figure 12:
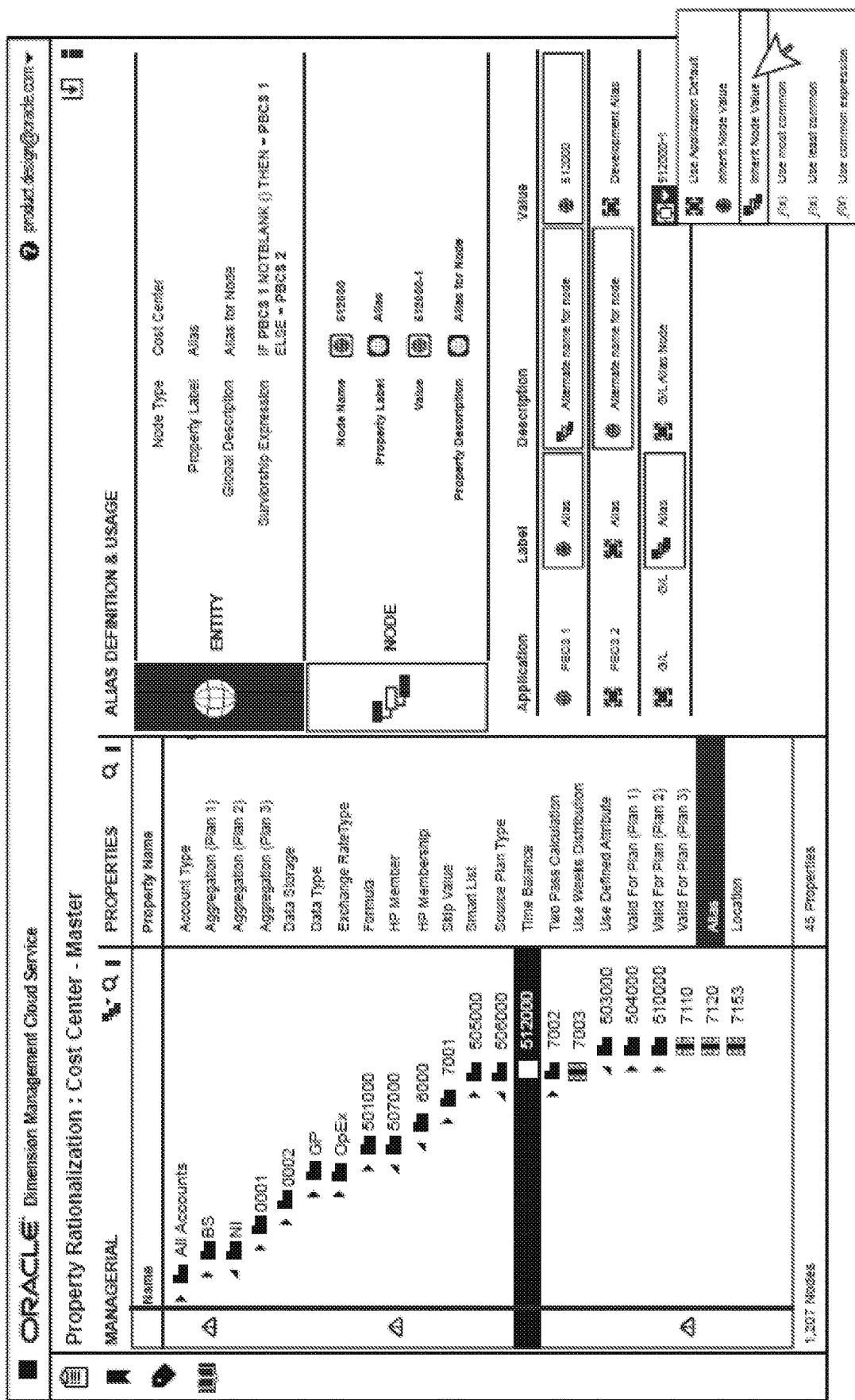
FIG. 12 is another example screen of a user interface illustrating various application materialization techniques, in accordance with certain embodiments described herein.
Figure 13:
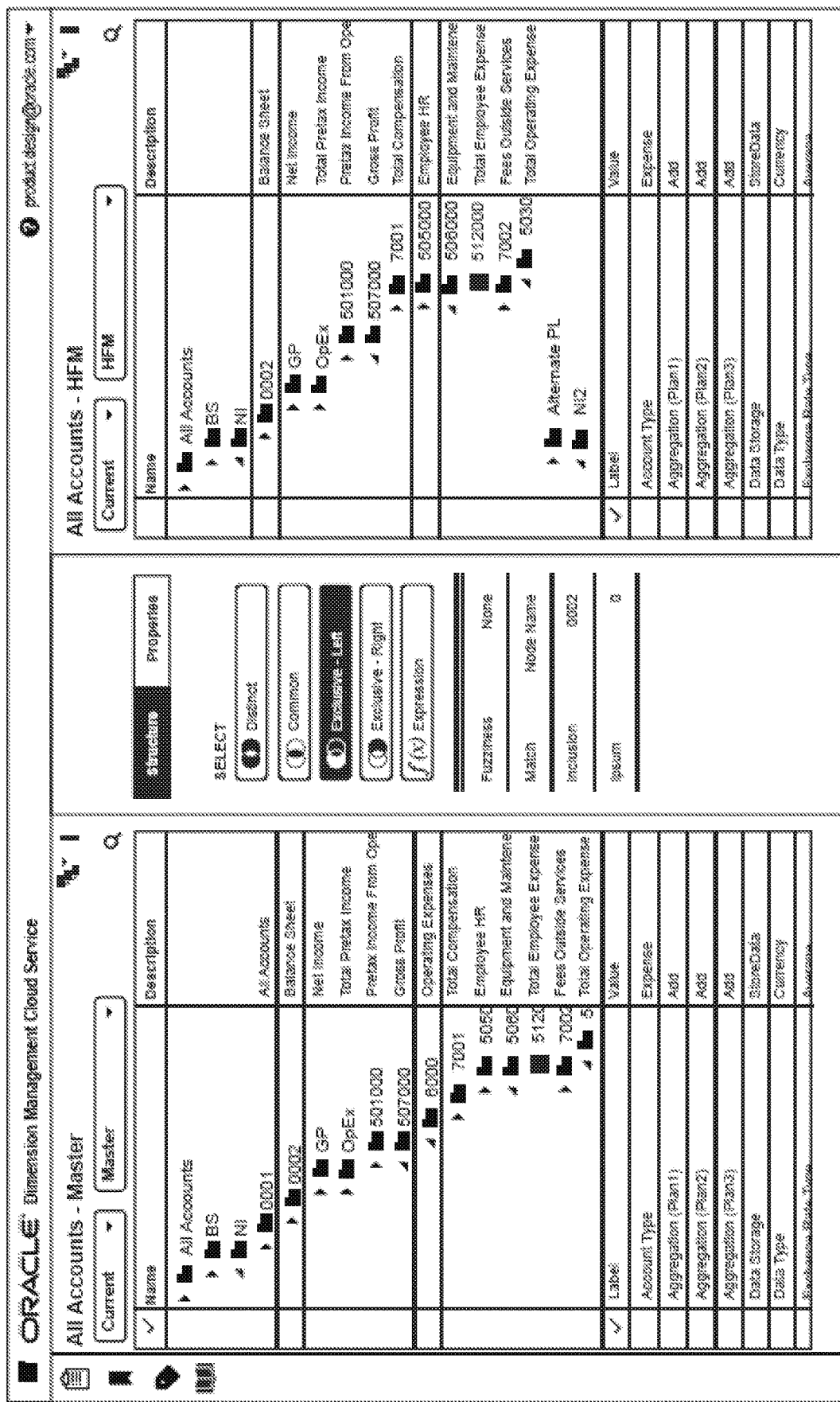
FIG. 13 is another example screen of a user interface illustrating various application materialization techniques, in accordance with certain embodiments described herein.

Referring briefly to FIGS. 11-13, three example user interfaces are shown illustrating the application materialization techniques summarized above. In FIG. 11, an entity rationalization user interface is shown that displays a graphical hierarchical view of a master and three application hierarchies. The user interface in FIG. 11 identifies the reference data overlap between the three application hierarchies, and the corresponding master data. Users may view listings of properties for the nodes in each of the three application hierarchies, and as shown in this example, the properties for an entity rationalized across multiple application hierarchies need not be the same in each of the application hierarchies. Using the features within the user interface of FIG. 11, users may view nodes and properties, rationalize nodes across multiple application hierarchies, and/or change existing rationalizations.

In FIG. 12, a property rationalization user interface is shown that displays a graphical hierarchical view of master data, along with a property list and a property definition and usage interface. Using the features within the user interface of FIG. 12, user may view, create, and modify rationalizations for metadata properties between different nodes across different applications. In this example, the "alias" property within the "5120000" node of the master has been selected, from which the user may define property rationalizations to three applications. Additionally, the user may define the property value within the master using the survivorship expression shown in this example.

In FIG. 13, an application materialization user interface is shown that displays a user's application hierarchy view alongside a corresponding master data view. As discussed above, the user interface shown in FIG. 13 may allow the user to manage the application hierarchy alongside the master data, using data sharing rules pertaining to the application hierarchies and master data that are implemented automatically behind the scenes and transparent to the user. In this example, the "Select" menu at the center of the interface may allow the user to customize the hierarchical views based on the type of data overlapping between the application and master.

As noted above, the system may use application views and application adapters to present users with a dimension editing experience similar to the external application's dimension editing experience. Additionally, the application materialization techniques described herein may relate to the concepts discussed above by which organizations may implement and begin using systems without any up-front data rationalization and/or other configuration. Application materialization is another example of a "zero touch launch" feature which may be used without pre-modeling and pre-configuring requirements. In some embodiments, the application materialization described above may be used as soon as application is registered and its data has been imported, without needing any further configuration.

In some embodiments, application adapters may provide the logic to achieve the on-boarding requirements listed above. This may include the basic information for synchronizing (e.g., importing and exporting), as well as the node types, properties, and validations that may be required for particular application types. Additionally, an application adapter may provide the capabilities to perform whatever discovery is available on the live instance of the application and supply the configuration options that drive the application registration process. In certain examples, a particular PBCS application adapter may perform the following actions as part of registering the PBCS1 application. First, the PBCS application adapter in this example may ask the user for connection information. After receiving the connector information, the PBCS application adapter may then connect to PBCS1 and determine which dimensions, UDAs, and other configurable data elements that it is using. The PBCS application adapter may then gather any other configuration info available, for example, any constraints, validations, and/or security, that may have been enabled on PBCS1. The PBCS application adapter may then prompt the user for any missing configuration answers. Additionally, the PBCS application adapter may prompt the user for certain Arcadia options as they pertain to PBCS. For example, the user may be prompted if they want different Node Types for limbs and leafs, and what the names of the Node Types should be. In some cases, defaults may be provided to users as options (or may be enforced), corresponding to the best practice defaults. Then, the PBCS application adapter may create the appropriate backend data objects (e.g., chunks), may create the Application View with the proper number of view sections and properties, and may hook the view sections and properties to the data objects. The PBCS application adapter may then add validations and user groups to the view and view sections. Additionally, in some cases, application adapters may have the ability to seed a new application with existing dimensions in Arcadia.

Figure 14:
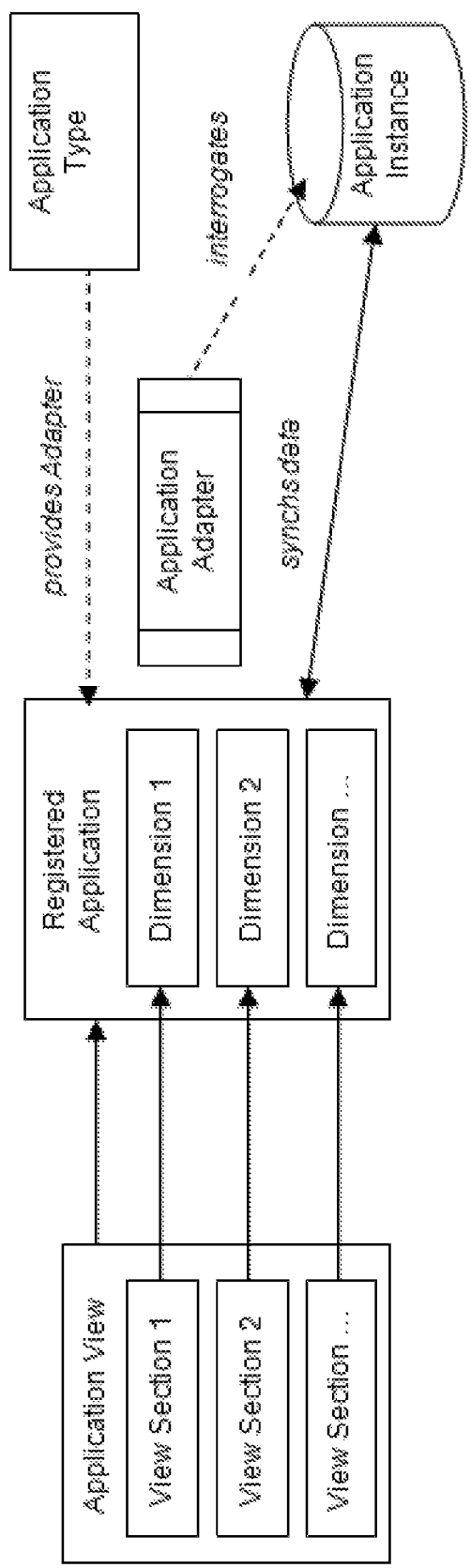
FIG. 14 is a block diagram illustrating the relationship between an application adapter and a view, in accordance with certain embodiments described herein.

As part of the creation process for an application view, an application adapter may be hooked to the view and may automatically turn on certain settings for the view based on the application logic and discovered configuration. Application adapters may contain a list of potential dimension objects that can relate to the dimensions in their particular application. Referring now to FIG. 14, a block diagram is shown illustrating the relationship between an application adapter and a view, in accordance with certain embodiments. As shown in this example, each dimension in a registered application may have a 1:1 mapping to a view Section in the associated view, and the registered application itself may have a 1:1 mapping with the view. Each application may have one and only one "connected" view that supports it. Other views may be setup to support an application, but in some embodiments these other view must be disconnected. That is, the other view may not be able to use the synching mechanism of the system to feed the application, and only one view at a time may be able to be officially integrated. This may allow the system to cleanly govern (e.g., monitor and audit) what has and what has not been sent to or received from any particular system. However, in some cases, users may be permitted to manually import or export data, in which case any data handled in this fashion may not be governed.

In some cases, the application type of a particular application may determine which application adapter may be used to manage the registration and synching processes. The application adapter may use its built-in logic, plus any specific instance settings about the registered system. For example, the HFM application adapter may define that an HFM application may have custom dimensions, but the registered HFM1 application may have definitions for the exact custom dimensions in the HFM1 application instance. In other words, the application adapter is a class that is used to create the registered application for each application instance.

Data Intersection Mastering in Hierarchical Systems

Certain techniques (e.g., methods, systems, non-transitory computer-readable storage memory storing a plurality of instructions executable by one or more processors, etc.) are described herein to natively support data intersections as first-class objects within the architecture 100 and its various applications/systems 121-124. As discussed above, multiple applications/systems may include overlapping sets of reference data, which may be rationalized into a master set of reference data in order to provide a single source of the shared organization data. The different types of reference data in a system may depend on the nature of the organization, but certain examples of reference data may include customers, employees, documents, products, product lines, stores, geographic regions, computer servers, network devices, etc.

In addition to these examples, various embodiments of hierarchy management systems 130 may natively support data intersections as part of its core feature set. Data intersections are data nodes defined by values in multiple node types. For example, if the following nodes exist in their respective Node Types: "Prod001" in Product, "Vend002" in Vendor, and "Store16" in Store, an intersection node representing that product supplied by that vendor sold in that store may be "Prod001/Vend002/Store16." Natively support this intersection may include creating a new node type corresponding to the intersection, for example, a node type named "Vendor's Product by Store," in this case. In such examples, intersection nodes may have all the same capabilities of a normal node supported by the hierarchy management systems 130, including properties, relationships, maps, etc. Additionally, intersections may support ranges as part of their definition. For example, instead of "Prod001/Vend002/Store16," a particular intersection may be defined with respect to a range in one or more of its component segments, such as "Prod001/Vend002/Store10-Store16."

Figure 15:
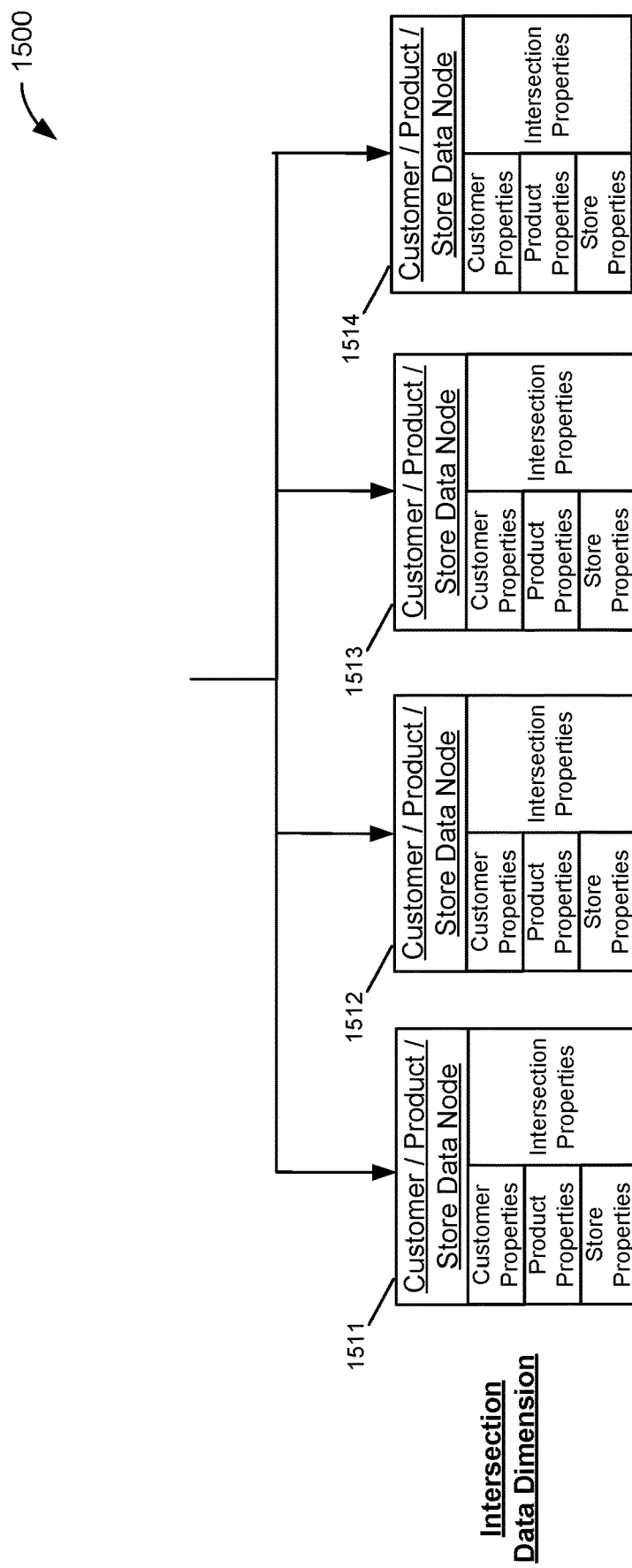
FIG. 15 is a hierarchical diagram showing an example portion of a data hierarchy in which a number of intersection data nodes are represented, in accordance with certain embodiments described herein.

For example, referring briefly to FIG. 15, an example portion of a data hierarchy is shown in which a number of intersection data nodes are represented. In this example, each of the intersection data nodes 1511-1514 corresponds to the intersection of a particular customer data node, a particular product data node, and a particular store data node. Each intersection data node 1511-1514 thus contains the data for its component parts (e.g., customer, product, and store) including both the data node values and the properties for those component parts. Additionally, as shown in this example, intersection data nodes may include additional properties and/or relationships defined on the intersection itself (e.g., not properties on the individual components of the intersection).

Intersection node types thus may contain multi-dimensional nodes that represent an intersection of nodes from normal node types. For example, Store1 (in the "Store" node type), Product4 (in the "Product" node type), and Supplier-ABC (in the "Supplier" node type) all may exist as nodes in their respective normal node types. However, an additional intersection node type may be defined (e.g., manually or programmatically), named "Supplier Products By Store" that includes nodes representing an intersection of these three normal node types. An example node of this intersection node type may be represented as "SupplierABC/Store1/Product4."

In certain embodiments, intersection nodes may be supported as first-class objects, and thus may be handled within the architecture 100 as an entity in itself, having all of the same features as other node types. For example, nodes of intersection node types may have properties assigned, may be put in a hierarchy, may have attributions on it which are available (e.g., as live links) at that intersection object, etc. Rules, validations, and governance also may be handled in the same way for defined intersection node types as for other normal node types. Additionally, when intersection objects are supported natively as first-class objects, they can be versioned over time rationalized as well.

As an example for illustrative purposes, an organization may create a price list node type at the intersection of a vendor node type, store node type, and region node type. In this example, price list objects may be treated as first-class objects, so that properties could be assigned to the price list object itself (e.g., a price property, a valid/not valid indicator, a date range property, etc.). Additionally, this intersection object would inherit the properties of its constituent nodes of normal node types (e.g., the vendor properties, store properties, and region properties). The price list nodes in this example also could be versioned, put into hierarchies, and have attributed put on them. Further, the price lists in this example, and other data intersections in other examples, may be rationalized across different applications, using the same rationalization techniques described herein.

Because intersection nodes may be supported as primary/first-class objects within a computing infrastructure 100, data dimensions and/or hierarchies of intersection nodes in these and other examples may be shared and subscribed-to by separate applications 120, and also may be mastered into a master data store 135 and managed by a hierarchy management system 130 as described in the above examples. Thus, data dimensions/hierarchies of intersection nodes may be sharable and reusable across separate applications and systems 120. Additionally, organization-wide policies may master data dimensions/hierarchies of intersection nodes to provide and/or enforce consistent sets of intersection nodes at the organization level. Sharing, subscribing, and mastering of intersection nodes may be performed using similar techniques to those discussed above for other data node types. Similar features also may be supported, such as providing different authorization permissions for different users and applications 120 with respect to subscribing to and maintaining individual/customized sets of intersection node data dimensions/hierarchies. For instance, certain applications 120 may be required to use a set of mastered intersection data nodes for organizational uniformity, while other applications 120 may be permitted to maintain separate data dimensions/hierarchies of intersection data nodes that may be used instead of (or in collaboration with) the set of mastered intersection data nodes for the same data dimension/hierarchy. In either case, mastered intersection data dimensions/hierarchies may be semantically independent, so that particular applications/systems 120 may translate the mastered intersection into the semantics of their particular applications/systems 120.

The techniques of mastering intersection data dimensions/hierarchies may synergies with respect to validation and analysis of individual data elements. For example, using a single intersection node mastered within an organization that includes a store element, product element, and customer element, an application 120 may quickly be able to analyze the intersection node and perform various calculations based on the data from the constituent elements. For example, a transaction tax application 120 may use the intersection node to tax the product appropriating using both the product information (from the product element of the intersection) and the location information (from the store element of the intersection), etc. Additionally, applications/data systems 120 within the organization's infrastructure 100 may implement sets of logical rules on mastered intersection nodes and their consistent elements to analyze and process the organization's data. For instance, processing exception rules may be implemented using the mastered intersection data to systematically detect the desired exception (e.g., when a particular combination of a customer, product, and/or store is detected, apply a special rule), and if the desired exception is not detected, the processing task may fall through into the processing of the general rule. Such solutions allow for grouping together and defining precedence on such rules directly within the intersection data nodes themselves, thus provider the user with visibility into the mappings look-ups and allowing the using to define precedence on such rules.

Change Request Visualization in Hierarchical Systems

Certain techniques (e.g., methods, systems, non-transitory computer-readable storage memory storing a plurality of instructions executable by one or more processors, etc.) are described herein relating to analyses and visualization of change requests within hierarchical data systems. As discussed above, various different types of changes may be supported by a hierarchy management system 130 in various implementations. Changes may include straightforward revisions (e.g., additions, removals, or modifications) of data or metadata for certain nodes, or more complex examples such as restructuring and/or reorganization of application hierarchies. For instance, a user may initiated a request to move a number of child data nodes from one parent node to another parent node, such as moving N products from one product line to another. As another example, a user may initiate a request to move a parent node (and all of its subnodes) underneath a different parent node, such as moving one product line under another product line. As discussed below, these changes may require a restructuring of at least the application hierarchy containing the affected nodes. Additionally, if the affected data has been shared/rationalized, then the other systems 121-124 may be affected. For all affected systems, the restructuring and/or reorganization of application hierarchies has the potential to create inconsistencies, violate rules, and cause other potential data integrity issues. To address these issues, the hierarchy management system 130 may provide request visualization features, including underlying request analysis components and request visualization user interfaces, to allow users to review the downstream effects of requested changes before deciding whether or not to modify and/or commit the changes.

Figure 16:
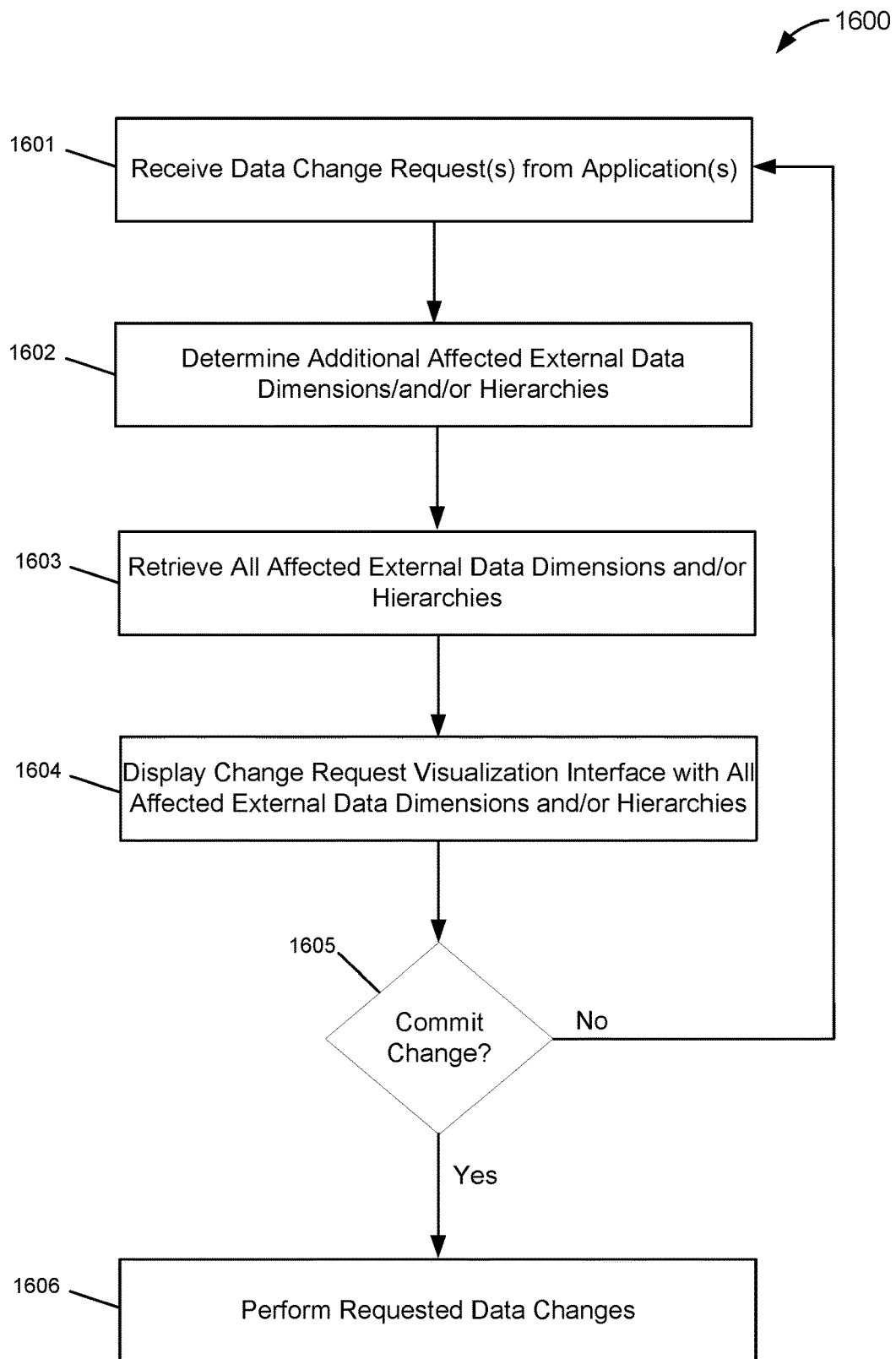
FIG. 16 is a flow diagram illustrating an example process for visualizing, reviewing, and processing data change requests from an application, in accordance with certain embodiments described herein.

Referring now to FIG. 16, a flow diagram is shown illustrating an example process for visualizing, reviewing, and processing data change requests from an application 120. The graphical interface used for viewing application data changes in this example may be similar or identical to the view visualization interfaces described above. Additionally, as discussed above, the data change requests reviewed and processed in these examples may include entirely siloed application data that is maintained solely by an application 120, or may include data shared and subscribed to between multiple applications 120, as well as mastered data. Further, although the underlying processing techniques described herein may be different from siloed data, shared and subscribed to data, and for master data, in some embodiments these underlying processing differences may be entirely transparent to the end user interacting with the graphical interface.

In step 1601, a data change request may be received from a user associated with an application 120. The data may include a simple value change (e.g., a changing to data node values and/or properties) or a more complex structural change (e.g., reorganizing data hierarchies, changing relationships between data nodes and dimensions, etc.). In step 1602, the system may identify any other data affected by the data change requested in step 1601. For example, if an application 120 is attempting to make a change to particular shared master data, that shared master data may be propagated to one or more additional applications. Additionally, if an application's 120 data dimension is shared with and/or subscribed to by one or more other external applications, those external applications also may be affected by the data change. In step 1603, any affected data dimension/hierarchies from the affected systems/applications may be retrieved. In addition to retrieving the affected data dimension/hierarchies from the other systems, in some cases the data relationships and data integrity rules from those system also may be retrieved, in order to determine if the proposed data change(s) violate any of the rules or affect any of the data relationships of the other affected systems.

In step 1604, the change request visualization interface may display a graphical change request visualization interface, including all of the affected internal and external data dimensions/hierarchies. In some embodiments, discussed in more detail in the examples below, the change request visualization tool may highlight with graphics any data discrepancies or rules violations associated with the proposed change. In step 1605, the user of the change request visualization interface may review the changes and commit the changes, thereby initiating the changes to be performed in step 1606. Alternatively, the user may reject the proposed changes after reviewing them in the change request visualization interface. In some embodiments, the change request visualization interface also may provide the user the option to revise the proposed data changes, and may update on-the-fly to visualize the affected data dimensions/hierarchies within the interface.

In some embodiments, request visualization may be performed by a request visualization engine within the organization infrastructure 100 (e.g., within the hierarchy management system 130) configured to service requests via a call content within the engine. For example, the call context may reference a server cache into which the data change has been cached (using active cache management). A local copy of the modified data may be maintained, and during the visualization request, the engine may apply the request within the call context.

Additionally, as discussed below in more detail, the techniques described herein for visualizing, reviewing, and committing proposed data changes may be performed for a single change or for a combination of data changes. For instance, different users operating within different applications 120 may each propose a change affecting the same master data. In such cases, the changes may be incompatible, or even if compatible such changes may cause additional unintended consequences within the master data or particular applications 120 that cannot be anticipated by either of the users proposing the separate data changes. Thus, the change request visualization interface may process and display the results of affected systems, affected data dimensions/hierarchies, potential broken links or violations of data relationships or data integrity rules within the master data or various application-level data of affected applications 120, etc.

Figure 17:
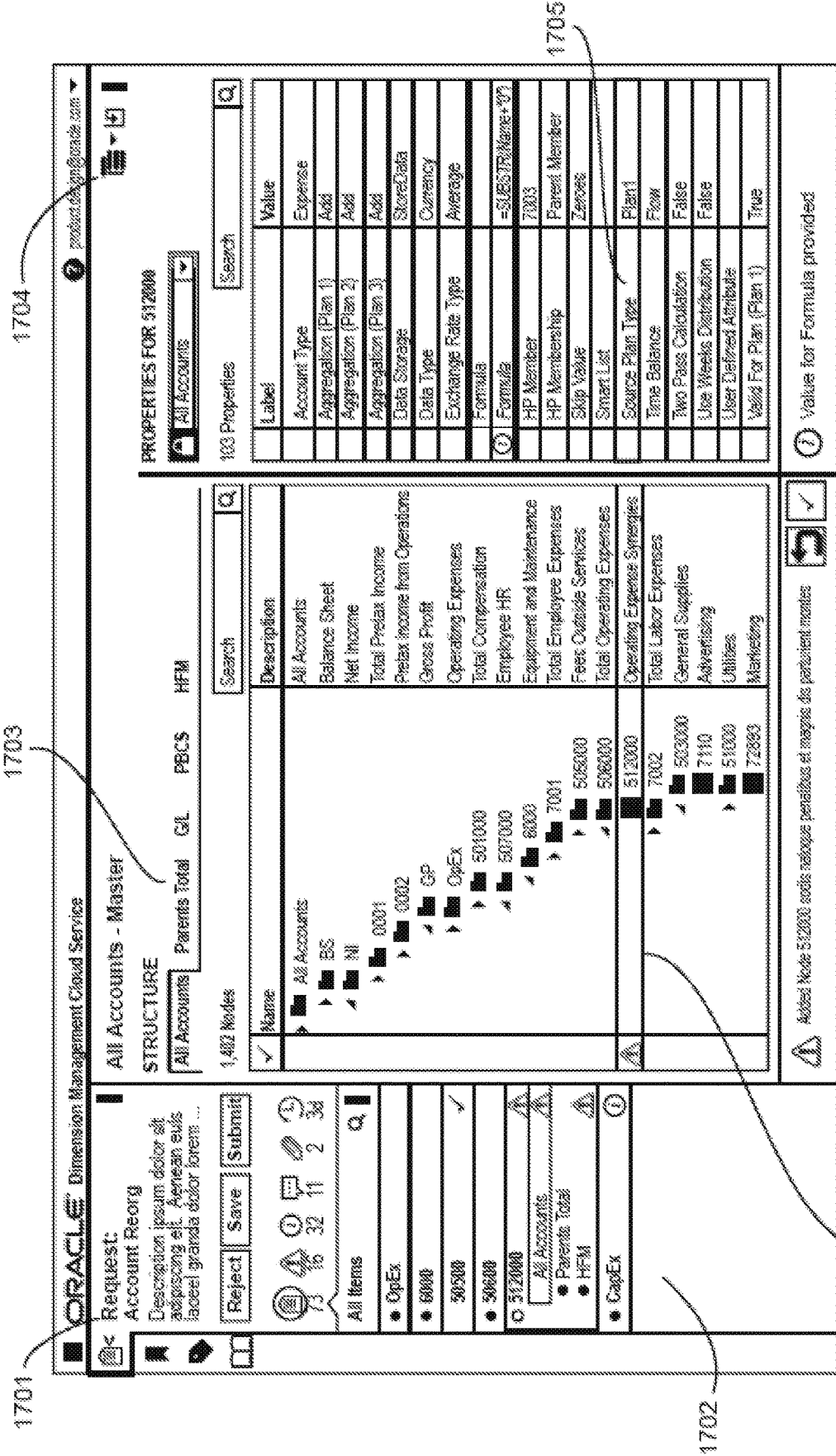
FIG. 17 is an example screen of a user interface displaying an application view in the context of a particular change request, in accordance with certain embodiments described herein.

Referring now to FIG. 17, an example user interface is shown displaying an application view in the context of a particular change request (see 1701). As shown in this example, the request visualization tools of the hierarchy management system 130 may overlay the items of the change request onto the data in each view section, giving the user a preview of what the data should look like if the request is committed. For this request, the request items are shown in the left pane at 1702, where each item is represented by a node. The application views are shown in the center pane, where the multiple sections are represented by tabs 1703. At 1704, buttons are provided through which the user may display the sections as either hierarchies or grids, and the properties for the active node in the current sections are displayed in the property pane 1705 on the right side of the user interface. Finally, in the application view pane, the request items are overlaid onto the currently displayed view data (see 1706).

Thus, referring to the example request visualization shown in FIG. 17, whenever a different node is highlighted in the application view of the center pane, the properties for that node are displayed in the right pane on the right. The node hierarchy and the node properties on the right may be changed by the user in this view, and whenever any changes are made, the listing of changes 1702 is updated. Additionally, the property changes are highlighted in the property pane 1705, and the node changes are highlighted in the application view pane 1706. Further, the underlying analysis of the requested change may perform validation and compliance checks on all affected systems, nodes, and properties. In this example, the system has detected an error associated with the requested change to node 512000. The error may indicate, for example, a data inconsistency, a rules violation, or other system data error.

Figure 18:
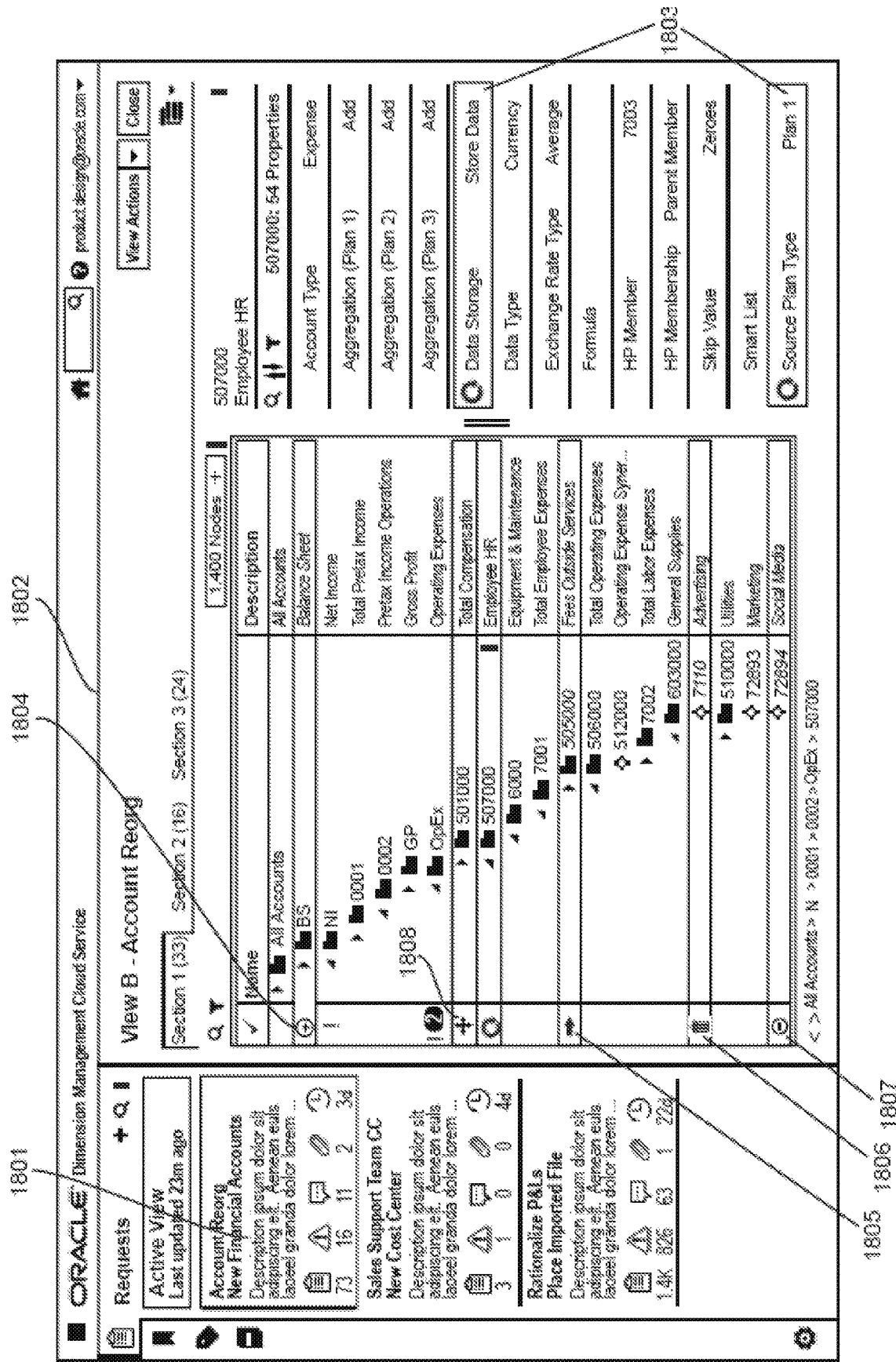
FIG. 18 is another example screen of a user interface displaying an application view in the context of a particular change request, in accordance with certain embodiments described herein.

Referring now to FIG. 18, another example user interface is shown displaying an application view in the context of a change request. In this example, although multiple requests are shown in the requests pane on the left, only a single request 1801 has been selected. Thus, the changes reflected in the application view center pane 1802 and the property pane 1803 on the right, are only those changes associated with the request 1801, and represent the potential future state of the active view if request 1801 were to be committed. However, in other examples, the user may select multiple requests from the requests pane at the same time, which will initiate an underlying process to analyze the effects of the combination of requests selected, and will display in the user interface the potential future state of the active view if the combination of requests were to be committed. Thus, users may evaluate individual change requests and/or combinations of change requests via the user interface shown in FIG. 18.

In this example, when a particular requests 1801 is active, the active request may be appended to the view title in pane 1802, and the number of nodes in the section that are affected by the request may appear in the section tab. Additionally, as shown in the properties pane 1803, the two highlighted properties for node 507000 are updated with request 1801. In the center application view pane and right properties pane, six different operations are visualized, by color and symbol in this example, to represent the addition of a new node 1804, the insertion of an existing node 1805, the deletion of a node 1806, the removal of a node from the current section 1807, a moving of a node 1808, and an update to a node/property 1803.

Referring now to FIGS. 19A-21B, several additional user interfaces are shown illustrating techniques for operation visualization. As described above for request visualization, new or inserted nodes may be added to the application view of the request visualization user interface, deleted nodes are indicated as deleted, etc. Node moves and updates, in contrast, may carry additional information that may be disclosed via the user interfaces, such as information indicating where a node moved from and/or information indicating a previous value for an updated node. In the example shown in FIGS. 19A and 19B, this information may be displayed in response to the user clicking on the operation icon. For instance, in FIG. 19A, in the property pane or on a property value cell, the user may select (e.g., click) on a property's update operation icon 1901. In response, as shown in FIG. 19B, the selected property expands to show both the new (requested) value 1902 and the old (current) value 1903. In some cases, the update icon may work as a toggle, so that selecting the icon 1901 again may revert to a normal request property display.

Figure 20:
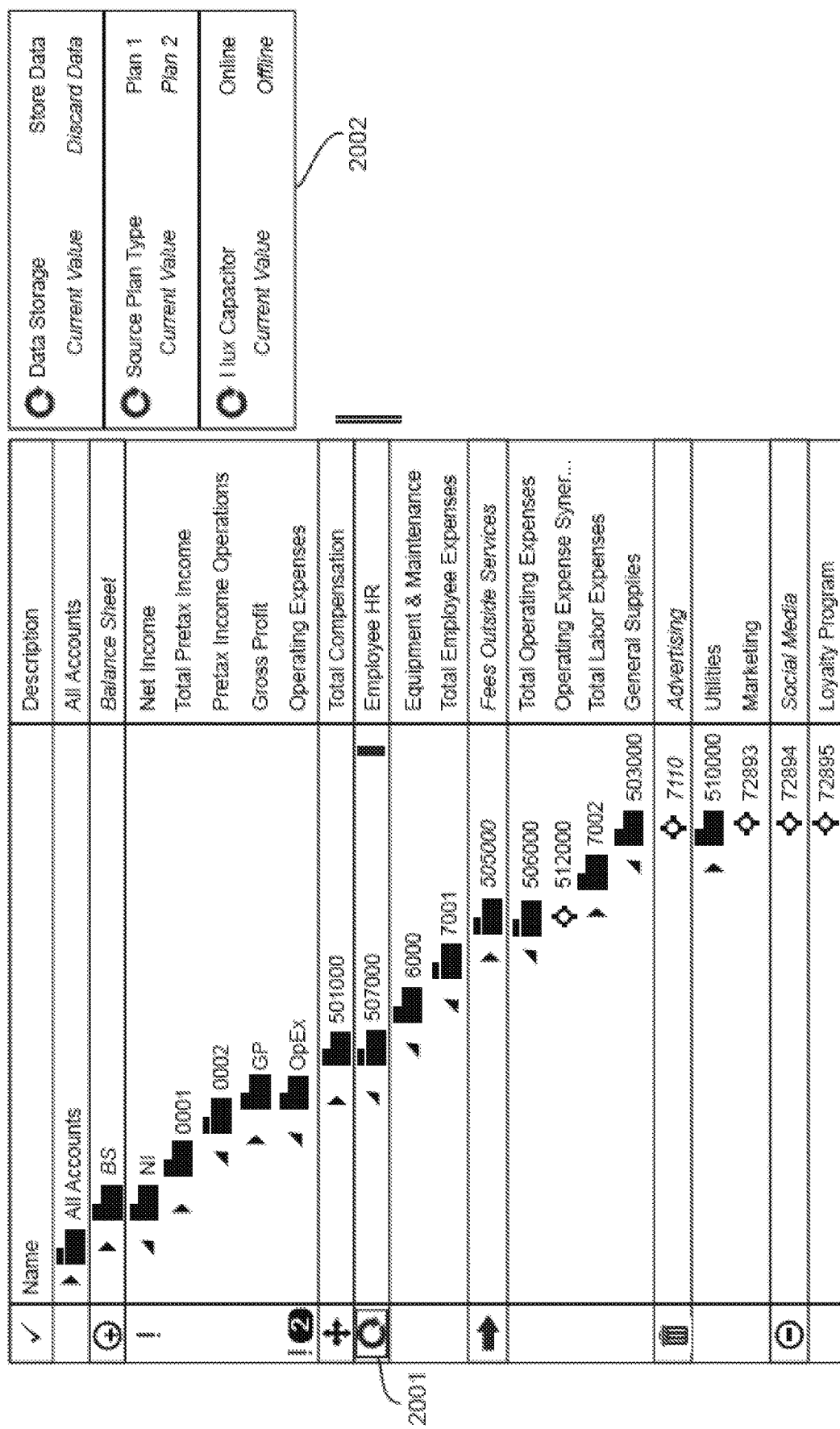
FIG. 20 is another example screen of a user interface illustrating techniques for operation visualization, in accordance with certain embodiments described herein.

Referring now to FIG. 20, another user interface is shown illustrating another technique for operation visualization. In this example, selection of the update icon 2001 in the hierarchy may cause the system to filter the properties pane 2002 to display only the properties with updated values for the selected node, and then to display both the requested and current values for each such property.

Figures 21A, 21B:
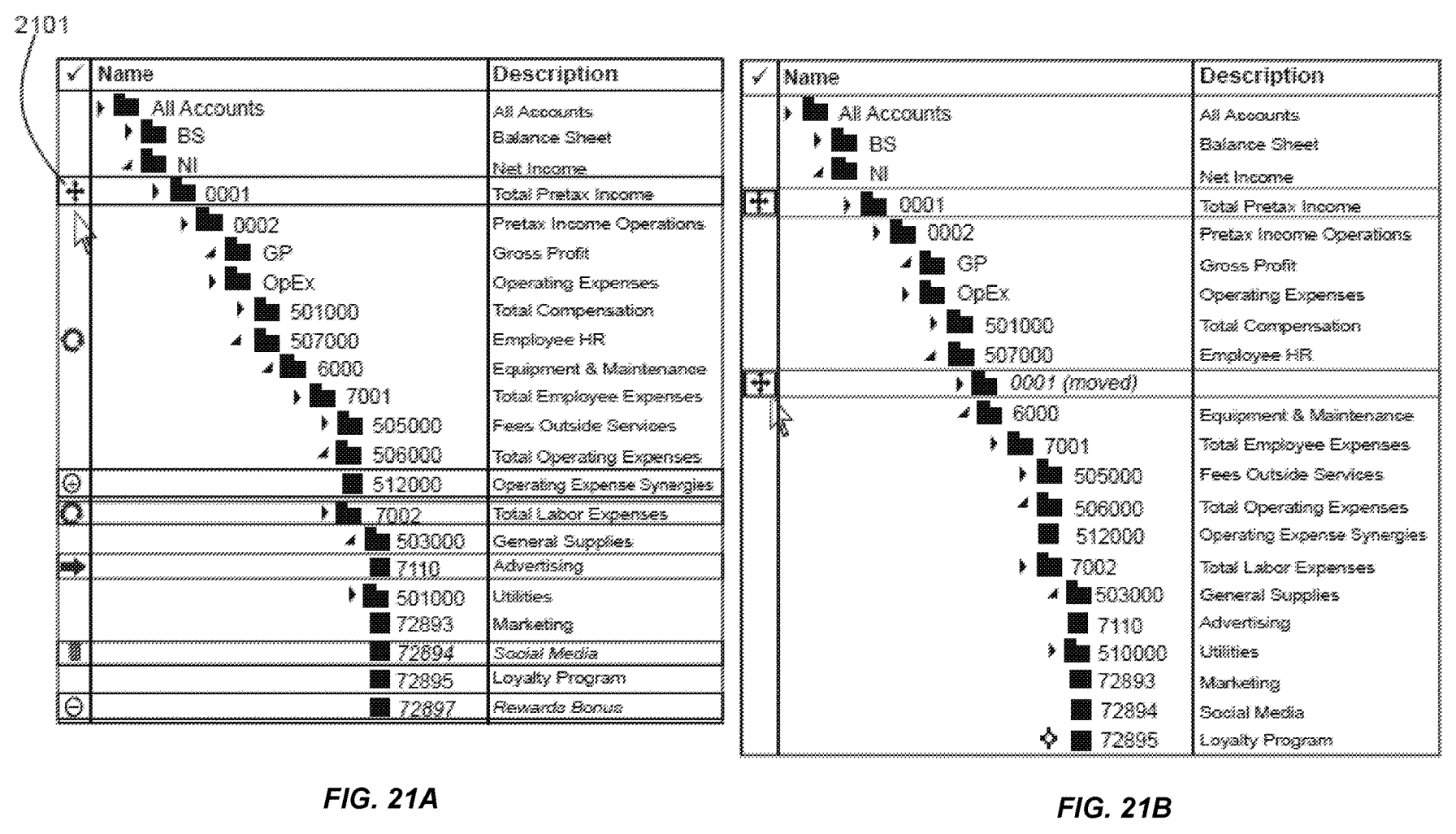

As another example, referring now to FIGS. 21A and 21B, two more user interfaces are shown illustrating techniques for operation visualization. In FIG. 21A, the icon 2101 corresponding to node 0001 indicates that this node has been moved in the current change request. If the user selects the move icon 1501, the updated hierarchy display is shown in FIG. 21B indicated the requested and current position for the moved node 0001. FIG. 21B shows the territory and other nodes in between the moved node's requested and current position. This territory may span the entire hierarchy in some cases, and all branches within this territory may be closed except for the branch containing the old location.

To further illustrate the techniques for request visualization and operation visualization, the algorithms and functional behaviors for adding a new node to a hierarchy, and for visualization a new node, are described below. When adding a new node, the new node may be child or sibling node to an existing selected node in a hierarchy. In such cases, the system may navigate to the hierarchy, find a parent node, and add the new node under the parent node in the hierarchy. Additionally, the system may select a node type and specify a name and description for the new node, as well as defining values for any other required and optional properties available for the new node in the view section. After making the change(s), verification may be performed to confirm that the changes are valid and to correct any issues. At the end of the process, the new node may be reviewed as a request item in a draft request.

In some embodiments, the following functional steps/algorithm may be performed by the system (e.g., the hierarchy management system 130) when adding a new node to a hierarchy. For example, to initiate the process of adding a new node to a hierarchy, the hierarchy management system 130 may receive a selection of a view and view section which uses a hierarchy set and has a top node. The hierarchy management system 130 may then create a new draft request. The user may then browse the hierarchy to find a parent for the new node, and select a node in the hierarchy which allows child nodes. Via the hierarchy management system 130, the user may access a context menu for the node in the hierarchy which allows child nodes, and an add menu item may then be selected to add a new node as a child or sibling of the selected node. In some cases, the hierarchy management system 130 may only support the Add Child option for node that allow child nodes. Additionally, in some examples, an Add Sibling option may be supported by the hierarchy management system 130 for all nodes except top nodes. Next, the hierarchy management system 130 may provide a view listing available child node types for the selected node. If a child node is being added, then the child node types available for selection may be based on the selected node, wherein if a sibling node is being added, then the child node types available for selection may be based on the parent of the selected node. The hierarchy management system 130 may then receive the selection of the node type for the new node being added, or may automatically select the node type if only one type is available, in which cases the hierarchy management system 130 might skip the node type selection screen and directly transition to the property pane.

Next, the hierarchy management system 130 may provide the properties view for the new node being added, based on the view section, in a property pane. Within the property pane, editable free form text fields may be shown for all view section properties displayed, and the property pane may identify the required properties of the new node being added. From user interaction with the property pane, the hierarchy management system 130 may receive a defined name for the new node via a designated name field in the property pane. In some cases, the hierarchy management system 130 may enforce a maximum (or configured) length for the new node name. The hierarchy management system 130 also may receive a description for the new node via a designated description field in the property pane. In some cases, the description field also may be configured not exceed a maximum or configured field length. Additionally, via the property pane, the hierarchy management system 130 may support the addition of defined values for any other required properties for the new node, and/or for the addition of defined values for any other optional properties for the new node. Additionally, in some embodiments, the hierarchy management system 130 may be configured to identify a property which has been modified for the new node being added, and to show a change indicator for the property immediately after the update has been applied.

After a newly-added node is made available in the tree, and then is selected from within the tree, the hierarchy management system 130 may then provide a view of the new node as a child or sibling of the original selected node in the hierarchy. Additionally, after navigating away within the tree, the newly-added node may only be seen under the parent using request visualization. In some embodiments, the hierarchy management system 130 may support a validation process, in which the primary action (node added) performed for the selected node is identified, and then the property values for the new child node selected from the hierarchy may be viewed. The hierarchy management system 130 may identify any validation issues for the property values specified for the new node, and may make any necessary corrections to the property values to resolve validation issues. The necessary corrections to the property values may be made automatically but the hierarchy management system 130 in some cases, and/or based on user interactions in other cases. Finally, the hierarchy management system 130 may confirm that the validation issues have been resolved for the new node being added.

Additionally, in some embodiments, the hierarchy management system 130 may support requests for the new node being added. For instance, the hierarchy management system 130 may receive a new request item as a draft request for the new node being added. In some cases, this may correspond to the item being expanded in the request pane. In response, the hierarchy management system 130 may identify the view section where the node for the expanded request item was added. The hierarchy management system 130 also may identify the primary action (e.g., node added) which was performed for the request item in the view section, based on action precedence rules. The hierarchy management system 130 may then view the count of node instances which have request items on the view section tab, where the count is incremented by one for each node added, and may save the new request item to the draft request.

After the addition of a new node to a hierarchy, a number of validations may be performed in certain embodiments. For example, a validations that the node name must be of a particular length (max length or configured length), the description must be of a particular length (max length or configured length), the name of the new node must be unique within the selected node type, the name of the new node may need to be unique within the current view section, and/or the name of the new node may need to be unique under the specified parent. In various cases, the description may be required or optional.

Additionally, after the addition of a new child or sibling node to a hierarchy, the users may be provided the capabilities to visualize the addition of the node. As discussed above in reference to the user interfaces in FIGS. 17 to 21B, the visualization of changes may enable the users to identify which parts of the hierarchy are changing and what may be affected by the requested changes. In some embodiments, visualization may be available in various user scenarios, including one or more of the creation of a new draft request, the approval of a submitted request, the enrichment of a submitted request, the commitment of a submitted request, the review of a committed request, and/or the review of a rejected request.

Additionally, in some embodiments, one or more algorithms and/or functional steps may be performed by the system (e.g., the hierarchy management system 130) to visualize an added node into a hierarchy. For example, the hierarchy management system 130 receive an indication that a user has selected a view which uses a hierarchical view section, and an indication of a selection of an in-flight request via the request pane which includes a request item for adding a node. The hierarchy management system 130 may then automatically generate a view for the first view section in the view, including request items from the selected request. In some cases, a tab for the view section may have a count of request item instances in the current request. Additionally, the hierarchy management system 130 may automatically expand the hierarchy for the view section to display nodes corresponding to request items in the selected request. For example, in such embodiments, the nodes that were newly added in the request may be displayed as children of the parent nodes to which they were added in the request. Nodes that were newly added in the request also may be marked with various visual indicators in the tree, such as a first visual indicator corresponding to highlighting the row for added node in green, and a second visual indicator corresponding to an Add icon placed in the column on left side of tree.

The hierarchy management system 130 also may be configured to support various functionality for items selected via the request pane. For example, the hierarchy management system 130 may receive an indication of a user interaction selection a particular request item in the request pane. In response, the hierarchy management system 130 may provide a view of the request item instances expanded for the selected request item. In some cases, the hierarchy management system 130 may automatically select the first request item instance in the request pane, and for instance, may be placed in focus within the tree as a result of the request item instance being selected in the request pane. Similarly, if and when different request item instances are is selected within the same view section, the hierarchy management system 130 may place the node for the selected request item instance in focus within the tree. When an added node is selected (based on the view section), the hierarchy management system 130 may be configured to display the properties of the added/selected node in the property pane. In some cases, within the property pane, the name defined for the node may be displayed, along with the description defined for the node. From the property pane, properties for the newly-added node may be viewed and selected for modification. In some cases, a change indicator may be shown for a property immediately after the update has been applied or when a node is selected in the tree.

Finally, after a different view section is selected, having additional request items that can be visualized, the function steps/algorithms of the hierarchy management system 130 may once again automatically generate a view for the newly-selected view section, supporting some or all of the same functionality described above.

Hierarchy Preparation in Hierarchical Systems

Certain techniques (e.g., methods, systems, non-transitory computer-readable storage memory storing a plurality of instructions executable by one or more processors, etc.) are described herein relating to hierarchy preparation within hierarchical data systems. Hierarchy preparation may refer to the importation of data from data sources (e.g., files) into one or more application hierarchies. In various embodiments, hierarchy data may be loaded by pulling information from a desktop or cloud data source. The data may be semi-structured or unstructured in some cases. After loading the information, the hierarchy data may be previewed and/or validated using a number of different rules and validation checks. Various issues may be identified at the metadata level, the individual row/node level, for multiple rows, and/or within relationships between nodes. Validation processes may inspect and pre-process the document that has been loaded, and run validation checks to verify that the data set being loaded will conform to the target application view.

Additional validation checks may be performed, for example, to identify any duplicate relationships that may be created, and/or other anomalies or data integrity issues. Any issues identified during the data loading, pre-processing, validating, etc., may be aggregated and presented to the user via a user interface, so that the user may determine whether or not to proceed with the data importation.

Thus, at a high-level, the hierarchy preparation techniques described herein may allow users to build intelligence into automated processes for importing data into a hierarchical data system, in order to ensure referential integrity of the hierarchy and all hierarchy entities. Further, these techniques provide an awareness of the data being imported into the hierarchies, and may analyze the data within the context of hierarchical master data management.

Figure 22:
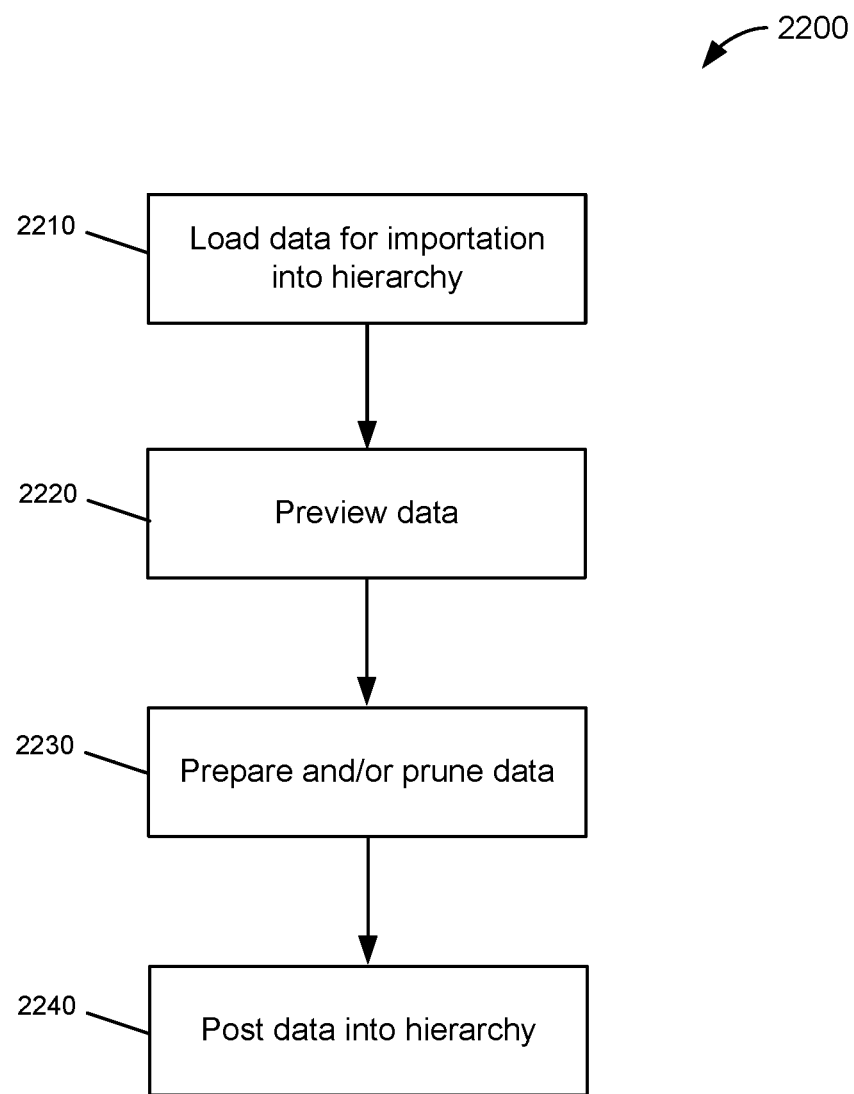
FIG. 22 is a flow diagram illustrating an example process of hierarchy preparation, in accordance with certain embodiments described herein.

Referring now to FIG. 22, a flow diagram is shown illustrating an example process 2200 of hierarchy preparation in accordance with certain embodiments. In step 2210, one or more components with the software/hardware architecture 100 may load data from importation into an application hierarchy 121-124. In some embodiments, the system may invoke a user interface to allow the user to select a file source type (e.g., desktop file or document cloud file), and then to select one or more files for importation from the selected source. Various programmatic features may be implemented to allow users to import multiple files, and/or to set/update property values during importation.

In step 2220, a preview user interface window may be provided to allow the user to preview the loaded data. In some cases, the user may preview the file as-is, in which case the source file may be displayed for confirmation purposes in a read only grid (e.g., spreadsheet). The user may perform file validation (e.g., separator, header, row, blanks, etc.), and changes may be allowed to the original declaration. After previewing the source file(s) in step 2220, the user may initiate one or more save methods. In some cases, the user may declare a new source (e.g., save as CLOB to database, select from a list of sources and/or add a new source type). The new and old sources may be included to show as part of the data provenance/lineage of the loaded files. Additionally or alternatively, a save method may be performed as part of a request for payload via a file attachment.

In step 2230, one or more hierarchy preparation and/or pruning processes may be performed on the loaded data. During these processes, various item/action validations may be executed, for example, a valid node type in target view section (e.g., leaf, limb) validation, a property definition existence validation in the view section, a same node/multiple entries in data file validation, a validation to determine if the node already exists in the target view section (e.g., shared node, alternate hierarchy insert), a parent existence in the target view section validation, and/or a same node/multiple parents/parents in different view sections validation.

Additionally, a number of grid actions (e.g., processing of spreadsheet data and/or identification of various classes of issues and suggested actions) may be supported in this steps. For example, in response to a determination of an invalid parent, the system may be configured to add a row/node and copy the parent to added node, and to create the valid parent by sequencing the parent ahead of original add node action. In response to a determination that a node exists, the system may be configured to add a row, create a shared node entry, and prompt the user to select a parent. Otherwise, the system may offer to select node in the node set. In response to an alternate hierarchy insertion, the system may add a column/cell in order to add a relationship to the alternate view section, and then select the valid parent via ellipsis. This may apply to node properties only; if a relationship's properties must be loaded, the system may prompt the user to load a new worksheet. In response to the detection of an invalid entry, the system may delete the grid row as an invalid member, e.g., required/read only/missing properties. Finally, in response to a determination that a metadata change is required, the system may delete the grid column (property definition not available in target view), and may send a new metadata request to the administrator.

In step 2240, the data may be posted as a change request to the hierarchy, completing the importation process. In some cases, the user may request and/or receive data importation statistics corresponding to the original file (e.g., number of rows, number of columns, number of errors, etc.) and for the prepared file (e.g., number of nodes, number of properties, number of relationships, etc.). The posting of a change request in step 2240 may correspond to the step of receiving change requests, which was discussed above in relation to certain request visualization techniques. For instance, the change request posted in step 2240 may be posted to the requests pane for certain authorized users of one or more affected application hierarchies.

Hardware and Software Computing Environment

Figure 23:
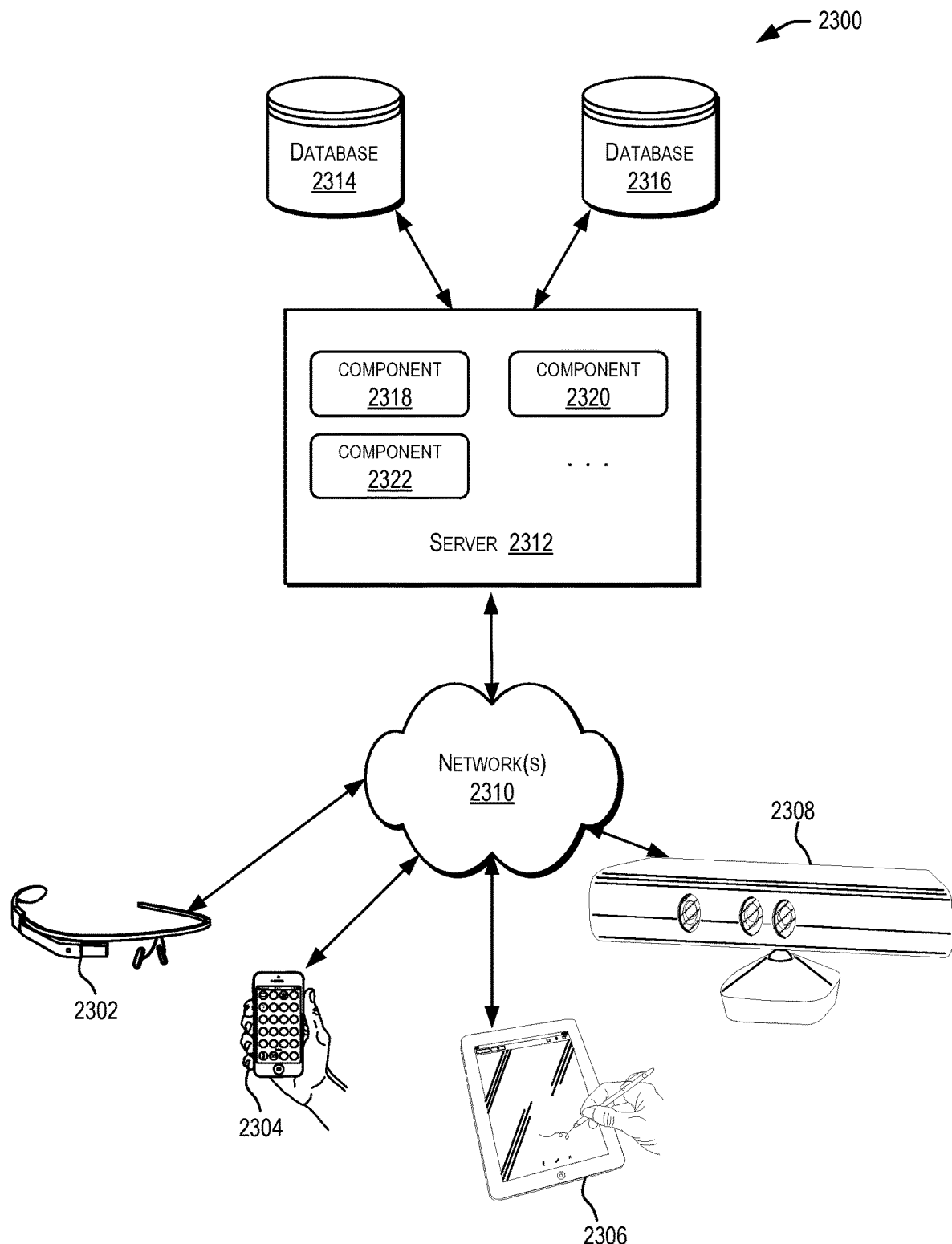
FIG. 23 is a simplified diagram of a distributed system, in accordance with certain embodiments described herein.

FIG. 23 depicts a simplified diagram of a distributed system 2300 for implementing an embodiment. In the illustrated embodiment, the distributed system 2300 includes one or more client computing devices 2302, 2304, 2306, and 2308, which are configured to execute and operate a client application such as a web browser, proprietary client (e.g., Oracle Forms), or the like over one or more network(s) 2310. The server 2312 may be communicatively coupled with the remote client computing devices 2302, 2304, 2306, and 2308 via network 2310.

In various embodiments, the server 2312 may be adapted to run one or more services or software applications such as services and applications that provide message delivery services. In certain embodiments, the server 2312 may also provide other services or software applications can include non-virtual and virtual environments. In some embodiments, these services may be offered as web-based or cloud services or under a Software as a Service (SaaS) model to the users of the client computing devices 2302, 2304, 2306, and/or 2308. Users operating the client computing devices 2302, 2304, 2306, and/or 2308 may in turn utilize one or more client applications to interact with the server 2312 to utilize the services provided by these components.

In the configuration depicted in FIG. 23, the software components 2318, 2320 and 2322 of system 2300 are shown as being implemented on the server 2312. In other embodiments, one or more of the components of the system 2300 and/or the services provided by these components may also be implemented by one or more of the client computing devices 2302, 2304, 2306, and/or 2308. Users operating the client computing devices may then utilize one or more client applications to use the services provided by these components. These components may be implemented in hardware, firmware, software, or combinations thereof. It should be appreciated that various different system configurations are possible, which may be different from distributed system 2300. The embodiment shown in FIG. 23 is thus one example of a distributed system for implementing an embodiment system and is not intended to be limiting.

The client computing devices 2302, 2304, 2306, and/or 2308 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 2310.

Although distributed system 2300 in FIG. 23 is shown with four client computing devices, any number of client computing devices may be supported. Other devices, such as devices with sensors, etc., may interact with the server 2312.

The network(s) 2310 in the distributed system 2300 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 2310 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 2312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 2312 can include one or more virtual machines running virtual operating systems, or other computing architectures involving virtualization. One or more flexible pools of logical storage devices can be virtualized to maintain virtual storage devices for the server. Virtual networks can be controlled by the server 2312 using software defined networking. In various embodiments, the server 2312 may be adapted to run one or more services or software applications described in the foregoing disclosure. For example, the server 2312 may correspond to a server for performing processing as described above according to an embodiment of the present disclosure.

The server 2312 may run an operating system including any of those discussed above, as well as any commercially available server operating system. Server 2312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 2312 may include one or more applications to analyze and consolidate data feeds and/or event updates received from users of the client computing devices 2302, 2304, 2306, and 2308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 2312 may also include one or more applications to display the data feeds and/or real-time events via one or more display devices of the client computing devices 2302, 2304, 2306, and 2308.

The distributed system 2300 may also include one or more databases 2314 and 2316.

These databases may provide a mechanism for storing information such as inventory information, and other information used by the example embodiments. Databases 2314 and 2316 may reside in a variety of locations. By way of example, one or more of databases 2314 and 2316 may reside on a non-transitory storage medium local to (and/or resident in) the server 2312. Alternatively, the databases 2314 and 2316 may be remote from the server 2312 and in communication with the server 2312 via a network-based or dedicated connection. In one set of embodiments, the databases 2314 and 2316 may reside in a storage-area network (SAN). Similarly, any necessary files for performing the functions attributed to the server 2312 may be stored locally on the server 2312 and/or remotely, as appropriate. In one set of embodiments, the databases 2314 and 2316 may include relational databases, such as databases provided by Oracle, that are adapted to store, update, and retrieve data in response to SQL-formatted commands.

Figure 24:
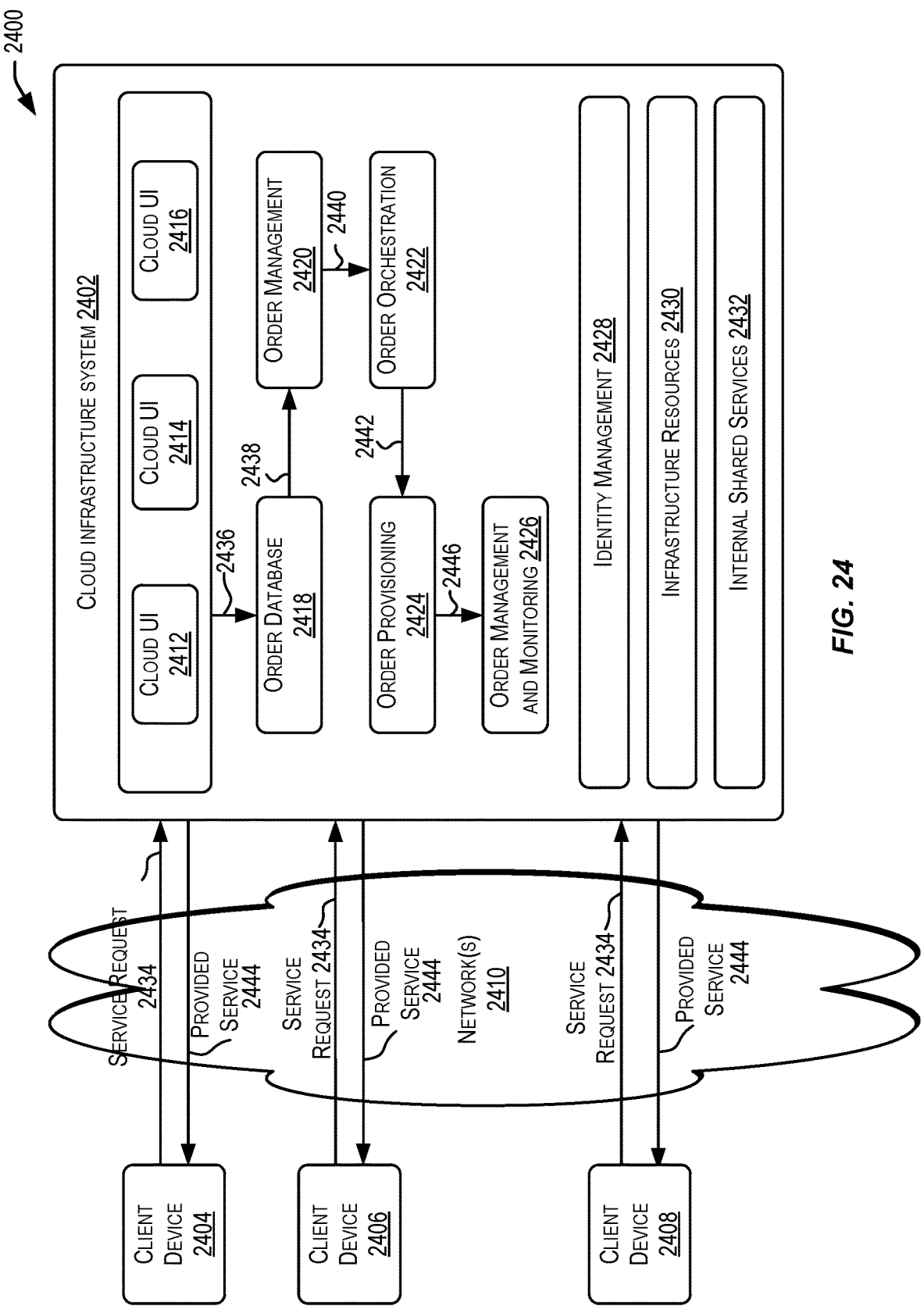
FIG. 24 is a simplified block diagram of components of system environment in which services may be offered as cloud services, in accordance with certain embodiments described herein.

In some embodiments, the message delivery services described above may be offered as services via a cloud environment. FIG. 24 is a simplified block diagram of one or more components of a system environment 2400 in which services may be offered as cloud services, in accordance with an embodiment. In the illustrated embodiment in FIG. 24, system environment 2400 includes one or more client computing devices 2404, 2406, and 2408 that may be used by users to interact with a cloud infrastructure system 2402 that provides cloud services, including services for dynamically modifying documents (e.g., webpages) responsive to usage patterns. Cloud infrastructure system 2402 may comprise one or more computers and/or servers that may include those described above for server 2312.

It should be appreciated that cloud infrastructure system 2402 depicted in FIG. 24 may have other components than those depicted. Further, the embodiment shown in FIG. 24 is only one example of a cloud infrastructure system that may incorporate some of the example embodiments. In some other embodiments, cloud infrastructure system 2402 may have more or fewer components than shown in the figure, may combine two or more components, or may have a different configuration or arrangement of components.

Client computing devices 2404, 2406, and 2408 may be devices similar to those described above for 2302, 2304, 2306, and 2308. Client computing devices 2404, 2406, and 2408 may be configured to operate a client application such as a web browser, a proprietary client application (e.g., Oracle Forms), or some other application, which may be used by a user of the client computing device to interact with cloud infrastructure system 2402 to use services provided by cloud infrastructure system 2402. Although exemplary system environment 2400 is shown with three client computing devices, any number of client computing devices may be supported. Other devices such as devices with sensors, etc. may interact with cloud infrastructure system 2402.

Network(s) 2410 may facilitate communications and exchange of data between clients 2404, 2406, and 2408 and cloud infrastructure system 2402. Each network may be any type of network familiar to those skilled in the art that can support data communications using any of a variety of commercially-available protocols, including those described above for network(s) 2310.

In certain embodiments, services provided by cloud infrastructure system 2402 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 2402 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 2402 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2402 may be adapted to automatically provision, manage and track a customer's subscription to services offered by cloud infrastructure system 2402. Cloud infrastructure system 2402 may provide the cloud services via different deployment models. For example, services may be provided under a public cloud model in which cloud infrastructure system 2402 is owned by an organization selling cloud services (e.g., owned by Oracle Corporation) and the services are made available to the general public or different industry enterprises. As another example, services may be provided under a private cloud model in which cloud infrastructure system 2402 is operated solely for a single organization and may provide services for one or more entities within the organization. The cloud services may also be provided under a community cloud model in which cloud infrastructure system 2402 and the services provided by cloud infrastructure system 2402 are shared by several organizations in a related community. The cloud services may also be provided under a hybrid cloud model, which is a combination of two or more different models.

In some embodiments, the services provided by cloud infrastructure system 2402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2402. Cloud infrastructure system 2402 then performs processing to provide the services in the customer's subscription order.

In some embodiments, the services provided by cloud infrastructure system 2402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 2402 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2402 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2402 may also include infrastructure resources 2430 for providing the resources used to provide various services to customers of the cloud infrastructure system. In one embodiment, infrastructure resources 2430 may include pre-integrated and optimized combinations of hardware, such as servers, storage, and networking resources to execute the services provided by the PaaS platform and the SaaS platform, and other resources.

In some embodiments, resources in cloud infrastructure system 2402 may be shared by multiple users and dynamically re-allocated per demand. Additionally, resources may be allocated to users in different time zones. For example, cloud infrastructure system 2402 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2432 may be provided that are shared by different components or modules of cloud infrastructure system 2402 to enable provision of services by cloud infrastructure system 2402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2402, and the like.

In one embodiment, as depicted in FIG. 24, cloud management functionality may be provided by one or more modules, such as an order management module 2420, an order orchestration module 2422, an order provisioning module 2424, an order management and monitoring module 2426, and an identity management module 2428. These modules may include or be provided using one or more computers and/or servers, which may be general purpose computers, specialized server computers, server farms, server clusters, or any other appropriate arrangement and/or combination.

In an exemplary operation, at 2434, a customer using a client device, such as client device 2404, 2406 or 2408, may interact with cloud infrastructure system 2402 by requesting one or more services provided by cloud infrastructure system 2402 and placing an order for a subscription for one or more services offered by cloud infrastructure system 2402. In certain embodiments, the customer may access a cloud User Interface (UI) such as cloud UI 2412, cloud UI 2414 and/or cloud UI 2416 and place a subscription order via these UIs. The order information received by cloud infrastructure system 2402 in response to the customer placing an order may include information identifying the customer and one or more services offered by the cloud infrastructure system 2402 that the customer intends to subscribe to.

At 2436, the order information received from the customer may be stored in an order database 2418. If this is a new order, a new record may be created for the order. In one embodiment, order database 2418 can be one of several databases operated by cloud infrastructure system 2418 and operated in conjunction with other system elements.

At 2418, the order information may be forwarded to an order management module 2420 that may be configured to perform billing and accounting functions related to the order, such as verifying the order, and upon verification, booking the order.

At 2440, information regarding the order may be communicated to an order orchestration module 2422 that is configured to orchestrate the provisioning of services and resources for the order placed by the customer. In some instances, order orchestration module 2422 may use the services of order provisioning module 2424 for the provisioning. In certain embodiments, order orchestration module 2422 enables the management of business processes associated with each order and applies business logic to determine whether an order should proceed to provisioning.

As shown in the embodiment depicted in FIG. 24, at 2442, upon receiving an order for a new subscription, order orchestration module 2422 sends a request to order provisioning module 2424 to allocate resources and configure resources needed to fulfill the subscription order. Order provisioning module 2424 enables the allocation of resources for the services ordered by the customer. Order provisioning module 2424 provides a level of abstraction between the cloud services provided by cloud infrastructure system 2400 and the physical implementation layer that is used to provision the resources for providing the requested services. This enables order orchestration module 2424 to be isolated from implementation details, such as whether or not services and resources are actually provisioned on the fly or pre-provisioned and only allocated/assigned upon request.

At 2444, once the services and resources are provisioned, a notification may be sent to the subscribing customers indicating that the requested service is now ready for use. In some instance, information (e.g. a link) may be sent to the customer that enables the customer to start using the requested services.

At 2446, a customer's subscription order may be managed and tracked by an order management and monitoring module 2426. In some instances, order management and monitoring module 2426 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 2400 may include an identity management module 2428 that is configured to provide identity services, such as access management and authorization services in cloud infrastructure system 2400. In some embodiments, identity management module 2428 may control information about customers who wish to utilize the services provided by cloud infrastructure system 2402. Such information can include information that authenticates the identities of such customers and information that describes which actions those customers are authorized to perform relative to various system resources (e.g., files, directories, applications, communication ports, memory segments, etc.) Identity management module 2428 may also include the management of descriptive information about each customer and about how and by whom that descriptive information can be accessed and modified.

Figure 25:
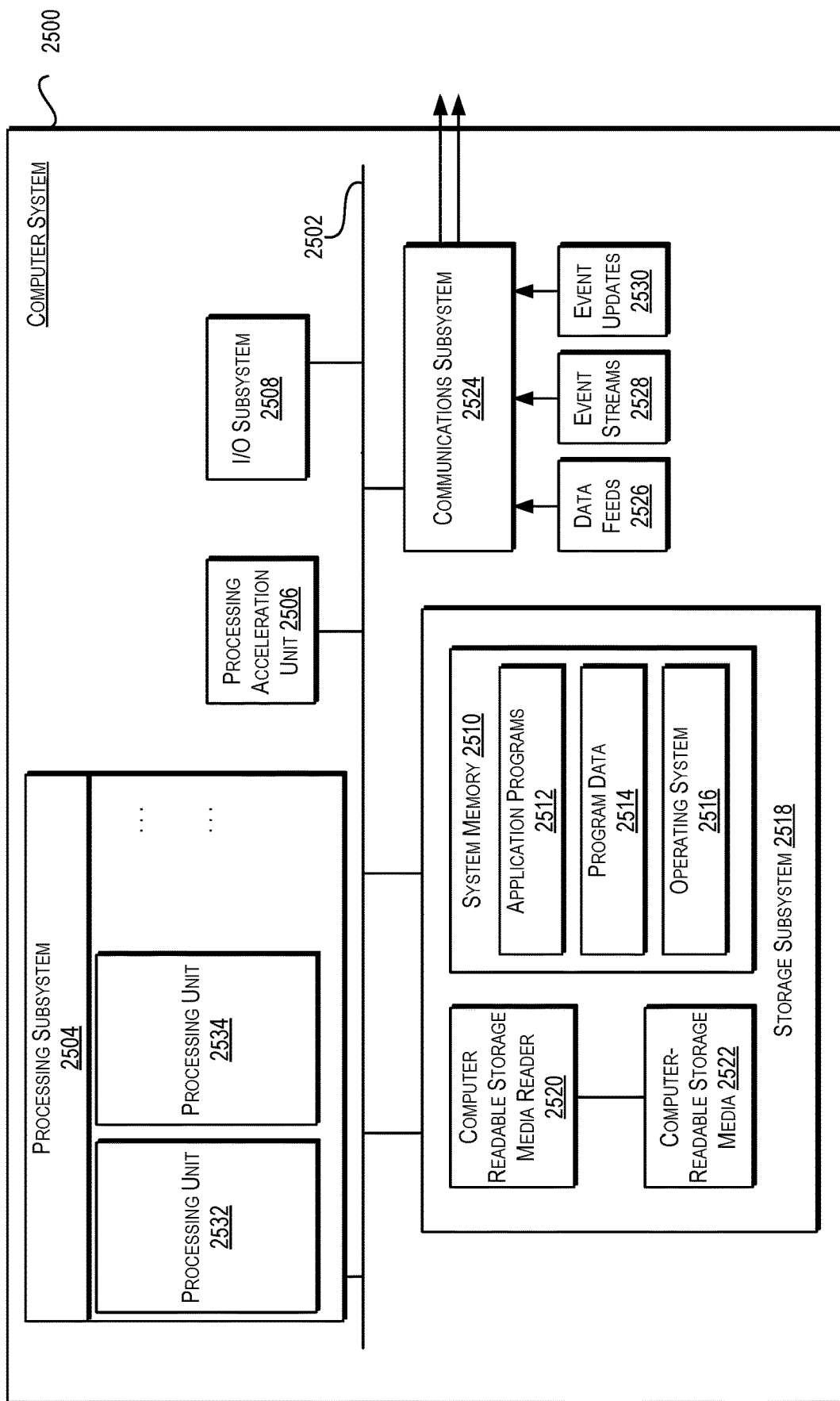
FIG. 25 is an exemplary computer system, in accordance with certain embodiments described herein.

FIG. 25 illustrates an exemplary computer system that may be used to implement certain elements, according to some exemplary embodiments. In some embodiments, computer system 2500 may be used to implement any of the various servers and computer systems described above. As shown in FIG. 25, computer system 2500 includes various subsystems including a processing subsystem 2504 that communicates with a number of peripheral subsystems via a bus subsystem 2502. These peripheral subsystems may include a processing acceleration unit 2506, an I/O subsystem 2508, a storage subsystem 2518 and a communications subsystem 2524. Storage subsystem 2518 may include tangible computer-readable storage media 2522 and a system memory 2510.

Bus subsystem 2502 provides a mechanism for letting the various components and subsystems of computer system 2500 communicate with each other as intended. Although bus subsystem 2502 is shown schematically as a single bus, alternative embodiments of the bus subsystem may utilize multiple buses. Bus subsystem 2502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P13176.1 standard, and the like.

Processing subsystem 2504 controls the operation of computer system 2500 and may comprise one or more processing units 2532, 2534, etc. A processing unit may include be one or more processors, including single core or multicore processors, one or more cores of processors, or combinations thereof. In some embodiments, processing subsystem 2504 can include one or more special purpose co-processors such as graphics processors, digital signal processors (DSPs), or the like. In some embodiments, some or all of the processing units of processing subsystem 2504 can be implemented using customized circuits, such as application specific integrated circuits (ASICs), or field programmable gate arrays (FPGAs).

In some embodiments, the processing units in processing subsystem 2504 can execute instructions stored in system memory 2510 or on computer readable storage media 2522. In various embodiments, the processing units can execute a variety of programs or code instructions and can maintain multiple concurrently executing programs or processes. At any given time, some or all of the program code to be executed can be resident in system memory 2510 and/or on computer-readable storage media 2510 including potentially on one or more storage devices. Through suitable programming, processing subsystem 2504 can provide various functionalities described above for dynamically modifying documents (e.g., webpages) responsive to usage patterns.

In certain embodiments, a processing acceleration unit 2506 may be provided for performing customized processing or for off-loading some of the processing performed by processing subsystem 2504 so as to accelerate the overall processing performed by computer system 2500.

I/O subsystem 2508 may include devices and mechanisms for inputting information to computer system 2500 and/or for outputting information from or via computer system 2500. In general, use of the term "input device" is intended to include all possible types of devices and mechanisms for inputting information to computer system 2500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2518 provides a repository or data store for storing information that is used by computer system 2500. Storage subsystem 2518 provides a tangible non-transitory computer-readable storage medium for storing the basic programming and data constructs that provide the functionality of some embodiments. Software (programs, code modules, instructions) that when executed by processing subsystem 2504 provide the functionality described above may be stored in storage subsystem 2518. The software may be executed by one or more processing units of processing subsystem 2504. Storage subsystem 2518 may also provide a repository for storing data used in accordance with the example embodiments.

Storage subsystem 2518 may include one or more non-transitory memory devices, including volatile and non-volatile memory devices. As shown in FIG. 25, storage subsystem 2518 includes a system memory 2510 and a computer-readable storage media 2522. System memory 2510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2500, such as during start-up, may typically be stored in the ROM. The RAM typically contains data and/or program modules that are presently being operated and executed by processing subsystem 2504. In some implementations, system memory 2510 may include multiple different types of memory, such as static random access memory (SRAM) or dynamic random access memory (DRAM).

By way of example, and not limitation, as depicted in FIG. 25, system memory 2510 may store application programs 2512, which may include client applications, Web browsers, mid-tier applications, relational database management systems (RDBMS), etc., program data 2514, and an operating system 2516. By way of example, operating system 2516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2522 may store programming and data constructs that provide the functionality of some embodiments. Software (programs, code modules, instructions) that when executed by processing subsystem 2504 a processor provide the functionality described above may be stored in storage subsystem 2518. By way of example, computer-readable storage media 2522 may include non-volatile memory such as a hard disk drive, a magnetic disk drive, an optical disk drive such as a CD ROM, DVD, a Blu-Ray® disk, or other optical media. Computer-readable storage media 2522 may include, but is not limited to, Zip® drives, flash memory cards, universal serial bus (USB) flash drives, secure digital (SD) cards, DVD disks, digital video tape, and the like. Computer-readable storage media 2522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2522 may provide storage of computer-readable instructions, data structures, program modules, and other data for computer system 2500.

In certain embodiments, storage subsystem 2500 may also include a computer-readable storage media reader 2520 that can further be connected to computer-readable storage media 2522. Together and, optionally, in combination with system memory 2510, computer-readable storage media 2522 may comprehensively represent remote, local, fixed, and/or removable storage devices plus storage media for storing computer-readable information.

In certain embodiments, computer system 2500 may provide support for executing one or more virtual machines. Computer system 2500 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2500. Accordingly, multiple operating systems may potentially be run concurrently by computer system 2500. Each virtual machine generally runs independently of the other virtual machines.

Communications subsystem 2524 provides an interface to other computer systems and networks. Communications subsystem 2524 serves as an interface for receiving data from and transmitting data to other systems from computer system 2500. For example, communications subsystem 2524 may enable computer system 2500 to establish a communication channel to one or more client devices via the Internet for receiving and sending information from and to the client devices.

Communication subsystem 2524 may support both wired and/or wireless communication protocols. For example, in certain embodiments, communications subsystem 2524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1702.11 family standards, or other mobile communication technologies, or any combination thereof), global positioning system (GPS) receiver components, and/or other components. In some embodiments communications subsystem 2524 can provide wired network connectivity (e.g., Ethernet) in addition to or instead of a wireless interface.

Communication subsystem 2524 can receive and transmit data in various forms. For example, in some embodiments, communications subsystem 2524 may receive input communication in the form of structured and/or unstructured data feeds 2526, event streams 2518, event updates 2530, and the like. For example, communications subsystem 2524 may be configured to receive (or send) data feeds 2526 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2524 may be configured to receive data in the form of continuous data streams, which may include event streams 2528 of real-time events and/or event updates 2530, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 2524 may also be configured to output the structured and/or unstructured data feeds 2526, event streams 2528, event updates 2530, and the like to one or more databases that may be in communication with one or more streaming data source computers coupled to computer system 2500.

Computer system 2500 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2500 depicted in FIG. 25 is intended only as a specific example. Many other configurations having more or fewer components than the system depicted in FIG. 25 are possible. Based on the disclosure and teachings provided herein, a person of ordinary skill in the art will appreciate other ways and/or methods to implement the various embodiments.

Although specific example embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments is not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although example embodiments have been described, these are not intended to be limiting. Various modifications and equivalents are within the scope of the following claims.

What is claimed is:

1. A method comprising:
    receiving, by a computer system via a first application, a request to update data within one or more data hierarchies associated with the first application;
    determining, by the computer system, one or more additional data hierarchies affected by the requested data update, the additional data hierarchies associated with one or more external applications other than the first application;
    retrieving, by the computer system, the additional data hierarchies associated with the external applications other than the first application;
    determining that the requested data update affects one or more shared master data dimensions within a hierarchical master data store;
    in response to the requested data update, generating and outputting a graphical user interface, by the computer system, wherein the graphical user interface includes:
        (a) a first graphical pane including graphical representations of the data hierarchies associated with the first application and graphical representations of the additional data hierarchies associated with the external applications, wherein the first graphical pane is located in a center position of the graphical user interface;
        (b) a second graphical pane including graphical representations identifying the requested data update within each of the data hierarchy representations shown in the graphical interface, including a preview of a potential future state of the one or more data hierarchies or additional data hierarchies if the request to update data within the one or more data hierarchies were to be committed and one or more identified violations of one or more data integrity rules associated with the one or more data hierarchies or the one or more additional data hierarchies, wherein the second graphical pane is located in a left position of the graphical user interface;
        (c) a third graphical pane including graphical representations identifying properties or operations associated with one or more data hierarchies within the graphical user interface, wherein the third graphical pane is located in a right position of the graphical user interface;
(d) a graphical component allowing the user to commit the requested data update via the graphical user interface; and
(e) graphical representations identifying a reference data overlap between the one or more data hierarchies associated with the first application, the additional data hierarchies associated with the external applications, and the hierarchical master data store; and receiving, at the graphical user interface, an input indicating a commitment to the requested data update or commitment to a revision of the requested data update; and rationalizing the hierarchical master data store using the requested data update, wherein rationalizing includes identifying overlapping reference data shared by two or more hierarchies, extracting the overlapping reference data from the two or more data hierarchies, and the overlapping reference data is added to a master data hierarchy.

2. The method of claim 1, wherein receiving the request to update the data within the data hierarchies associated with the first application comprises:
receiving a first request, via a first execution session of the first application, to update the data within the data hierarchies; and
receiving a second request, via a second execution session of the first application, to update the data within the data hierarchies,
wherein the graphical interface includes concurrently displayed sets of graphical representations identifying the requested data updates for both the first request and the second request.

3. The method of claim 2, wherein the data updates requested by the first request conflict with the data updates requested by the second request.

4. The method of claim 1, wherein determining the additional data hierarchies affected by the requested data update comprises:
retrieving, from a hierarchy management server associated with the hierarchical master data store, data identifying the external applications as subscribers to the one or more shared master data dimensions affected by the requested data update.

5. The method of claim 1, wherein the data hierarchies associated with the first application, and the additional data hierarchies associated with the external applications, each have an associated set of data rules and validations applicable to their respective data hierarchies.

6. The method of claim 5, further comprising:
generating and outputting, via the graphical interface, an indication of a violation of a data rule, within a first external data hierarchy associated with a first external application, resulting from the requested data update;
receiving, via the graphical interface, an instruction to commit the requested data update; and
transmitting a notification indicating a violation of a data rule, to an administrator account associated with the first external application.

7. The method of claim 1, wherein receiving the request to update the data within the data hierarchies associated with the first application comprises:

receiving a first request, via the first application, to update data within a first data hierarchy maintained by the first application; and
receiving a second request, via a second application of the one or more external applications, to update data within a second data hierarchy maintained by the second application, wherein a shared data mapping exists between the first data hierarchy and the second data hierarchy.

8. A system comprising:
a processing unit comprising one or more processors; and
memory coupled with and readable by the processing unit and storing therein a set of instructions which, when executed by the processing unit, causes the system to:
receive, by a computer system via a first application, a request to update data within one or more data hierarchies associated with the first application;
determine, by the computer system, one or more additional data hierarchies affected by the requested data update, the additional data hierarchies associated with one or more external applications other than the first application;
retrieve, by the computer system, the additional data hierarchies associated with the external applications other than the first application;
determine that the requested data update affects one or more shared master data dimensions within a hierarchical master data store;
in response to the requested data update, generate and output a graphical user interface, by the computer system, wherein the graphical user interface includes:
(a) a first graphical pane including graphical representations of the data hierarchies associated with the first application and graphical representations of the additional data hierarchies associated with the external applications, wherein the first graphical pane is located in a center position of the graphical user interface;
(b) a second graphical pane including graphical representations identifying the requested data update within each of the data hierarchy representations shown in the graphical interface, including a preview of a potential future state of the one or more data hierarchies or additional data hierarchies if the request to update data within the one or more data hierarchies were to be committed and one or more identified violations of one or more data integrity rules associated with the one or more data hierarchies or the one or more additional data hierarchies, wherein the second graphical pane is located in a left position of the graphical user interface;
(c) a third graphical pane including graphical representations identifying properties or operations associated with one or more data hierarchies within the graphical user interface, wherein the third graphical pane is located in a right position of the graphical user interface;
(d) a graphical component allowing the user to commit the requested data update via the graphical user interface; and
(e) graphical representations identifying a reference data overlap between the one or more data hierarchies associated with the first application, the additional data hierarchies associated with the external applications, and the hierarchical master data store; and receiving, at the graphical user interface, an input indicating a commitment to the requested data update or commitment to a revision of the requested data update; and rationalizing the hierarchical master data store using the requested data update, wherein rationalizing includes identifying overlapping reference data shared by two or more hierarchies, extracting the overlapping reference data from the two or more data hierarchies, and the overlapping reference data is added to a master data hierarchy.

9. The system of claim 8, wherein receiving the request to update the data within the data hierarchies associated with the first application comprises:

receiving a first request, via a first execution session of the first application, to update the data within the data hierarchies; and receiving a second request, via a second execution session of the first application, to update the data within the data hierarchies, wherein the graphical interface includes concurrently displayed sets of graphical representations identifying the requested data updates for both the first request and the second request.

10. The system of claim 9, wherein the data updates requested by the first request conflict with the data updates requested by the second request.

11. The system of claim 8, wherein determining the additional data hierarchies affected by the requested data update comprises:

determining that the requested data update affects one or more shared master data dimensions within a hierarchical master data store; and retrieving, from a hierarchy management server associated with the hierarchical master data store, data identifying the external applications as subscribers to the one or more shared master data dimensions affected by the requested data update.

12. The system of claim 8, wherein the data hierarchies associated with the first application, and the additional data hierarchies associated with the external applications, each have an associated set of data rules and validations applicable to their respective data hierarchies.

13. The system of claim 12, the memory storing therein additional instructions which, when executed by the processing unit, cause the system to:

generate and output, via the graphical interface, an indication of a violation of a data rule, within a first external data hierarchy associated with a first external application, resulting from the requested data update;

receive, via the graphical interface, an instruction to commit the requested data update; and transmit a notification indicating a violation of a data rule, to an administrator account associated with the first external application.

14. The system of claim 8, wherein receiving the request to update the data within the data hierarchies associated with the first application comprises:

receiving a first request, via the first application, to update data within a first data hierarchy maintained by the first application; and receiving a second request, via a second application of the one or more external applications, to update data within a second data hierarchy maintained by the second application, wherein a shared data mapping exists between the first data hierarchy and the second data hierarchy.

15. A computer-program product tangibly embodied in a non-transitory machine-readable storage medium, including instructions configured to cause one or more data processors to perform actions comprising:

receiving, by a computer system via a first application, a request to update data within one or more data hierarchies associated with the first application;

determining, by the computer system, one or more additional data hierarchies affected by the requested data update, the additional data hierarchies associated with one or more external applications other than the first application;

retrieving, by the computer system, the additional data hierarchies associated with the external applications other than the first application;

determining that the requested data update affects one or more shared master data dimensions within a hierarchical master data store; and in response to the requested data update, generating and outputting a graphical user interface, by the computer system, wherein the graphical user interface includes:

(a) a first graphical pane including graphical representations of the data hierarchies associated with the first application and graphical representations of the additional data hierarchies associated with the external applications, wherein the first graphical pane is located in a center position of the graphical user interface;

(b) a second graphical pane including graphical representations identifying the requested data update within each of the data hierarchy representations shown in the graphical interface, including a preview of a potential future state of the one or more data hierarchies or additional data hierarchies if the request to update data within the one or more data hierarchies were to be committed and one or more identified violations of one or more data integrity rules associated with the one or more data hierarchies or the one or more additional data hierarchies, wherein the second graphical pane is located in a left position of the graphical user interface;

(c) a third graphical pane including graphical representations identifying properties or operations associated with one or more data hierarchies within the graphical user interface, wherein the third graphical pane is located in a right position of the graphical user interface;

(d) a graphical component allowing the user to commit the requested data update via the graphical user interface; and (e) graphical representations identifying a reference data overlap between the one or more data hierarchies associated with the first application, the additional data hierarchies associated with the external applications, and the hierarchical master data store; and receiving, at the graphical user interface, an input indicating a commitment to the requested data update or commitment to a revision of the requested data update; and rationalizing the hierarchical master data store using the requested data update, wherein rationalizing includes identifying overlapping reference data shared by two or more hierarchies, extracting the overlapping reference data from the two or more data hierarchies, and the overlapping reference data is added to a master data hierarchy.

16. The computer-program product of claim 15, wherein receiving the request to update the data within the data hierarchies associated with the first application comprises:
- receiving a first request, via a first execution session of the first application, to update the data within the data hierarchies; and
- receiving a second request, via a second execution session of the first application, to update the data within the data hierarchies,
- wherein the graphical interface includes concurrently displayed sets of graphical representations identifying the requested data updates for both the first request and the second request.

17. The computer-program product of claim 16, wherein the data updates requested by the first request conflict with the data updates requested by the second request.

18. The computer-program product of claim 15, wherein determining the additional data hierarchies affected by the requested data update comprises:
- determining that the requested data update affects one or more shared master data dimensions within a hierarchical master data store; and
- retrieving, from a hierarchy management server associated with the hierarchical master data store, data identifying the external applications as subscribers to the one or more shared master data dimensions affected by the requested data update.

19. The computer-program product of claim 15, wherein the data hierarchies associated with the first application, and the additional data hierarchies associated with the external applications, each have an associated set of data rules and validations applicable to their respective data hierarchies.

20. The computer-program product of claim 19, including further instructions configured to cause one or more data processors to perform actions comprising:
- generating and outputting, via the graphical interface, an indication of a violation of a data rule, within a first external data hierarchy associated with a first external application, resulting from the requested data update;
- receiving, via the graphical interface, an instruction to commit the requested data update; and
- transmitting a notification indicating a violation of a data rule, to an administrator account associated with the first external application.

* * * * *

UNITED STATES PATENT AND TRADEMARK OFFICE
CERTIFICATE OF CORRECTION

| | |
|---|---|
| PATENT NO. | : 11,449,474 B2 |
| APPLICATION NO. | : 15/648216 |
| DATED | : September 20, 2022 |
| INVENTOR(S) | : Cosby et al. |

It is certified that error appears in the above-identified patent and that said Letters Patent is hereby corrected as shown below:

In the Drawings

On sheet 16 of 25, in FIG. 16, under Reference Numeral 1602, Line 2, delete "Dimensions/and/or" and insert -- Dimensions and/or --, therefor.

In the Specification

In Column 10, Line 34, delete "overalapping" and insert -- overlapping --, therefor.

In Column 10, Line 36, delete "hiearchy" and insert -- hierarchy --, therefor.

In Column 10, Line 50, delete "hiearchy," and insert -- hierarchy, --, therefor.

In Column 10, Line 54, delete "hierachical" and insert -- hierarchical --, therefor.

In Column 16, Line 45, delete "hierachies" and insert -- hierarchies --, therefor.

In Column 16, Line 47, delete "hierachies" and insert -- hierarchies --, therefor.

In Column 17, Line 32, delete "NorthAmerica" and insert -- North America --, therefor.

In Column 19, Line 67, delete "hierachy" and insert -- hierarchy --, therefor.

In Column 25, Line 4, delete "mayu" and insert -- may be --, therefor.

In Column 50, Line 66, delete "evolution)," and insert -- evolution)), --, therefor.

Signed and Sealed this
Fourteenth Day of February, 2023

Katherine Kelly Vidal
*Director of the United States Patent and Trademark Office*